US012755701B2

(12) United States Patent
Ishii

(10) Patent No.: US 12,755,701 B2
(45) Date of Patent: Oct. 6, 2026

(54) DISPLAY DEVICE

(71) Applicant: Japan Display Inc., Tokyo (JP)

(72) Inventor: Tatsuya Ishii, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/264,494

(22) Filed: Jul. 9, 2025

(65) Prior Publication Data

US 2026/0031048 A1 Jan. 29, 2026

(30) Foreign Application Priority Data

Jul. 24, 2024 (JP) ................................ 2024-118892

(51) Int. Cl.
*G09G 3/3241* (2016.01)

(52) U.S. Cl.
CPC ... *G09G 3/3241* (2013.01); *G09G 2300/0426* (2013.01); *G09G 2300/0439* (2013.01); *G09G 2300/0819* (2013.01); *G09G 2300/0842* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2009/0009441 | A1* | 1/2009 | Yamamoto | G09G 3/3233 345/80 |
| 2010/0245402 | A1* | 9/2010 | Choi | G09G 3/3233 345/212 |
| 2011/0157143 | A1* | 6/2011 | Choi | G09G 3/3233 345/212 |
| 2011/0285691 | A1* | 11/2011 | Takasugi | G09G 3/3233 345/82 |
| 2014/0062331 | A1* | 3/2014 | Nam | G09G 3/3233 315/226 |
| 2014/0111563 | A1* | 4/2014 | Hwang | G09G 3/003 345/691 |
| 2014/0253612 | A1* | 9/2014 | Hwang | G09G 3/3258 345/691 |
| 2016/0155379 | A1* | 6/2016 | Na | G09G 3/3233 345/215 |
| 2021/0158754 | A1* | 5/2021 | Umezawa | G09G 3/3275 |
| 2022/0208063 | A1* | 6/2022 | Hong | G09G 3/3225 |
| 2023/0099387 | A1* | 3/2023 | Park | G09G 3/32 |
| 2023/0419882 | A1* | 12/2023 | Lim | G09G 3/32 |
| 2025/0372047 | A1* | 12/2025 | Ishii | G09G 3/3266 |

* cited by examiner

*Primary Examiner* — Dorothy Harris
(74) *Attorney, Agent, or Firm* — K&L Gates LLP

(57) ABSTRACT

A display device includes a first transistor connected between an image data signal line and a first node, the first transistor controlled by a first control signal, a third transistor connected between the first node and a second node, the third transistor controlled by a second control signal, a second transistor connected to the second node and between a power line and a third node, a fourth transistor connected between a reference voltage power line and the second node, the fourth transistor controlled by a third control signal, a fifth transistor connected between an initialization voltage power line and the third node, the fifth transistor controlled by a fourth control signal, a sixth transistor connected to the third node, the sixth transistor controlled by the second control signal, a light-emitting element connected to a first electrode, and a capacitive element connected between the first and the third nodes.

8 Claims, 26 Drawing Sheets

DISPLAY DEVICE

CROSS-REFERENCE TO RELATED APPLICATIONS

This application claims the benefit of priority to Japanese Patent Application No. 2024-118892 filed on Jul. 24, 2024, the entire contents of which are incorporated herein by reference.

FIELD

An embodiment of the present invention relates to a display device.

BACKGROUND

In recent years, a display device (self-luminous display device) including a light-emitting element that emits light in a self-luminous manner has become popular. For example, the light-emitting element may be a light-emitting diode (LED), a micro light-emitting diode (micro LED), or an organic electroluminescence (EL) element. The self-luminous display device includes a plurality of pixels and a control circuit for driving the plurality of pixels. When the control circuit outputs a voltage to each of the plurality of pixels, a current corresponding to the supplied voltage flows to the light-emitting element included in each of the plurality of pixels. Each of the light-emitting elements emits light with a luminance corresponding to a current flowing through the light-emitting element, and a pixel including the light-emitting element can display an image with a gradation corresponding to the luminance.

For example, an organic light-emitting diode display device for driving a light-emitting element is known. The organic light-emitting diode display device for driving the light-emitting element includes a program period for detecting a threshold voltage of a drive transistor included in a pixel and storing a voltage corresponding to a data voltage whose threshold voltage is compensated for in a storage capacitor.

SUMMARY

A display device includes an image data signal line and a first node supplied with a data voltage, a power line supplied with a constant voltage, a reference voltage power line and a second node supplied with a reference voltage, an initialization voltage power line and a third node supplied with an initialization voltage, a first transistor electrically connected between the image data signal line and the first node, and controlled by a first control signal, a third transistor electrically connected between the first node and the second node, and controlled by a second control signal with a timing different from a timing of the first control signal, a second transistor including a gate electrode electrically connected to the second node, and electrically connected between a power line and the third node, a fourth transistor electrically connected between the reference voltage power line and the second node, and controlled by a third control signal with a timing different from timings of the first control signal and the second control signal, a fifth transistor electrically connected between the initialization voltage power line and the third node, and controlled by a fourth control signal with a timing different from timings of the first control signal, the second control signal, and the third control signal, a sixth transistor including a first electrode, and electrically connected to the third node, and controlled by the second control signal, a light-emitting element electrically connected to the first electrode, and a capacitive element electrically connected between the first node and the third node.

DESCRIPTION OF EMBODIMENTS

Figure 1:
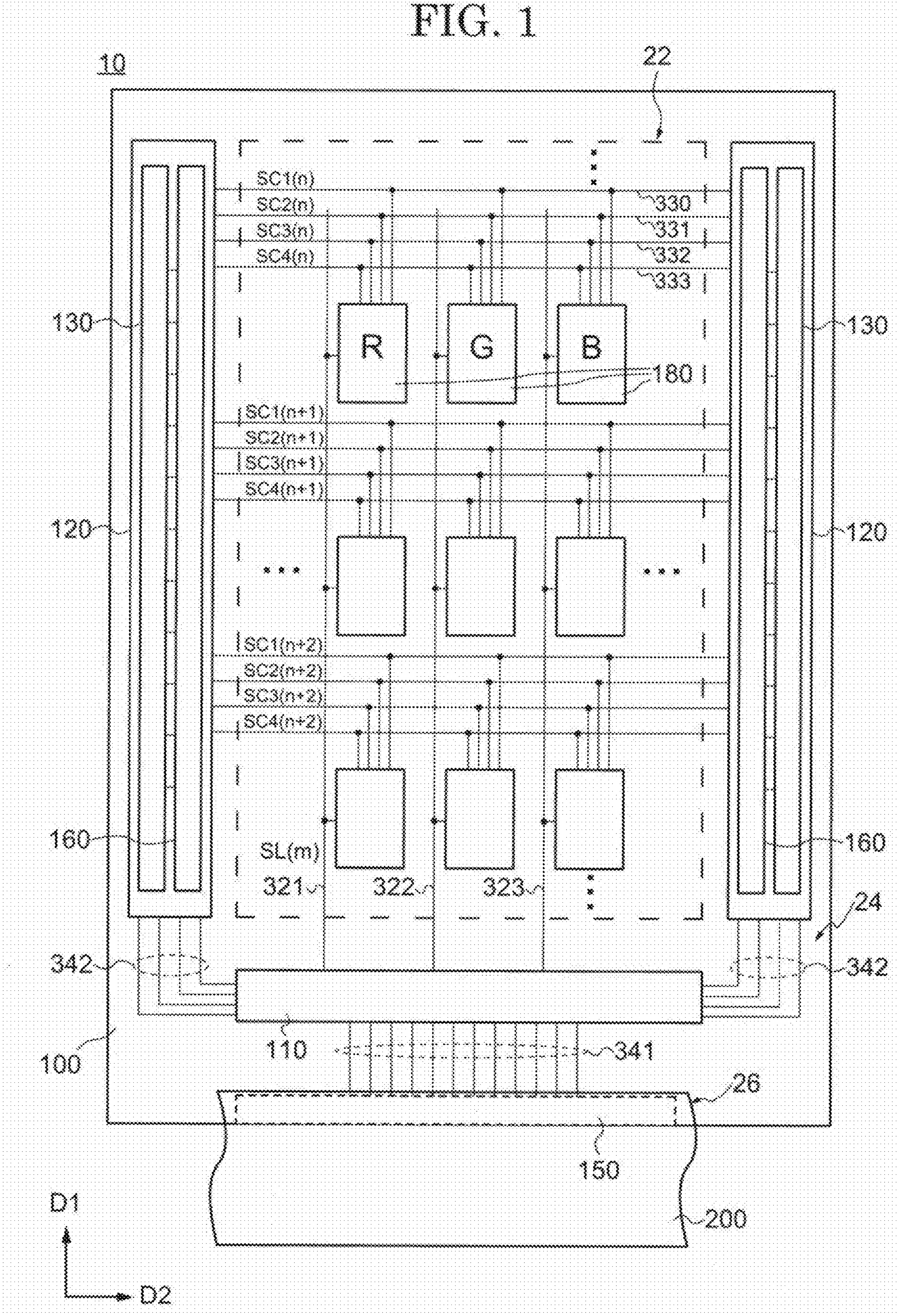
FIG. 1 is a schematic view showing a configuration of a display device according to the first embodiment of the present invention.

Hereinafter, embodiments of the present invention will be described with reference to the drawings and the like. However, the present invention can be implemented in many different aspects and should not be construed as being limited to the description of the embodiments exemplified below. Furthermore, in the drawings, the widths, thicknesses, shapes, configurations, and the like of the respective portions may be schematically represented in comparison with the actual embodiments for clarity of the description, but the drawings are merely examples, and do not limit the interpretation of the present invention. In addition, the terms "first" and "second" appended to each element are convenience signs used to distinguish each element, and do not have any further meaning unless otherwise specified.

In the present specification, the phrase "a includes A, B, or C," "a includes any of A, B, and C," "a includes one selected from a group consisting of A, B, and C," and the like does not exclude cases where a includes a plurality of combinations of A to C unless otherwise indicated. Furthermore, these expressions do not exclude the case where a includes other elements.

In the case where expressions such as the same, identical, and match are used in one embodiment of the present invention, the same, identical, and match may include errors within the design. Further, in the case where errors within the design are included in one embodiment of the present invention, expressions such as "substantially the same" and "substantially identical" may be used.

For example, a display device according to an embodiment of the present invention is a display device using an EL element as a self-luminous light-emitting element. For example, the display device using the EL element may be referred to as a self-luminous display device, an EL display device, or the like.

1. First Embodiment

[1-1. Overview of Display Device 10]

An overview of a display device 10 according to the first embodiment will be described with reference to FIG. 1. FIG. 1 is a schematic diagram showing a configuration of the display device 10. The configuration of the display device 10 shown in FIG. 1 is an example, and the configuration of the display device 10 is not limited to the configuration shown in FIG. 1.

The display device 10 includes an array substrate 100, a flexible printed circuit board 200 (the FPC 200), and an IC chip 110. In addition, the display device 10 includes a display region 22 provided on the array substrate 100, a peripheral region 24 surrounding the display region 22, and a terminal region 26.

A plurality of pixels 180 is arranged in the display region 22 in a matrix along a first direction D1 (column direction) and a second direction D2 (row direction) intersecting the first direction D1. The pixel 180 is the smallest unit constituting a part of an image to be displayed on the display region 22. For example, each of the plurality of pixels 180 may correspond to a sub-pixel R, a sub-pixel G, and a sub-pixel B. One pixel may be formed by three sub-pixels. The arrangement of the pixel 180 is not limited, and the arrangement of the plurality of pixels 180 may be a stripe arrangement. The arrangement of the display device 10 may be a delta arrangement, a pentile arrangement, or the like.

The sub-pixel R, the sub-pixel G, and the sub-pixel B are configured to display images of different colors. For example, each of the sub-pixel R, the sub-pixel G, and the sub-pixel B includes the light-emitting element including a light-emitting layer emitting red, green, and blue. An arbitrary voltage or current is supplied to each of the three sub-pixels, and the display device 10 can display an image.

The IC chip 110 and two control circuits 120 are arranged in the peripheral region 24. The IC chip 110 is connected to a terminal section 150 using a connection wiring 341. Each of the two control circuits 120 is connected to the IC chip 110 using a connection wiring 342. The peripheral region 24 may be referred to as a frame region. The connection wiring 341 may be referred to alone as the connection wiring 341, and a bundle of a plurality of connection wirings 341 may be referred to as the connection wiring 341. Similar to the connection wiring 341, the connection wiring 342 may be referred to alone as the connection wiring 342, and a bundle of a plurality of connection wirings 342 may be referred to as the connection wiring 342.

The terminal region 26 includes the terminal section 150 and the FPC 200 electrically connected to the terminal section 150. The terminal region 26 is a region opposite the region where the display region 22 is provided in the peripheral region 24 in the first direction D1.

The FPC 200 is connected to an external device (not shown) outside the display device 10. The display device 10 is connected to the external device via the FPC 200 and the terminal section 150 connected to the FPC. A control signal and a voltage are transmitted from the external device to the display device 10 via the FPC 200 and the terminal section 150 connected to the FPC. The display device 10 drives each pixel 180 provided in the display device 10 using the control signal and voltage transmitted from the external device. As a result, the display device 10 can display an image in the display region 22.

The IC chip 110 supplies signals, voltages, and the like for driving each pixel 180 to the two control circuits 120 and each pixel 180 (a pixel circuit 181) via the FPC 200, the terminal section 150, and the connection wiring 341.

In the present specification and the drawings, the IC chip 110, each of the two control circuits 120, and each of the IC chip 110 may be referred to alone as the control circuit, and a group of circuits including the IC chip 110, each of the two control circuits 120, and a part or all of the IC chip 110 may be referred to as a control circuit

[1-2. Configuration of IC Chip 110]

An overview of the IC chip 110 will be described with reference to FIG. 1. The IC chip 110 is provided at a position adjacent to the display region 22 in the first direction D1. Image data signal lines 321, 322, and 323 extend from the IC chip 110 in the first direction D1 and are connected to the plurality of pixels 180 arranged in the first direction D1.

For example, the IC chip 110 includes a plurality of selection circuits (not shown). For example, each of the plurality of selection circuits is a switch controlled based on an ON signal and an OFF signal supplied to a selection signal. The selection circuit is selected by the ON signal provided to the selection signal and provides an image data signal SL(m) including a data signal VDATA to the image data signal line 321 and the pixel 180 electrically connected to the image data signal line 321. The selection signal and the image data signal SL(m) are transmitted from the external device to the IC chip 110 via the FPC 200 and the terminal section 150 connected to the FCP 200. For example, the data signal VDATA (the image data signal SL(m)) includes a data voltage equal to or higher than a voltage VSIGL (see FIG. 5) and equal to or lower than a voltage VSIGH (see FIG. 5).

For example, the ON signal is a signal including a voltage that conducts the selection circuit (switch), and the OFF signal is a signal including a voltage that cuts off the selection circuit (switch). In the present invention, the ON signal may be a high-level voltage (potential) (high, High, HI), the OFF signal may be a low-level voltage (potential) (low, Low, LO), the ON signal may be a low-level voltage (potential) (low, Low, LO), and the OFF signal may be a high-level voltage (potential) (high, High, HI). The high-level voltage is greater (higher) than the low-level voltage. For example, in the display device according to an embodiment of the present specification, the ON signal is the high-level voltage and the OFF signal is the low-level voltage.

[1-3. Configuration of Control Circuit 120]

An overview of the control circuit 120 will be described with reference to FIG. 1. The two control circuits 120 are provided along the second direction D2 at a position adjacent to both sides of the display region 22. A scan signal line 330, a scan signal line 331, a scan signal line 332, and a scan signal line 333 extend in the second direction D2, and are connected to the plurality of pixels 180 arranged in the second direction D2. For example, each scan signal line of the display device 10 shown in FIG. 1 is connected to both of the two control circuits 120. Each scan signal line may be connected to one of the control circuits 120. For example, the n-th scan signal line may be electrically connected to the control circuit 120 on the right side with respect to the second direction D2 of the display region 22 and the n+1st scan signal line may be electrically connected to the control circuit 120 on the left side with respect to the second direction D2 of the display region 22. The number n is a positive integer.

The control circuit 120 includes a shift register circuit 130 and a scan driver circuit 160. For example, the control circuit 120 is a gate driver, and a control signal including a clock signal, a start pulse, a plurality of enable signals, and the like, and a voltage such as a drive voltage VDDEL (see FIG. 2) and a reference voltage VSSEL (see FIG. 2) are input. The control circuit 120 can sequentially select a scan line by inputting the control signal and a power supply.

The shift register circuit 130 is electrically connected to the scan driver circuit 160. The shift register circuit 130 includes a plurality of shift registers (not shown). Further, the above-described plurality of control signals is output to the shift register 130 via the plurality of connection wirings 342, the drive voltage VDDEL is output to the shift register 130 via a drive power line PVDD (see FIG. 2), and the reference voltage VSSEL is output to the shift register 130 via a reference voltage line PVSS (see FIG. 2). The shift register circuit 130 has a role of generating a plurality of output signals (not shown) shifted at different timings based on the plurality of control signals described above and sequentially outputting the output signals to the scan driver circuit 160.

The scan driver circuit 160 includes a plurality of scan drivers. For example, the plurality of output signals is output to the plurality of scan drivers from the shift register circuit 130, the plurality of enable signals described above is output to the plurality of scan drivers from the IC chip 110 via the plurality of connection wirings 342, the drive voltage VDDEL is output to the plurality of scan drivers via the drive power line PVDD, and the reference voltage VSSEL is output to the plurality of scan drivers via the reference voltage line PVSS. The plurality of scan drivers has a role of sequentially supplying scan signals having different timings (for example, a first scan signal SC1(*n*), a second scan signal SC2(*n*), a third scan signal SC3(*n*), a fourth scan signal SC4(*n*), and a fifth scan signal SC5(*n*)) to each scan signal line based on the plurality of output signals and the plurality of enable signals, and driving the pixel 180 (the pixel circuit 181) electrically connected to each scan signal line. For example, the fourth scan signal SC4(*n*) and the scan signal line 333 to which the fourth scan signal SC4(*n*) is output are the so-called scan signal and scan signal line.

[1-4. Configuration of Pixel 180]

Figure 2:
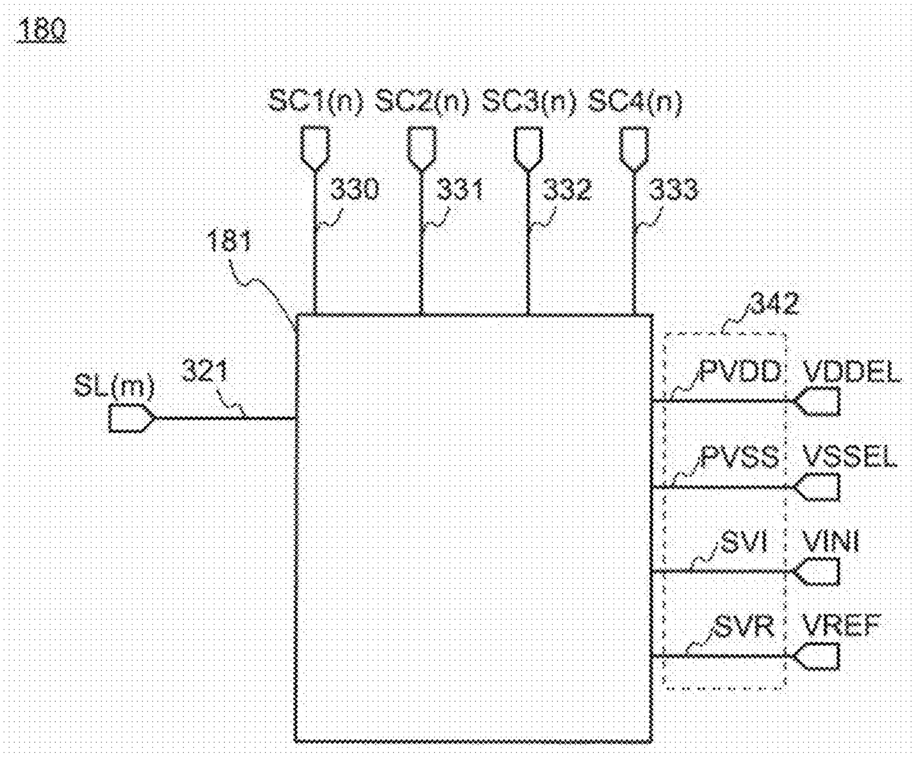
FIG. 2 is a schematic view showing input signals to a pixel circuit according to the first embodiment of the present invention.
Figure 3:
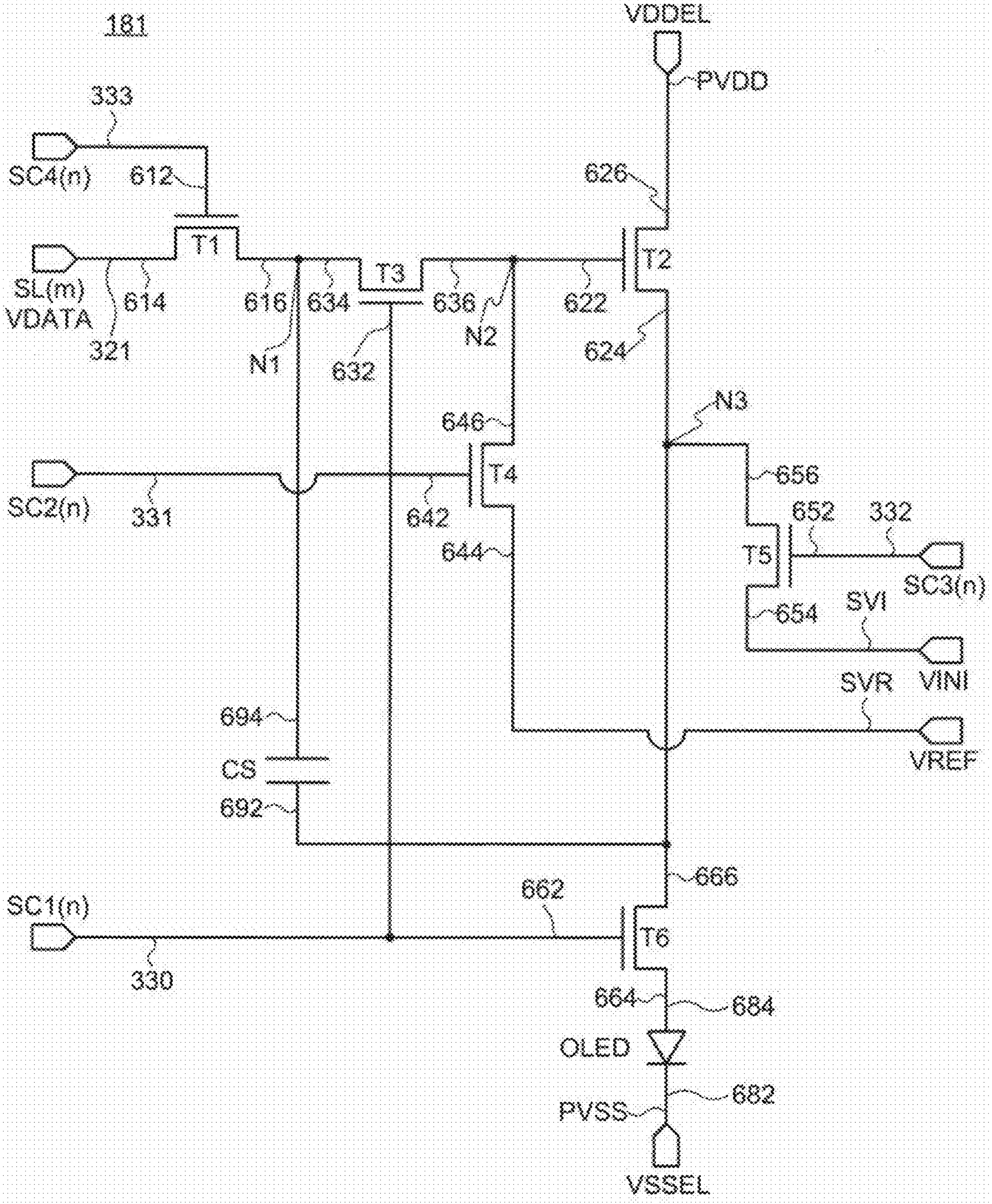
FIG. 3 is a circuit diagram showing a configuration of a pixel circuit according to the first embodiment of the present invention.

An overview of the pixel 180 and the pixel circuit 181 will be described with reference to FIG. 1 to FIG. 3. FIG. 2 is a schematic diagram showing input signals to the pixel circuit 181 included in the pixel 180. FIG. 3 is a circuit diagram showing a configuration of the pixel circuit 181. For example, FIG. 2 and FIG. 3 show the configurations of the pixel circuit 181 of the pixel 180 shown in FIG. 1. The configurations of the pixel 180 and the pixel circuit 181 are not limited to the configurations shown in FIG. 1 to FIG. 3. Configurations that are the same as or similar to those in FIG. 1 will be described as necessary.

The pixel circuit 181 is a circuit for driving the pixel 180. The pixel circuits of the sub-pixel R, the sub-pixel G, and the sub-pixel B included in the pixel 180 are similar to those of the pixel circuit 181, but the colors of light emitted by the light-emitting element OLED are different. In the following explanation, the light-emitting element OLED emitting red light will be described as an example.

As shown in FIG. 2, the image data signal SL(m), the first scan signal SC1(*n*), the second scan signal SC2(*n*), the third scan signal SC3(*n*), the fourth scan signal SC4(*n*), a reference voltage VREF, and an initialization voltage VINI are output to the pixel circuit 181. In addition, the drive voltage VDDEL and the reference voltage VSSEL are output to the pixel circuit 181 as a power supply for driving the pixel 180. For example, the reference voltage VREF, the initialization voltage VINI, the drive voltage VDDEL, and the reference voltage VSSEL may be constant voltages, and may be variable voltages that fluctuate depending on the timing of each signal.

The first scan signal SC1(*n*) is output to the scan signal line 330, the second scan signal SC2(*n*) is output to the scan signal line 331, the third scan signal SC3(*n*) is output to the scan signal line 332, the fourth scan signal SC4(*n*) is output to the scan signal line 333, the reference voltage VREF is output to a reference voltage power line SVR, the initialization voltage VINI is output to an initialization voltage power line SVI, the drive voltage VDDEL is output to the drive power line PVDD, and the reference voltage VSSEL is output to the reference voltage line PVSS. For example, each of the reference voltage power line SVR, the initialization voltage power line SVI, the drive power line PVDD, and the reference voltage line PVSS is electrically connected to the different connection wirings 342. In addition, for example, each of the reference voltage power line SVR, the initialization voltage power line SVI, the drive power line PVDD, and the reference voltage line PVSS may be different connection wirings 342.

For example, the reference voltage VREF, the initialization voltage VINI, the drive voltage VDDEL, and the reference voltage VSSEL are output to the IC chip 110 from the external device via the FPC 200, the terminal section 150, and the connection wiring 341. In addition, for example, the reference voltage VREF, the initialization voltage VINI, the drive voltage VDDEL, and the reference voltage VSSEL are output to the plurality of pixels 180 (pixel circuits 181) from the IC chip 110 via the connection wiring 342, a pre-charge voltage power line SVP, the reference voltage power line SVR, the initialization voltage power line SVI, the drive power line PVDD, and the reference voltage line PVSS. In addition, although not shown, the reference voltage VREF, the initialization voltage VINI, the drive voltage VDDEL, and the reference voltage VSSEL may be connected from the external device to the reference voltage power line SVR, the initialization voltage power line SVI, the drive power line PVDD, and the reference voltage line PVSS via the FPC 200, the terminal section 150, and the connection wiring 341, and not via the IC chip 110 and the connection wiring 342, and may be output to the plurality of pixels 180 (the pixel circuits 181). For example, the reference voltage VREF, the initialization voltage VINI, and the reference voltage VSSEL are smaller than the drive voltage VDDEL.

As shown in FIG. 3, the pixel circuit 181 includes a first transistor T1, a second transistor T2, a third transistor T3, a fourth transistor T4, a fifth transistor T5, a sixth transistor T6, a capacitive element CS, and the light-emitting element OLED. Each of these transistors includes a gate electrode and a pair of electrodes (a source electrode and a drain electrode) consisting of a first electrode and a second electrode. Each of the capacitive element CS and the light-emitting element OLED has a pair of electrodes consisting of the first electrode and the second electrode.

For example, the first transistor T1 is a select transistor. The first transistor T1 has a function of supplying the image data signal SL(m) to a first node N1.

For example, the second transistor T2 is a drive transistor. A gate voltage in which the variation in a threshold voltage VTH is corrected based on the reference voltage VREF and the initialization voltage VINI is applied between a gate electrode 622 and a first electrode 624 of the second transistor T2. In addition, the second transistor T2 controls the amount of current flowing from the drive power line PVDD to the light-emitting element OLED based on the gate voltage with the variation in the threshold voltage VTH corrected and the input image data signal SL(m). That is, the second transistor T2 has a function of causing the light-emitting element OLED to emit light by supplying a current corresponding to a display gradation (brightness) from the drive voltage VDDEL to the light-emitting element OLED. The first electrode 624 is a source electrode, and the gate voltage is a potential difference Vgs between a voltage applied to the gate electrode 622 (second node N2) and a voltage applied to the first electrode 624 (third node N3).

The third transistor T3 has a function of conducting the first node N1 and the second node N2 to supply the image data signal SL(m) to the second node N2.

The fourth transistor T4 has a function of conducting the second node N2 and the reference voltage power line SVR to supply the reference voltage VREF to the second node N2 and initializing the second node N2.

The fifth transistor T5 has a function of conducting the third node N3 and the initialization voltage power line SVI to supply the initialization voltage VINI to the third node N3 and initializing the third node N3.

The sixth transistor T6 is electrically connected between the third node N3 and the light-emitting element OLED, and has a function of controlling conduction and non-conduction between the third node N3 and the light-emitting element OLED.

The capacitive element CS has a function of holding a charge equivalent to the threshold voltage VTH of the second transistor T2 and a function of holding a charge equivalent to a data voltage (a voltage equal to or higher than the voltage VSIGL (see FIG. 5) and equal to or lower than the voltage VSIGH (see FIG. 5)) included in the image data signal SL(m) supplied to the first node N1.

The light-emitting element OLED has diode characteristics and has a function of emitting light based on a current flowing through the light-emitting element OLED. The current flowing through the light-emitting element OLED is a drain current (current Ion) of the second transistor T2.

The first transistor T1 includes a gate electrode 612, a first electrode 614, and a second electrode 616. The gate electrode 612 is electrically connected to the scan signal line 333. The first electrode 614 is electrically connected to the image data signal line 321. The second electrode 616 is electrically connected to the first node N1, a first electrode 634 of the third transistor T3, and a second electrode 694 of the capacitive element CS. As described above, the fourth scan signal SC4(*n*) is output to the scan signal line 333. The switching of the first transistor T1 is controlled using the fourth scan signal SC4(*n*). In other words, the first transistor T1 is controlled to be in a conductive state (ON state) and a non-conductive state (OFF state) by the fourth scan signal SC4(*n*). When the signal output to the fourth scan signal SC4(*n*) is LO, the first transistor T1 is in the non-conductive state. When the signal output to the fourth scan signal SC4(*n*) is HI, the first transistor T1 is in the conductive state.

The second transistor T2 includes the gate electrode 622, the first electrode 624, and a second electrode 626. The gate electrode 622 is electrically connected to the second node N2, a second electrode 636 of the third transistor T3, and a second electrode 646 of the fourth transistor T4. The first electrode 624 is electrically connected to the third node N3, a second electrode 656 of the fifth transistor T5, the first electrode 692 of the capacitive element CS, and a second electrode 666 of the sixth transistor T6. The second electrode 626 is electrically connected to the drive power line PVDD. The threshold voltage of the second transistor T2 is the threshold voltage VTH. The second transistor T2 controls the amount of current flowing through the light-emitting element OLED according to the potential difference Vgs between the voltage supplied to the second node N2 and the voltage supplied to the first electrode 624, a potential difference Vds between the voltage supplied to the second electrode 626 and the voltage supplied to the first electrode 624, and the threshold voltage VTH. For example, the potential difference Vgs is smaller than the threshold voltage VTH, the second transistor T2 is in the non-conductive state, and no current flows through the light-emitting element OLED and black is displayed. For example, when the potential difference Vgs is equal to or higher than the threshold voltage VTH and the potential difference Vds is higher than 0 V, the second transistor T2 is in the conductive state, causes the current Ion to flow, and causes the light-emitting element OLED to emit light with a brightness according to the amount of current.

The third transistor T3 includes a gate electrode 632, the first electrode 634, and the second electrode 636. The gate electrode 632 is electrically connected to a gate electrode 662 and the scan signal line 330 of the sixth transistor T6. As described above, the first scan signal SC1(*n*) is output to the scan signal line 330. The switching of the third transistor T3 is controlled using the first scan signal SC1(*n*). In other words, the conductive state (ON state) and the non-conductive state (OFF state) of the third transistor T3 are controlled by the first scan signal SC1(*n*). When the signal output to the first scan signal SC1(*n*) is HI, the third transistor T3 is in the conductive state. When the signal output to the first scan signal SC1(*n*) is LO, the third transistor T3 is in the non-conductive state.

The fourth transistor T4 includes a gate electrode 642, a first electrode 644, and the second electrode 646. The gate electrode 642 is electrically connected to the scan signal line 331. The first electrode 644 is electrically connected to the reference voltage power line SVR. As described above, the second scan signal SC2(*n*) is output to the scan signal line 331. The switching of the fourth transistor T4 is controlled using the second scan signal SC2(*n*). In other words, the conductive state (ON state) and the non-conductive state (OFF state) of the fourth transistor T4 are controlled by the second scan signal SC2(*n*). When the signal output to the second scan signal SC2(*n*) is LO, the fourth transistor T4 is in the non-conductive state, and when the signal output to the scan signal line 330 is HI, the fourth transistor T4 is in the conductive state.

The fifth transistor T5 includes a gate electrode 652, a first electrode 654, and the second electrode 656. The gate electrode 652 is electrically connected to the scan signal line 332. The first electrode 654 is electrically connected to the initialization voltage power line SVI. As described above, the third scan signal SC3(*n*) is output to the scan signal line 332. The switching of the fifth transistor T5 is controlled using the third scan signal SC3(*n*). In other words, the conductive state (ON state) and the non-conductive state (OFF state) of the fifth transistor T5 are controlled by the third scan signal SC3(*n*). When the signal output to the third scan signal SC3(*n*) is LO, the fifth transistor T5 is in the non-conductive state, and when the signal output to the third scan signal SC3(*n*) is HI, the fifth transistor T5 is in the conductive state.

The sixth transistor T6 includes the gate electrode 662, a first electrode 664, and the second electrode 666. The gate electrode 662 is electrically connected to the scan signal line 330. The first electrode 664 is electrically connected to a second electrode 684 of the light-emitting element OLED. As described above, the first scan signal SC1(*n*) is output to the scan signal line 330. The switching of the sixth transistor T6 is controlled using the first scan signal SC1(*n*). In other words, the conductive state (ON state) and the non-conductive state (OFF state) of the sixth transistor T6 are controlled by the first scan signal SC1(*n*). When the signal output to the first scan signal SC1(*n*) is LO, the sixth transistor T6 is in the non-conductive state, and when the signal output to the first scan signal SC1(*n*) is HI, the sixth transistor T6 is in the conductive state.

A first electrode 682 of the light-emitting element OLED is electrically connected to the reference voltage line PVSS. As described above, the reference voltage VSSEL is output to the reference voltage line PVSS. For example, the first electrode 682 of the light-emitting element OLED is a cathode electrode, and the second electrode 684 of the light-emitting element OLED is an anode electrode.

For example, it is assumed that the conductive state of the transistor in the display device 10 indicates a state in which the source electrode and the drain electrode of the transistor are conductive and the transistor is in the ON state (ON), and the non-conductive state of the transistor in the display device 10 indicates a state in which the source electrode and the drain electrode of the transistor are non-conductive and the transistor is in the OFF state (OFF). Furthermore, in each transistor, the source electrode and the drain electrode may be interchanged depending on a voltage or a potential supplied to each electrode. In addition, those skilled in the art will readily appreciate that even when the transistor is in the OFF state, a slight current flows, such as a leakage current.

The transistors shown in FIG. 3 can have Group 14 elements, such as silicon or germanium, or an oxide exhibiting semiconductor properties in a channel region. For example, crystalline silicon can be used as a channel region having a Group 14 element. The crystalline silicon may be low-temperature polysilicon (LTPS) or single-crystal silicon. In addition, for example, a metal oxide having semiconductor characteristics can be used as the oxide exhibiting semiconductor characteristics. For example, an oxide semiconductor containing two or more metals including indium (In) is used as the metal oxide having semiconductor properties. Gallium (Ga), zinc (Zn), aluminum (Al), hafnium (Hf), yttrium (Y), zirconia (Zr), and lanthanoids may be used as the metal oxide having semiconductor properties, in addition to indium. Further, the metal oxide having semiconductor properties may be amorphous, crystalline, or a mixed phase of amorphous and crystalline.

For example, each transistor in the display device 10 is formed using a thin film transistor (TFT). The channel region of each transistor may be formed using a silicon wafer or single-crystal silicon such as an SOI substrate. Furthermore, in the case where the display device 10 includes both a transistor including the Group 14 element in the channel region and a transistor containing the oxide with semiconductor properties in the channel region, a method for manufacturing the display device 10 includes forming a semiconductor layer containing the Group 14 element and forming a semiconductor layer (e.g., an oxide semiconductor layer) containing the oxide with semiconductor properties. In the display device 10, the configuration of the transistor, the connection of the storage capacitor, power supply voltage, and the like may be appropriately adapted according to the application and specifications.

For example, the leakage current of the transistor including the metal oxide with semiconductor properties is extremely small. Therefore, the charge equivalent to the voltage (potential) written in the capacitive element using the transistor having the metal oxide with semiconductor properties is unlikely to escape from the capacitive element. As a result, by using the transistor having the metal oxide with semiconductor properties, the charge written in the capacitive element can be held for a long time. In addition, under the condition that the potential difference (gate-source voltage) between the gate electrode and the source electrode and the potential difference (source-drain voltage) between the source electrode and the drain electrode are the same, the drain current of the transistor having the metal oxide with semiconductor properties may be greater than the drain current of the transistor having crystalline silicon (e.g., low-temperature polysilicon (LTPS)). As a result, under the same drain current conditions, the gate-source voltage and the source-drain voltage of the transistor having the metal oxide with semiconductor properties can be made smaller than the transistor having LTPS. Therefore, the power consumption of the display device 10 can be suppressed by using the transistor having the metal oxide with semiconductor properties.

[1-5. Driving Method of Display Device 10]

A driving method of the display device 10 will be described with reference to FIG. 4 to FIG. 8. FIG. 4 to FIG. 8 are schematic diagrams showing timing charts of the display device 10. Configurations that are the same as or similar to those in FIG. 1 to FIG. 3 will be described as necessary.

In addition, the horizontal axis of the timing charts in the respective embodiments represents time (TIME). Further, in the image data signal SL(m) including the data signal VDATA in each embodiment, for example, the data signal VDATA output to the selected pixel (pixel circuit) is indicated by diagonal lines as a data voltage (analog data voltage) equal to or higher than the voltage VSIGL and equal to or lower than the voltage VSIGH, and the data signal VDATA output to the pixels (pixel circuits) other than the selected pixel (pixel circuit) is omitted and indicated by solid lines. In practice, the data signal VDATA output to the pixels (pixel circuits) other than the selected pixel (pixel circuit) is continuously or intermittently output to the image data signal SL(m) including the data signal VDATA in the respective embodiments.

Figure 4:
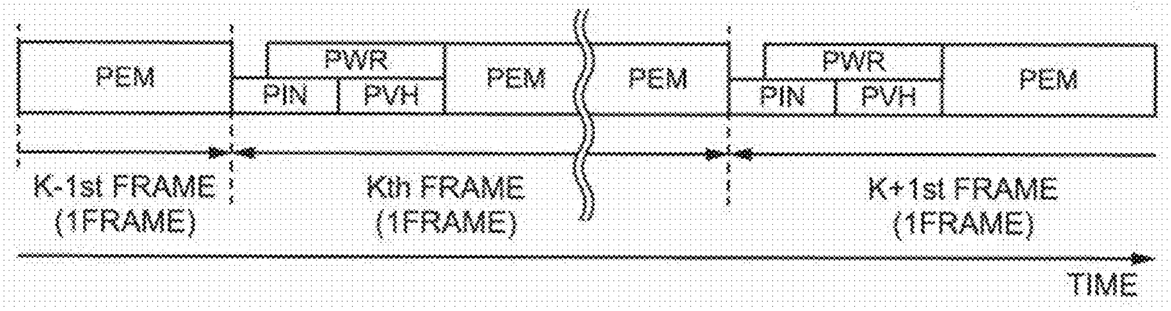
FIG. 4 is a timing chart of a display device according to the first embodiment of the present invention.

For example, the frequency at which the display device 10 is driven is 60 Hz, and one frame (1FRAME) is driven at 60 Hz. For example, FIG. 4 shows the current frame (KthFRAME), a portion of the previous frame of the current frame (K−1stFRAME), and a portion of the subsequent frame of the current frame (K+1stFRAME). In addition, FIG. 5 to FIG. 8 show a light emission period PEM of the previous frame (K−1stFRAME) of the current frame, a period PIN of the current frame (KthFRAME), a period PWR, and a period PVH. Furthermore, FIG. 5 to FIG. 8 show one horizontal period (a horizontal period HRP) for one pixel 180 (pixel circuit 181).

First, an overview of a driving method of the display device 10 will be described with reference to FIG. 4. As shown in FIG. 4, the driving method of the display device 10 includes at least an initialization period PIN (period PIN), a writing period PWR (period PWR), and a threshold acquisition and holding period PVH (period PVH) in one frame. In the pixel 180 (the pixel circuit 181) included in the display device 10, the period PVH is executed after the period PIN, and after the period PIN is started, the period PWR is executed in parallel with the period PIN and the period PVH. In addition, the period PIN, the period PWR, and the period PVH of the current frame are executed after the light emission period PEM of the previous frame of the current frame, and the period PIN, the period PWR, and the period PVH of the subsequent frame of the current frame are executed after the light emission period PEM of the current frame.

The period PIN is a period during which the second node N2, the third node N3, and the fourth node N4 are initialized. The period PWR is a period during which the data signal VDATA is written to the pixel 180 (the pixel circuit 181). The period PVH is a period during which the threshold voltage of the second transistor T2 is obtained by performing an operation to make the potential difference Vgs of the second transistor T2 to be the same as the threshold voltage, and the charge equivalent to the threshold voltage is held in the third node N3 (the first electrode 692 of the capacitive element CS). Further, the light emission period PEM is a period during which the pixel 180 emits light based on the written (supplied) data signal VDATA and the obtained threshold voltage of the second transistor T2 (corrected threshold voltage) (based on the threshold voltage correction). For example, the period PWR shown in FIG. 4 overlaps the period PIN and the period PVH as described above, and is executed during the period PVH.

Next, a specific driving method of the pixel 180 (pixel circuit 181) of the display device 10 will be described with reference to FIG. 4 to FIG. 8.

The first scan signal SC1(*n*), the second scan signal SC2(*n*), the third scan signal SC3(*n*), the fourth scan signal SC4(*n*), the image data signal SL(m) including the data signal VDATA, the initialization voltage VINI, and the reference voltage VREF are input to the pixel 180 (the pixel circuit 181). For example, the pixel 180 (the pixel circuit 181) is selected according to the timings of the first scan signal SC1(*n*), the second scan signal SC2(*n*), the third scan signal SC3(*n*), and the fourth scan signal SC4(*n*). The image data signal SL(m) is input to the selected pixel 180 (pixel circuit 181) according to the timings of the respective signals. Similar operations are performed on all the pixels 180 (the pixel circuits 181), and an image of the frame corresponding to 1FRAME is displayed on the display region 22 of the display device 10 based on the image data signal SL(m) input to all the pixels 180 (the pixel circuits 181).

For example, the voltages (potentials) supplied to each signal in each period of each frame in the timing charts shown in FIG. 4 to FIG. 8 are shown in Table 1.

TABLE 1

| | Setting value [V] |
|---|---|
| VTH | 1 |
| VSIGL(Black) | 0.2 |
| VSIGH(White) | 4 |
| HI | 10 |
| LO | −3 |
| VINI | −2 |
| VREF | 1.4 |
| VDDEL | 8 |
| VSSEL | 0 |

[1-5-1. First Example of Driving Method of Display Device 10]

Figure 5:
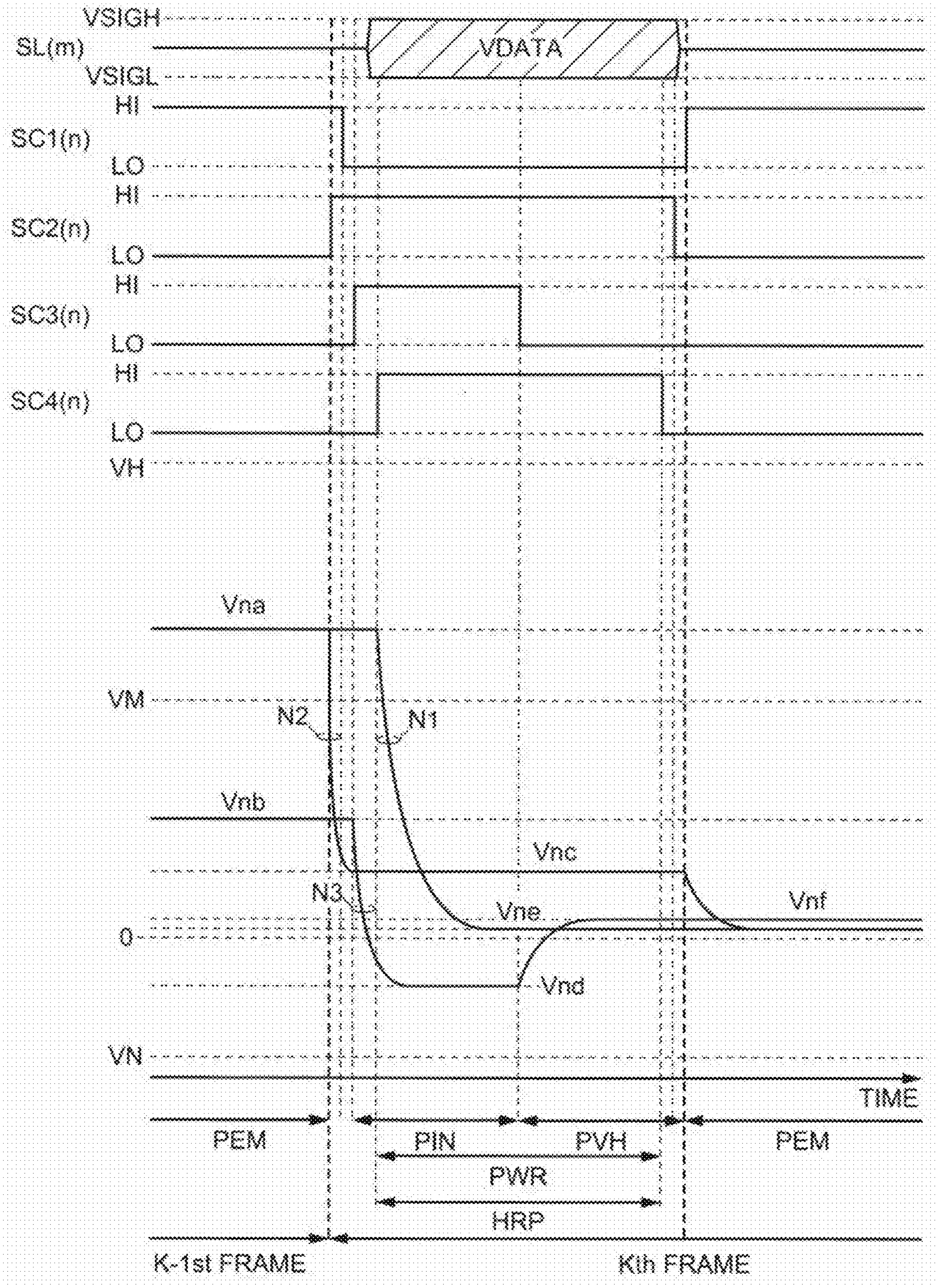
FIG. 5 is a timing chart of a display device according to the first embodiment of the present invention.

A first example of the driving method of the display device 10 will be described with reference to FIG. 5 and Table 1. The driving method shown in the first example includes the pixel 180 (the pixel circuit 181) displaying a white image based on the voltage VSIGH in the previous frame (K−1stFRAME) of the current frame (KthFRAME), and then the pixel 180 (the pixel circuit 181) displaying a black image based on the voltage VSIGL in the KthFRAME. In other words, the driving method shown in the first example includes displaying images of different colors in consecutive frames.

The image data signal SL(m) is input to each pixel 180 (pixel circuit 181) according to each period (the period PIN, the period PWR (the horizontal period HRP), and the period PVH). As shown in Table 1, for example, the voltage VSIGL is 0.2 V, and the pixel 180 to which the voltage VSIGL is supplied does not emit light and becomes black. In addition, for example, the voltage VSIGH is 4 V, and the pixel 180 to which the voltage VSIGH is supplied emits light and emits white color. For example, the voltage VH (HI) is 10 V, the voltage VL (LO) is −3 V, the initialization voltage VINI is −2 V, the reference voltage VREF is 1.4 V, a voltage VM is 5 V, and a voltage VN is −5 V.

The light emission period PEM of the K−1stFRAME is a period during which the pixel 180 (the pixel circuit 181) emits light according to the potential difference Vgs of the second transistor T2. For example, the pixel 180 (the pixel circuit 181) emits red light, and white light is emitted by three pixels using the pixel 180 emitting red light, the pixel 180 emitting blue light, and the pixel 180 emitting green light.

For example, in the light emission period PEM of the K−1stFRAME, the voltage of the data signal VDATA output to the pixels other than the selected pixel 180 (pixel circuit 181) is output to the image data signal SL(m), LO is supplied to the second scan signal SC2(*n*), the third scan signal SC3(*n*), and the fourth scan signal SC4(*n*), and HI is supplied to the first scan signal SC1(*n*). The first transistor T1, the fourth transistor T4, and the fifth transistor T5 are in the OFF state, and the third transistor T3 and the sixth transistor T6 are in the ON state. In addition, for example, a voltage Vna supplied to the first node N1 and the second node N2 is 6.1 V, a voltage Vnb supplied to the third node N3 is 2.5 V, and the potential difference Vgs is 3.6 V. Therefore, the second transistor T2 can flow the current Ion based on the potential difference Vgs and the potential difference Vds according to the voltage VSIGH input in the horizontal period HRP of the K−1stFRAME. In addition, the second transistor T2 and the sixth transistor T6 are in the ON state, the current Ion flows from the drive power line PVDD to the light-emitting element OLED and the reference voltage line PVSS, and the light-emitting element OLED emits light.

In the period between the light emission period PEM of the K−1stFRAME and the period PIN of the KthFRAME (hereinafter, for example, referred to as a period PPIN) following the light emission period PEM of the K−1stFRAME, the voltage of the data signal VDATA output to the pixels other than the selected pixel 180 (pixel circuit 181) is supplied to the image data signal SL(m), and the second scan signal SC(n) changes from the state in which LO is supplied to the state in which HI is supplied. When the second scan signal SC2(*n*) is in the state in which HI is supplied, the first scan signal SC1(*n*) changes from the state in which HI is supplied to the state in which LO is supplied. The third scan signal SC3(*n*) and the fourth scan signal SC4(*n*) are in the state in which LO is supplied. Therefore, the fourth transistor T4 is turned from the OFF state to the ON state, and the third transistor T3 and the sixth transistor T6 are turned from the ON state to the OFF state. The first transistor T1 and the fifth transistor T5 are maintained in the OFF state. As a result, the voltage supplied to the first node N1 and the voltage supplied to the third node N3 maintain the voltage Vna, and the voltage supplied to the second node N2 gradually drops from the voltage Vna toward a voltage Vnc (reference voltage VREF, 1.4 V) and becomes the voltage Vnc. The second transistor T2 is in either the ON state or the OFF state depending on the potential difference Vgs, but since the sixth transistor T6 is in the OFF state, the current Ion does not flow through the light-emitting element OLED, and the light-emitting element OLED does not emit light.

In the first period of the period PIN of the KthFRAME following the light emission period PEM of the K−1stFRAME, the data signal VDATA output to the pixels other than the selected pixel 180 (the pixel circuit 181) is supplied to the image data signal SL(m). The third scan signal SC3(*n*) changes from the state in which LO is supplied to the state in which HI is supplied. The first scan signal SC1(*n*) and the fourth scan signal SC4(*n*) are in the state in which LO is supplied, and the second scan signal SC2(*n*) is in the state in which HI is supplied. Therefore, the fifth transistor T5 is turned from the OFF state to the ON state, the fourth transistor T4 is maintained in the ON state, and the first transistor T1, the third transistor T3, and the sixth transistor T6 are maintained in the OFF state. As a result, the voltage supplied to the first node N1 maintains the voltage Vna, the voltage supplied to the second node N2 maintains the voltage Vnc, and the voltage supplied to the third node N3 gradually drops from the voltage Vnb toward a voltage Vnd (initialization voltage VINI, −2 V). The second transistor T2 is in either the ON state or the OFF state depending on the potential difference Vgs similar to the PPIN period, but the sixth transistor T6 is in the OFF state, so that the current Ion does not flow through the light-emitting element OLED, and the light-emitting element OLED does not emit light.

In the period PIN of the KthFRAME following the first period of the period PIN of the KthFRAME and the period PWR executed in parallel (overlapping) with the period PIN, the voltage VSIGL (0.2 V) is output to the image data signal SL(m) and the fourth scan signal SC4(*n*) changes from the state in which LO is supplied to the state in which HI is supplied. The second scan signal SC2(*n*) and the third scan signal SC3(*n*) are maintained in the state in which HI is supplied, and the first scan signal SC1(*n*) is maintained in the state in which LO is supplied. Therefore, the first transistor T1 is turned from the OFF state to the ON state, the fourth transistor T4 and the fifth transistor T5 are maintained in the ON state, and the third transistor T3 and the sixth transistor T6 are maintained in the OFF state.

As a result, the voltage supplied to the first node N1 gradually drops from the voltage Vna toward a voltage Vne (voltage VSIGL (0.2 V)), the voltage supplied to the second node N2 maintains the voltage Vnc, and the voltage supplied to the third node N3 gradually drops from the voltage Vnb toward the voltage Vnd to become the voltage Vnd. The potential difference Vgs is 3.4 V (1.4 V−(−2 V)) and the potential difference Vds is 10 V (8 V−(−2 V)). Therefore, the second transistor T2 is in the ON state, but the sixth transistor T6 is in the OFF state, so that the current Ion does not flow through the light-emitting element OLED, and the light-emitting element OLED does not emit light.

As described above, in the period PIN, the second node N2 is initialized by the reference voltage VREF (1.4 V) and the third node N3 is initialized by the initialization voltage VINI (−2 V). Further, in the period PWR executed in parallel with the period PIN, the data signal VDATA is written to the pixel 180 (the pixel circuit 181).

The period PVH of the KthFRAME following the period PIN of the KthFRAME and the period PWR executed in parallel (overlapping) with the period PVH, the voltage VSIGL (0.2 V) is output to the image data signal SL(m) and the third scan signal SC3(*n*) changes from the state in which HI is supplied to the state in which LO is supplied. The second scan signal SC2(*n*) and the fourth scan signal SC4(*n*) are maintained in the state in which HI is supplied, and the first scan signal SC1(*n*) is maintained in the state in which LO is supplied. Therefore, the fifth transistor T5 is turned from the ON state to the OFF state, the first transistor T1, the second transistor T2, and the fourth transistor T4 are maintained in the ON state, and the third transistor T3 and the sixth transistor T6 are maintained in the OFF state.

As a result, the voltage supplied to the first node N1 maintains the voltage Vne, and the voltage supplied to the second node N2 maintains the voltage Vnc. When the fifth transistor T5 is turned off, the initialization voltage VINI is not supplied to the third node N3, and the third node N3 is released. In addition, since the second transistor T2 is in the ON state, the third node N3 is charged by the current Ion. When the voltage supplied to the third node N3 gradually rises from the voltage Vnd and the potential difference Vgs becomes the same as the threshold voltage VTH (1 V) of the second transistor T2, charging of the third node N3 is stopped. In this case, the voltage supplied to the third node N3 rises from the voltage Vnd toward a voltage Vnf, and becomes the voltage Vnf (0.4 V). That is, the voltage Vnf is a voltage at which the potential difference Vgs becomes the threshold voltage VTH (1 V) of the second transistor T2. In this case, the second transistor T2 is in the OFF state.

In the period at the end of the period PVH of the KthFRAME, the voltage VSIGL (0.2 V) is output to the image data signal SL(m), and the fourth scan signal SC4(*n*) changes from the state in which HI is supplied to the state in which LO is supplied. When the fourth scan signal SC4(*n*) is in the state in which LO is supplied, the second scan signal SC2(*n*) changes from the state in which HI is supplied to the state in which LO is supplied. The first scan signal SC1(*n*) and the third scan signal SC3(*n*) are maintained in the state in which LO is supplied. Therefore, the first transistor T1 and the fourth transistor T4 are turned from the ON state to the OFF state, and the second transistor T2, the third transistor T3, the fifth transistor T5, and the sixth transistor T6 are maintained in the OFF state.

As a result, the voltage supplied to the first node N1 maintains the voltage Vne, the voltage supplied to the second node N2 maintains the voltage Vnc, and the voltage supplied to the third node N3 maintains the voltage Vnf.

As described above, in the period PWR executed in parallel with the period PVH, the data signal VDATA is written to the pixel 180 (the pixel circuit 181). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the period PVH of the KthFRAME, the voltage VSIGL supplied to the first node N1 is supplied to the second node N2, and the pixel 180 emits light based on the voltage (VREF−VTH) based on the threshold voltage VTH supplied to the third node, and the potential difference Vgs (=VSIGL−(VREF−VTH)).

For example, in the light emission period PEM of the KthFRAME, the data signal VDATA supplied to the pixels other than the selected pixel 180 (pixel circuit 181) is supplied to the image data signal SL(m). In addition, the first scan signal SC1(*n*) changes from the state in which LO is supplied to the state in which HI is supplied, and the second scan signal SC2(*n*), the third scan signal SC3(*n*), and the fourth scan signal SC4(*n*) are maintained in the state in which LO is supplied. Therefore, the first transistor T1, the second transistor T2, the fourth transistor T4, and the fifth transistor T5 are maintained in the OFF state, and the third transistor T3 and the sixth transistor T6 are turned from the OFF state to the ON state.

As a result, the first node N1 and the second node N2 are conductive, the voltage supplied to the second node N2 gradually drops from the voltage Vnc toward the voltage Vne (0.2 V) to become the voltage Vne, the voltage supplied to the first node N1 maintains the voltage Vne (0.2 V), and the voltage supplied to the third node N3 maintains the voltage Vnf (0.4 V). In this case, the potential difference Vgs becomes 0.2 V (0.2 V−0.4 V) and the potential difference Vds becomes 7.6 V (8 V−0.4 V). That is, since the second transistor T2 is in the OFF state and the current Ion does not flow through the light-emitting element OLED, the light-emitting element OLED does not emit light. As a result, for example, the pixel 180 (the pixel circuit 181) emitting red light becomes black. In addition, similar to the pixel 180 emitting red light, the pixel 180 emitting blue light and the pixel 180 emitting green light do not emit light, so that three pixels using the pixel 180 emitting red light, the pixel 180 emitting blue light, and the pixel 180 emitting green light become black.

The display device 10 includes the capacitive element CS electrically connected between the first node N1 and the third node N3, the fourth transistor T4 for supplying the reference voltage VREF to the second node N2, the fifth transistor T5 for supplying the initialization voltage VINI to the third node N3, the second transistor T2 electrically connected to the second node N2, the third node N3, and the drive power line PVDD, and capable of supplying the current Ion corresponding to the potential difference Vgs between the second node N2 and the third node N3, the sixth transistor T6 electrically connected between the third node N3 and the second electrode 684 of the light-emitting element OLED, and the first transistor T1 for supplying the data signal VDATA equal to or higher than the voltage VSIGL and equal to or lower than the voltage VSIGH. In addition, the driving method of the display device 10 includes a configuration capable of independently controlling the supply of the reference voltage VREFF to the second node N2 by the fourth transistor T4, the supply of the initialization voltage VINI to the third node N3 by the fifth transistor T5, the supply of the current Ion corresponding to the potential difference Vgs between the voltage of the second node N2 and the voltage of the third node N3 by the second transistor T2, controlling conduction and non-conduction between the third node N3 and the second electrode 684 of the light-emitting element OLED by the sixth transistor T6, and the supply of the data signal VDATA equal to or higher than the voltage VSIGL and equal to or lower than the voltage VSIGH to the first node N1 by the first transistor T1.

The display device 10 includes the configuration described above, and is capable of making the third node N3 and the second electrode 684 of the light-emitting element OLED non-conductive by the sixth transistor T6, supplying the reference voltage VREF to the second node N2 (the gate electrode 622 of the second transistor T2) by the fourth transistor T4, supplying the initialization voltage VINI to the third node N3 (the first electrode 624 of the second transistor T2) by the fifth transistor T5, obtaining the threshold voltage VTH of the second transistor T2, and holding the charge equivalent to the threshold voltage VTH in the third node N3 (the first electrode 692 of the capacitive element CS).

Therefore, the display device 10 can disconnect the parasitic capacitance caused by the light-emitting element OLED from the third node N3 by making the third node N3 and the second electrode 684 of the light-emitting element OLED non-conductive by the sixth transistor T6. In addition, the display device 10 supplies the reference voltage VREF to the second node N2 (the gate electrode 622 of the second transistor T2) and supplies the initialization voltage VINI to the third node N3 (the first electrode 624 of the second transistor T2), and then can obtain the threshold voltage VTH of the second transistor T2 based on the current supplied from the drive voltage VDDEL supplied to the drive power line PVDD, so that the change in the potential (voltage) required to obtain the threshold voltage VTH can be reduced.

As a result, the display device 10 can reduce the time required for charging and discharging the capacitance by suppressing the parasitic capacitance, and can reduce the change in the potential (voltage) to obtain the threshold voltage VTH, so that the period PVH can be shortened as compared with a display device including the above-described configuration. Therefore, the display device 10 can be driven at a high speed.

In addition, the display device 10 can write the data signal VDATA to the first node N1 by the first transistor T1 to supply a voltage based on the data signal VDATA and the corrected threshold voltage VTH to the second node N2 (the gate electrode 622 of the second transistor T2). Therefore, the pixel 180 (the pixel circuit 181) can display an image according to the data signal VDATA and the voltage based on the corrected threshold voltage VTH obtained in the short-term PVH.

[1-5-2. Second Example of Driving Method of Display Device 10]

Figure 6:
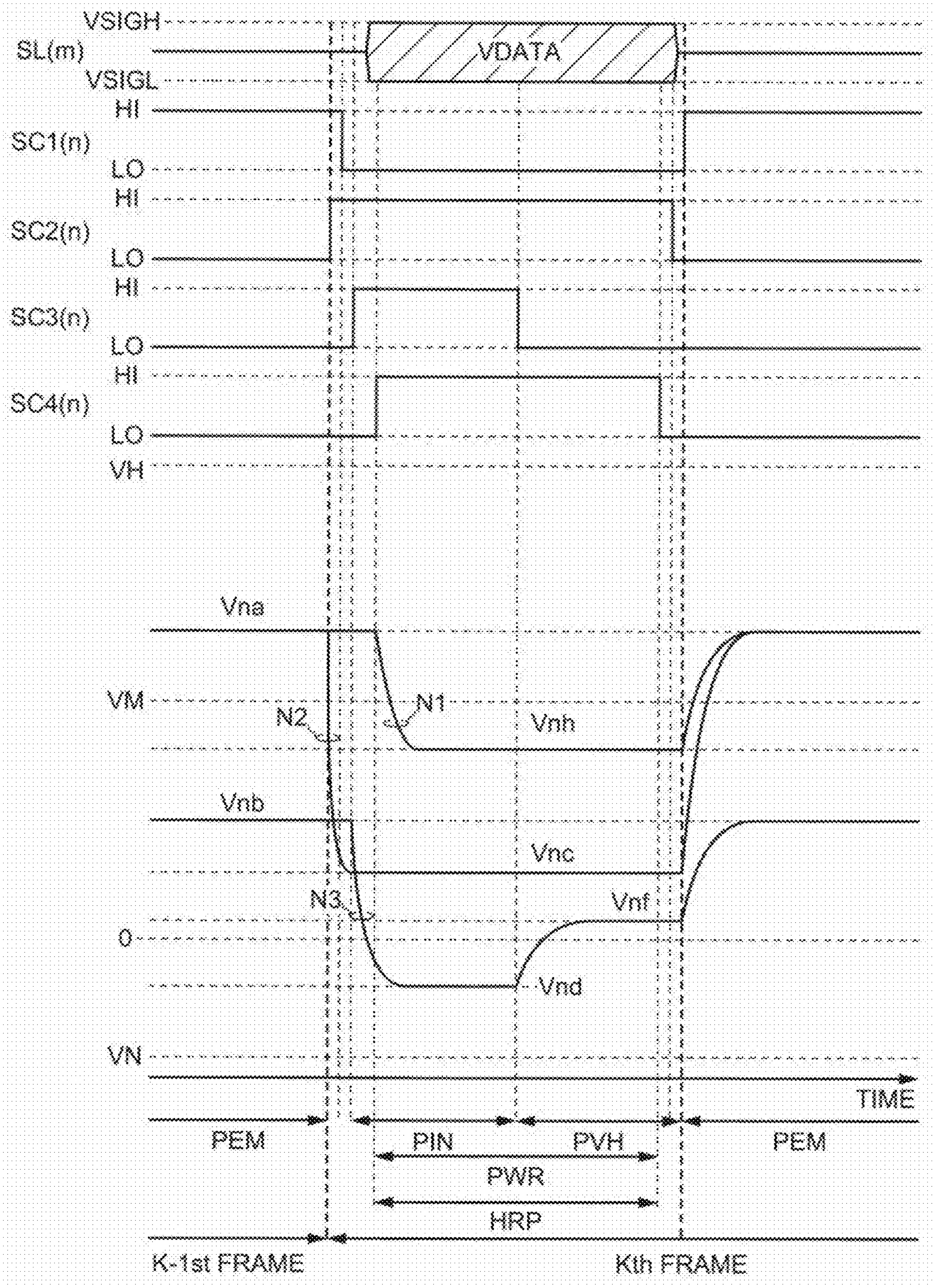
FIG. 6 is a timing chart of a display device according to the first embodiment of the present invention.

A second example of the driving method of the display device 10 will be described with reference to FIG. 6. The driving method shown in the second example includes the pixel 180 (the pixel circuit 181) displaying a white image based on the voltage VSIGH included in the data signal VDATA in the previous frame (K−1stFRAME) of the current frame (KthFRAME) and then the pixel 180 (the pixel circuit 181) displaying a white image based on the voltage VSIGH included in the data signal VDATA in the KthFRAME. In other words, the driving method shown in the second example includes displaying images of the same color (white) in consecutive frames. Configurations that are the same as or similar to those in FIG. 1 to FIG. 5 will be described as necessary.

The configurations of the first scan signal SC1(*n*), the second scan signal SC2(*n*), the third scan signal SC3(*n*), and the fourth scan signal SC4(*n*) are similar to those described in "1-5-1. First Example of Driving Method of Display Device 10". In addition, the voltages (potentials) and the like of the first node N1 in the light emission period PEM of the K−1stFRAME, the period (period PPIN) between the light emission period PEM of the K−1stFRAME and the period PIN of the KthFRAME following the light emission period PEM of the K−1stFRAME, the first period of the period PIN of the KthFRAME are similar to the configuration described in "1-5-1. First Example of Driving Method of Display Device 10. Further, the voltages (potentials) and the like of the second node N2, the third node N3 in the periods excluding the light emission period PEM of the KthFRAME are similar to the configuration described in "1-5-1. First Example of Driving Method of Display Device 10". Furthermore, the operations and the like of the transistors in the respective periods are similar to those described in "1-5-1. First Example of Driving Method of Display Device 10". Therefore, configurations and the like similar to those described in "1-5-1. First Example of Driving Method of Display Device 10" will be described as necessary. In addition, the data signal VDATA of VSIGH corresponding to white is supplied to the image data signal SL(m) in the period PWR of the KthFRAME (horizontal period HRP), and the data signal VDATA similar to the configuration described in "1-5-1. First Example of Driving Method of Display Device 10" is supplied in the periods other than the period PWR of the KthFRAME.

Similar to the configuration described in "1-5-1. First Example of Driving Method of Display Device 10", in the light emission period PEM of the K−1stFRAME, the current Ion flows from the drive power line PVDD to the light-emitting element OLED and the reference voltage line PVSS, and the light-emitting element OLED emits light.

Further, in the period PPIN following the light emission period PEM of the K−1stFRAME, the first period of the period PIN of the KthFRAME, and the period PIN, similar to the configuration described in "1-5-1. First Example of Driving Method of Display Device 10", the voltage supplied to the first node N1 and the voltage supplied to the third node N3 maintain the voltage Vna and the voltage supplied to the second node N2 becomes the voltage Vnc. In addition, the current Ion does not flow through the light-emitting element OLED, and the light-emitting element OLED does not emit light.

The voltage supplied to the first node N1 maintains the voltage Vna, the voltage supplied to the second node N2 maintains the voltage Vnc, and the voltage supplied to the third node N3 gradually drops from the voltage Vnb toward the voltage Vnd (initialization voltage VINI, −2 V) in the first period of the period PIN of the KthFRAME following the light emission period PEM of the K−1stFRAME. In addition, the current Ion does not flow through the light-emitting element OLED, and the light-emitting element OLED does not emit light.

The voltage VSIGH (Vnh, 4 V) is output to the image data signal SL(m) in the period PIN of the KthFRAME following the first period of the period PIN of the KthFRAME and in the period PWR executed in parallel (overlapping) with the period PIN. The voltage supplied to the first node N1 gradually drops from the voltage Vna toward the voltage Vnh (voltage VSIGH (4 V)). In addition, similar to the configuration described in "1-5-1. First Example of Driving Method of Display Device 10", the voltage supplied to the second node N2 maintains the voltage Vnc, the voltage supplied to the third node N3 gradually drops from the voltage Vnb toward the voltage Vnd to become the voltage Vnd, the potential difference Vgs becomes 3.4 V, and the current Ion flows through the second transistor T2, but the sixth transistor T6 is in the OFF state, so that the current Ion does not flow through the light-emitting element OLED, and the light-emitting element OLED does not emit light.

As a result, in the period PIN, the second node N2 is initialized by the reference voltage VREF (1.4 V) and the third node N3 is initialized by the initialization voltage VINI (−2 V). Further, in the period PWR executed in parallel with the period PIN, the data signal VDATA is written to the pixel 180 (the pixel circuit 181).

In the period PVH of the KthFRAME following the period PIN of the period KthFRAME and the period PWR executed in parallel (overlapping) with the period PVH, the image data signal SL(m) maintains the voltage VSIGH (Vnh, 4 V) and the voltage supplied to the first node N1 maintains the voltage Vnh. In addition, similar to the configuration described in "1-5-1. First Example of Driving Method of Display Device 10", the voltage supplied to the second node N2 maintains the voltage Vnc, the voltage supplied to the third node N3 gradually rises from the voltage Vnd to the voltage Vnf, the potential difference Vgs becomes the threshold voltage VTH (1 V) of the second transistor T2, and the second transistor T2 is in the OFF state.

In the period at the end of the period PVH of the KthFRAME, the image data signal SL(m) changes from the state in which the voltage VSIGH is supplied to the state in which the voltage of the data signal VDATA supplied to the pixels other than the selected pixel is supplied. The voltage supplied to the first node N1 maintains the voltage Vnh, the voltage supplied to the second node N2 maintains the voltage Vnc, and the voltage supplied to the third node N3 maintains the voltage Vnf.

As described above, in the period PWR executed in parallel with the period PVH, the data signal VDATA is written to the pixel 180 (the pixel circuit 181). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

The light emission period PEM of the KthFRAME following the period PVH of the KthFRAME is the period during which the pixel 180 emits light based on the voltage VSIGH supplied to the first node N1 and the potential difference Vsg between the voltage supplied to the second node N2 and the voltage supplied to the third node N3.

For example, the data signal VDATA output to the pixels other than the selected pixel is supplied to the image data signal SL(m) in the light emission period PEM of the KthFRAME. The third transistor T3 is in the conductive state, the first node N1 and the second node N2 are conductive, and the voltage of the second node N2 gradually rises from the voltage Vnc toward the voltage Vnh (4 V). In addition, since the second transistor T2 is in the conductive state and the sixth transistor T6 is in the conductive state, the current Ion flows from the drive power line PVDD to the light-emitting element OLED and the reference voltage line PVSS, and the voltage of the third node N3 rises to follow the rise of the voltage of the second node N2. Due to the rise in the voltage of the third node N3, the voltage of the second node N2 and the voltage of the first node N1 connected to the second node N2 further rise.

As a result, the voltage supplied to the first node N1 and the second node N2 becomes the voltage Vna, and the voltage supplied to the third node N3 becomes the voltage Vnb. In this case, the potential difference Vgs becomes 3.6 V (6.1 V−2.5 V) and the potential difference Vds becomes 5.5 V (8 V−2.5 V). That is, the potential difference Vgs is greater than the threshold voltage VTH (1 V). Therefore, the second transistor T2 is in the ON state, and the current Ion flows from the drive power line PVDD to the reference voltage line PVSS, so that the light-emitting element OLED emits light. For example, the pixel 180 (the pixel circuit 181) emits red light, and white light is emitted by three pixels using the pixel 180 emitting red light, the pixel 180 emitting blue light, and the pixel 180 emitting green light.

[1-5-3. Third Example of Driving Method of Display Device 10]

Figure 7:
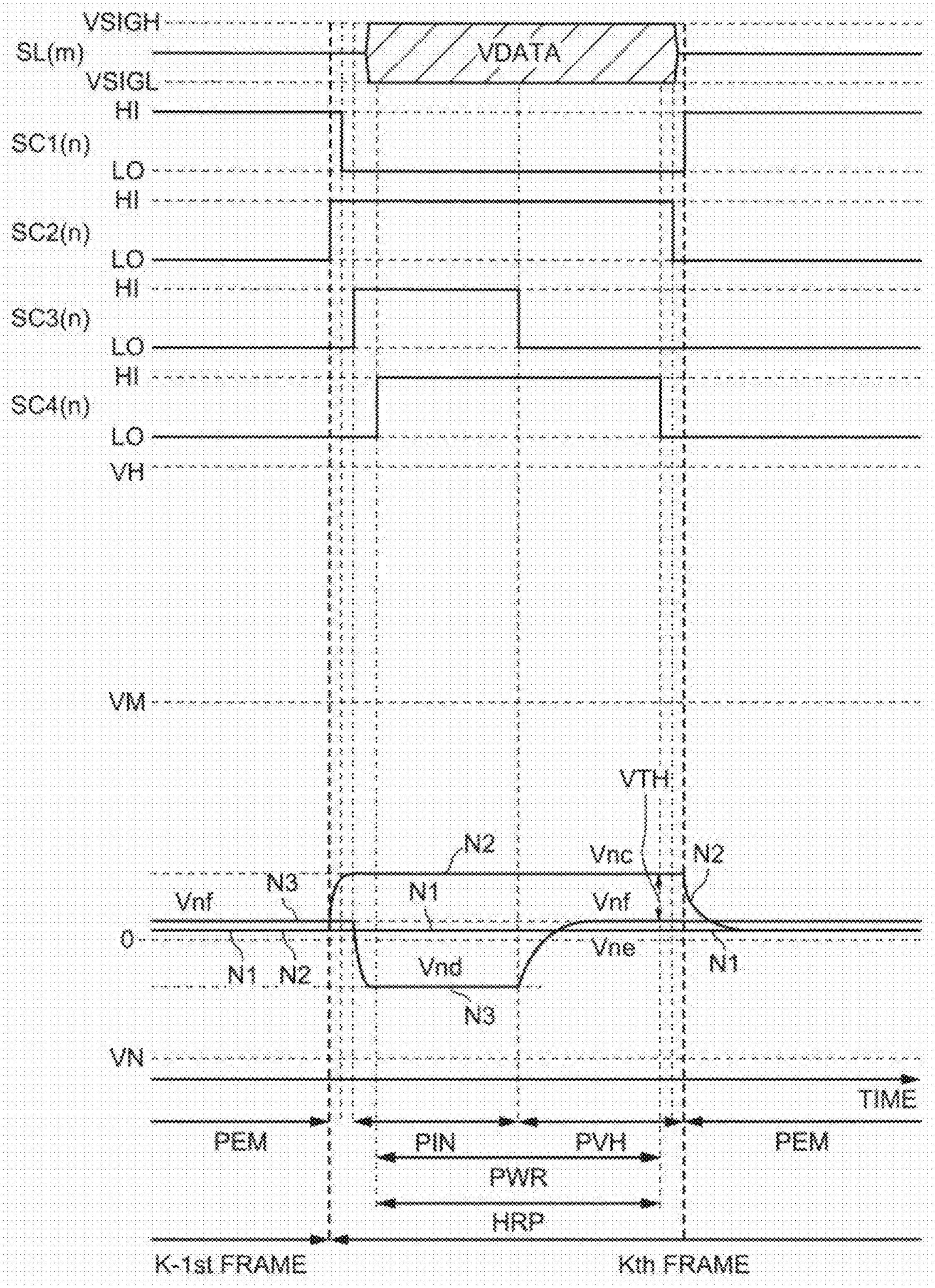
FIG. 7 is a timing chart of a display device according to the first embodiment of the present invention.

A third example of the driving method of the display device 10 will be described with reference to FIG. 7. The driving method shown in the third example of the driving method of the display device 10 includes the pixel 180 (the pixel circuit 181) displaying a black image based on the voltage VSIGL of the data signal VDATA in the previous frame (K−1stFRAME) of the current frame (KthFRAME) and then the pixel 180 (the pixel circuit 181) displaying a black image based on the voltage VSIGL of the data signal VDATA in the KthFRAME. In other words, the driving method shown in the third example includes displaying images of the same color (black) in consecutive frames. Configurations that are the same as or similar to those in FIG. 1 to FIG. 6 will be described as necessary.

The configurations of the first scan signal SC1(*n*), the second scan signal SC2(*n*), the third scan signal SC3(*n*), and the fourth scan signal SC4(*n*) are similar to those described in "1-5-1. First Example of Driving Method of Display Device 10". In addition, the voltage (potential) of the first node N1, the voltage (potential) of the second node N2, the voltage (potential) of the third node N3, and the like in the period PVH of the KthFRAME following the period PIN of the KthFRAME, the period PWR executed in parallel (overlapping) with the period PVH, the period at the end of the period PVH of the KthFRAME, and the light emission period PEM of the KthFRAME following the period PVH are similar to the configuration described in "1-5-1. First Example of Driving Method of Display Device 10". Further, the operations and the like of the transistors in the respective periods are similar to those described in "1-5-1. First Example of Driving Method of Display Device 10". Therefore, configurations similar to those described in "1-5-1. First Example of Driving Method of Display Device 10" will be described as necessary. In addition, the data signal VDATA of VSIGL corresponding to black is output to the image data signal SL(m) in the period PWR (horizontal period HRP) of the KthFRAME, and the data signal VDATA similar to the configuration described in "1-5-1. First Example of Driving Method of Display Device 10" is supplied in the periods other than the period PWR of the KthFRAME.

In the light emission period PEM of the K−1stFRAME, the voltage supplied to the first node N1 and the voltage supplied to the second node N2 are the voltage Vne (0.2 V), the voltage supplied to the third node N3 is the voltage Vnf (0.4 V), and the potential difference Vgs is −0.2 V. Therefore, the second transistor T2 is in the OFF state, the current Ion does not flow from the drive power line PVDD to the light-emitting element OLED and the reference voltage line PVSS, and the pixel 180 (the pixel circuit 181) emitting red light becomes black. In addition, similar to the pixel 180 emitting red light, since the pixel 180 emitting blue light and the pixel 180 emitting green light do not emit light, three pixels using the pixel 180 emitting red light, the pixel 180 emitting blue light, and the pixel 180 emitting green light become black.

In the period PPIN of the KthFRAME following the light emission period PEM of the K−1stFRAME, the voltage supplied to the first node N1 maintains the voltage Vne, and the voltage supplied to the third node N3 maintains the voltage Vnf. The fourth transistor T4 is turned on, and the voltage supplied to the second node N2 gradually rises toward the voltage Vnc (reference voltage VREF, 1.4 V) to become the voltage Vnc. Since the potential difference Vgs is 1 V (1.4 V−0.4 V) and is equal to or lower than the threshold voltage VTH, the second transistor T2 is in the OFF state, and the sixth transistor T6 is in the OFF state, the current Ion does not flow through the light-emitting element OLED, and the light-emitting element OLED does not emit light.

In the first period of the period PIN of the KthFRAME following the period PPIN of the KthFRAME, the voltage supplied to the first node N1 maintains the voltage Vne, the voltage supplied to the second node N2 maintains the voltage Vnc, and the voltage supplied to the third node N3 gradually drops from the voltage Vnf toward the voltage Vnd (initialization voltage VINI, −2 V) to become the voltage Vnd. The potential difference Vgs is 3.4 V (1.4 V−(−2 V)) and is equal to or higher than the threshold voltage VTH, and the second transistor T2 is in the conductive state, but since the sixth transistor T6 is in the OFF state, the current Ion does not flow through the light-emitting element OLED, and the light-emitting element OLED does not emit light.

In the period PIN of the KthFRAME following the first period of the period PIN of the KthFRAME and the period PWR executed in parallel (overlapping) with the period PIN, the voltage VSIGL (voltage Vne, 0.2 V) is output to the image data signal SL(m). The voltage VSIGL (0.2 V) is supplied to the first node N1, and the voltage supplied to the first node N1 maintains the voltage Vne. In addition, the voltage supplied to the second node N2 maintains the voltage Vnc, and the voltage supplied to the third node N3 maintains the voltage Vnd. Similar to the first period of the period PIN of the KthFRAME, the potential difference Vgs is 3.4 V and the second transistor T2 is in the ON state, but since the sixth transistor T6 is in the OFF state, the current Ion does not flow through the light-emitting element OLED, and the light-emitting element OLED does not emit light.

As described above, in the period PIN, the second node N2 is initialized by the reference voltage VREF (1.4 V) and the third node N3 is initialized by the initialization voltage VINI (−2 V). Further, in the period PWR executed in parallel with the period PIN, the data signal VDATA is written to the pixel 180 (the pixel circuit 181).

In the period PVH of the KthFRAME following the period PIN of the KthFRAME and the period PWR executed in parallel (overlapping) with the period PVH, similar to the configuration described in "1-5-1. First Example of Driving Method of Display Device 10", the voltage supplied to the first node N1 maintains the voltage Vne, the voltage supplied to the second node N2 maintains the voltage Vnc, and the voltage supplied to the third node N3 rises from the voltage Vnd toward the voltage Vnf to become the voltage Vnf (0.4 V), and the second transistor T2 is in the OFF state.

In the period at the end of the period PVH of the KthFRAME, similar to the configuration described in "1-5-1. First Example of Driving Method of Display Device 10", the voltage supplied to the first node N1 maintains the voltage Vne, the voltage supplied to the second node N2 maintains the voltage Vnc, and the voltage supplied to the third node N3 maintains the voltage Vnf.

Therefore, the data signal VDATA is written to the pixel 180 (the pixel circuit 181) in the period PWR executed in parallel with the period PVH. Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the period PVH of the KthFRAME, similar to the configuration described in "1-5-1. First Example of Driving Method of Display Device 10", the voltage supplied to the second node N2 becomes the voltage Vne, the voltage supplied to the first node N1 maintains the voltage Vne, and the voltage supplied to the third node N3 maintains the voltage Vnf. Since the second transistor T2 is in the OFF state and the current Ion does not flow through the light-emitting element OLED, the light-emitting element OLED does not emit light. As a result, three pixels using the pixel 180 emitting red light, the pixel 180 emitting blue light, and the pixel 180 emitting green light become black.

[1-5-4. Fourth Example of Driving Method of Display Device 10]

Figure 8:
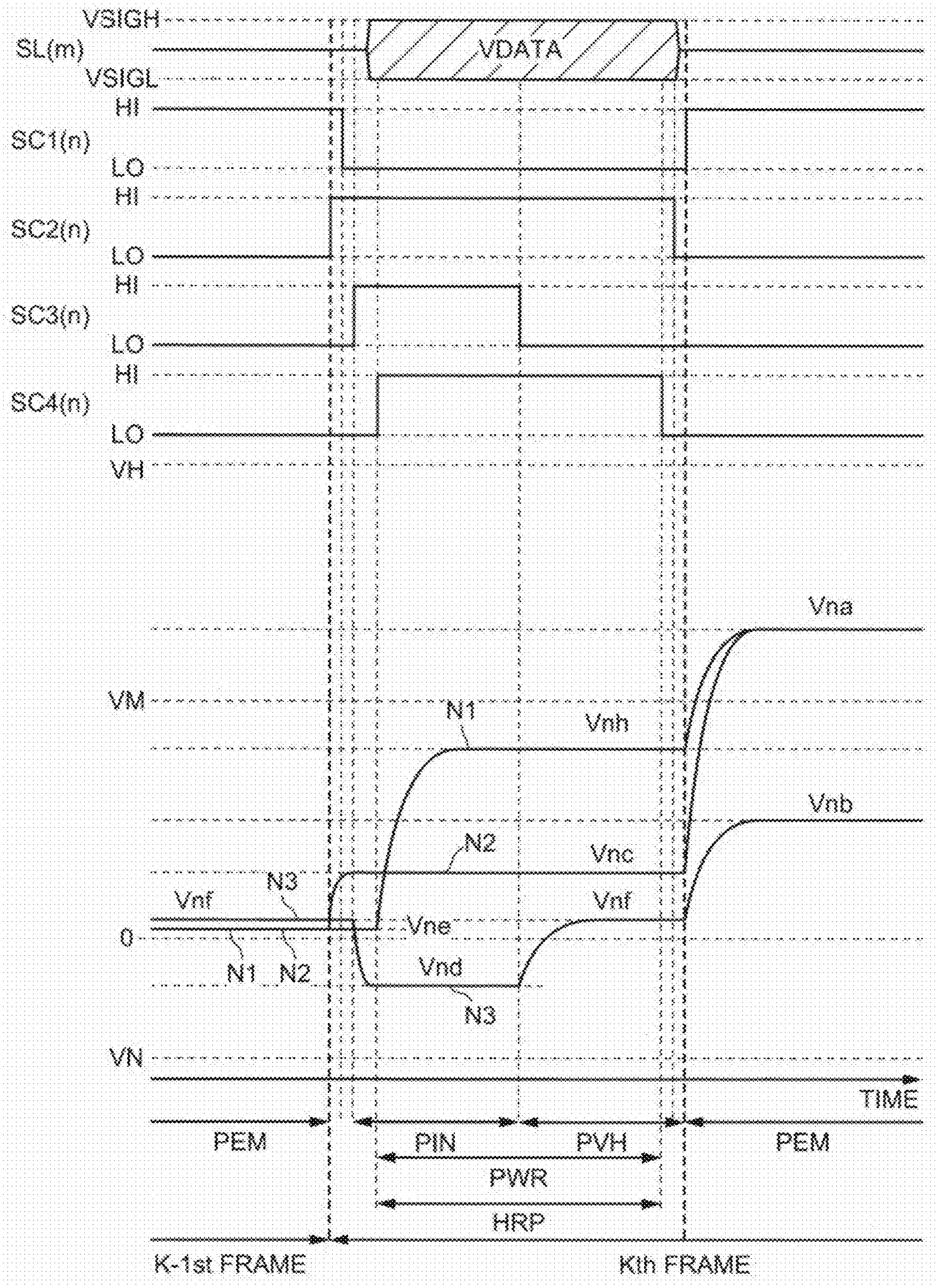
FIG. 8 is a timing chart of a display device according to the first embodiment of the present invention.

A fourth example of the driving method of the display device 10 will be described with reference to FIG. 8. The driving method shown in the fourth example includes the pixel 180 (pixel circuit 181) displaying a black image based on the voltage VSIGL of the data signal VDATA in the previous frame (K−1stFRAME) of the current frame (KthFRAME) and then the pixel 180 (pixel circuit 181) displaying a white image based on the voltage VSIGH of the data signal VDATA in the KthFRAME. In other words, the driving method shown in the fourth example includes displaying images of different colors in successive frames. Configurations that are the same as or similar to those in FIG. 1 to FIG. 11 will be described as necessary.

Configurations of the first scan signal SC1(*n*), the second scan signal SC2(*n*), the third scan signal SC3(*n*), and the fourth scan signal SC4(*n*) are similar to those described in "1-5-1. First Example of Driving Method of Display Device 10". The voltages (potentials) and the like of the first node N1 in the periods other than the period PIN of the KthFRAME following the first period of the period PIN of the KthFRAME and the period PWR executed in parallel (overlapping) with the period PIN are similar to the configuration described in "1-5-3. Third Example of Driving Method of Display Device 10" or the configuration described in "1-5-1. First Example of Driving Method of Display Device 10". In addition, the voltages (potentials) and the like of the first node N1, the second node N2, and the third node N3 in the light emission period PEM of the KthFRAME are similar to the configuration described in "1-5-2. Second Example of Driving Method of Display Device 10". Further, the voltages (potentials) and the like of the second node N2 and the third node N3 in the periods other than the light emission period PEM of the KthFRAME are similar to the configuration described in "1-5-3. Third Example of Driving Method of Display Device 10". In addition, the operations and the like of the transistors in the respective periods are similar to the configuration described in "1-5-1. First Example of Driving Method of Display Device 10". Therefore, configurations and the like similar to those described in "1-5-1. First Example of Driving Method of Display Device 10" to "1-5-3. Third Example of Driving Method of Display Device 10" will be described as necessary.

In the light emission period PEM of the K−1stFRAME, the pixel 180 (the pixel circuit 181) is black similar to the configuration described in "1-5-3. Third Example of Driving Method of Display Device 10".

In the period PPIN of the KthFRAME following the light emission period PEM of the K−1stFRAME, similar to the configuration described in "1-5-3. Third Example of Driving Method of Display Device 10", the voltage supplied to the first node N1 maintains the voltage Vne, the voltage supplied to the second node N2 becomes the voltage Vnc (reference voltage VREF, 1.4 V), and the voltage supplied to the third node N3 maintains the voltage Vnf. Since the second transistor T2 is in the OFF state and the sixth transistor T6 is in the OFF state, the current Ion does not flow through the light-emitting element OLED, and the light-emitting element OLED does not emit light.

In first period of the period PIN of the KthFRAME following the period PPIN of the KthFRAME, similar to "1-5-3. Third Example of Driving Method of Display Device 10", the voltage supplied to the first node N1 maintains the voltage Vne, the voltage supplied to the second node N2 maintains the voltage Vnc, and the voltage supplied to the third node N3 becomes the voltage Vnd. The second transistor T2 is in the conductive state, but the sixth transistor T6 is in the OFF state, so that the current Ion does not flow through the light-emitting element OLED, and the light-emitting element OLED does not emit light.

In the period PIN of the KthFRAME following the first period of the period PIN of the KthFRAME and the period PWR executed in parallel (overlapping) with the period PIN, the voltage VSIGH (Vnh, 4 V) is output to the image data signal SL(m). The voltage supplied to the first node N1 gradually rises from the voltage Vne toward the voltage Vnh (voltage VSIGH (4 V)) to become the voltage Vnh. In addition, similar to the configuration described in "1-5-2. Second Example of Driving Method of Display Device 10", the voltage supplied to the second node N2 maintains the voltage Vnc, the voltage supplied to the third node N3 changes from the voltage Vnb to the voltage Vnd, the potential difference Vgs becomes 3.4 V, the potential difference Vds becomes 10 V, the second transistor T2 is in the ON state, but the sixth transistor T6 is in the OFF state, so that the current Ion does not flow through the light-emitting element OLED, and the light-emitting element OLED does not emit.

As a result, in the period PIN, the second node N2 is initialized by the reference voltage VREF (1.4 V) and the third node N3 is initialized by the initialization voltage VINI (−2 V). Further, in the period PWR executed in parallel with the period PIN, the data signal VDATA is written to the pixel 180 (the pixel circuit 181).

In the period PVH of the KthFRAME following the period PIN of the KthFRAME and the period PWR executed in parallel (overlapping) with the period PVH, similar to the configuration described in "1-5-2. Second Example of Driving Method of Display Device 10", the voltage supplied to the first node N1 maintains the voltage Vnh, the voltage supplied to the second node N2 maintains the voltage Vnc, the voltage supplied to the third node N3 gradually rises from the voltage Vnd to the voltage Vnf, the potential difference Vgs becomes the threshold voltage VTH (1 V) of the second transistor T2, and the second transistor T2 is in the OFF state.

In the period at the end of the period PVH of the KthFRAME, similar to the configuration described in "1-5-2. Second Example of Driving Method of Display Device 10", the voltage supplied to the first node N1 maintains the voltage Vnh, the voltage supplied to the second node N2 maintains the voltage Vnc, and the voltage supplied to the third node N3 maintains the voltage Vnf.

As described above, in the period PWR executed in parallel with the period PVH, the data signal VDATA is written to the pixel 180 (the pixel circuit 181). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the period PVH of the KthFRAME, similar to the configuration described in "1-5-2. Second Example of Driving Method of Display Device 10", the voltage supplied to the first node N1 and the second node N2 becomes the voltage Vna, and the voltage supplied to the third node N3 becomes the voltage Vnb. Since the potential difference Vgs is greater than the threshold voltage VTH, the second transistor T2 is in the ON state, and the current Ion flows from the drive power line PVDD to the reference voltage line PVSS, so that the light-emitting element OLED emits light. For example, the pixel 180 (the pixel circuit 181) emits red light, and white light is emitted by three pixels using the pixel 180 emitting red light, the pixel 180 emitting blue light, and the pixel 180 emitting green light.

[1-6. Cross-Sectional Structure of Pixel 180]

Figure 9:
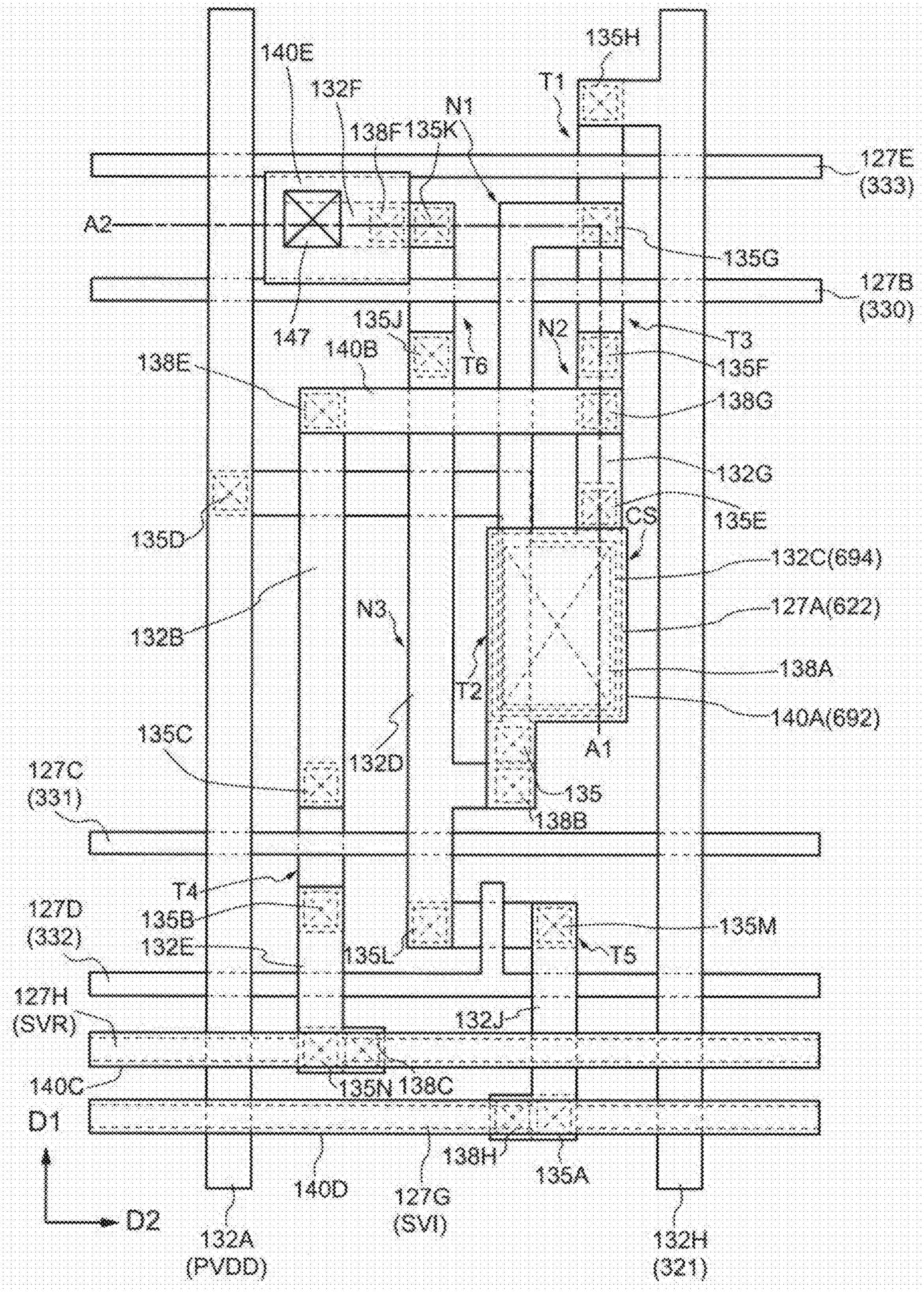
FIG. 9 is a layout diagram of a pixel according to the first embodiment of the present invention.
Figure 10:
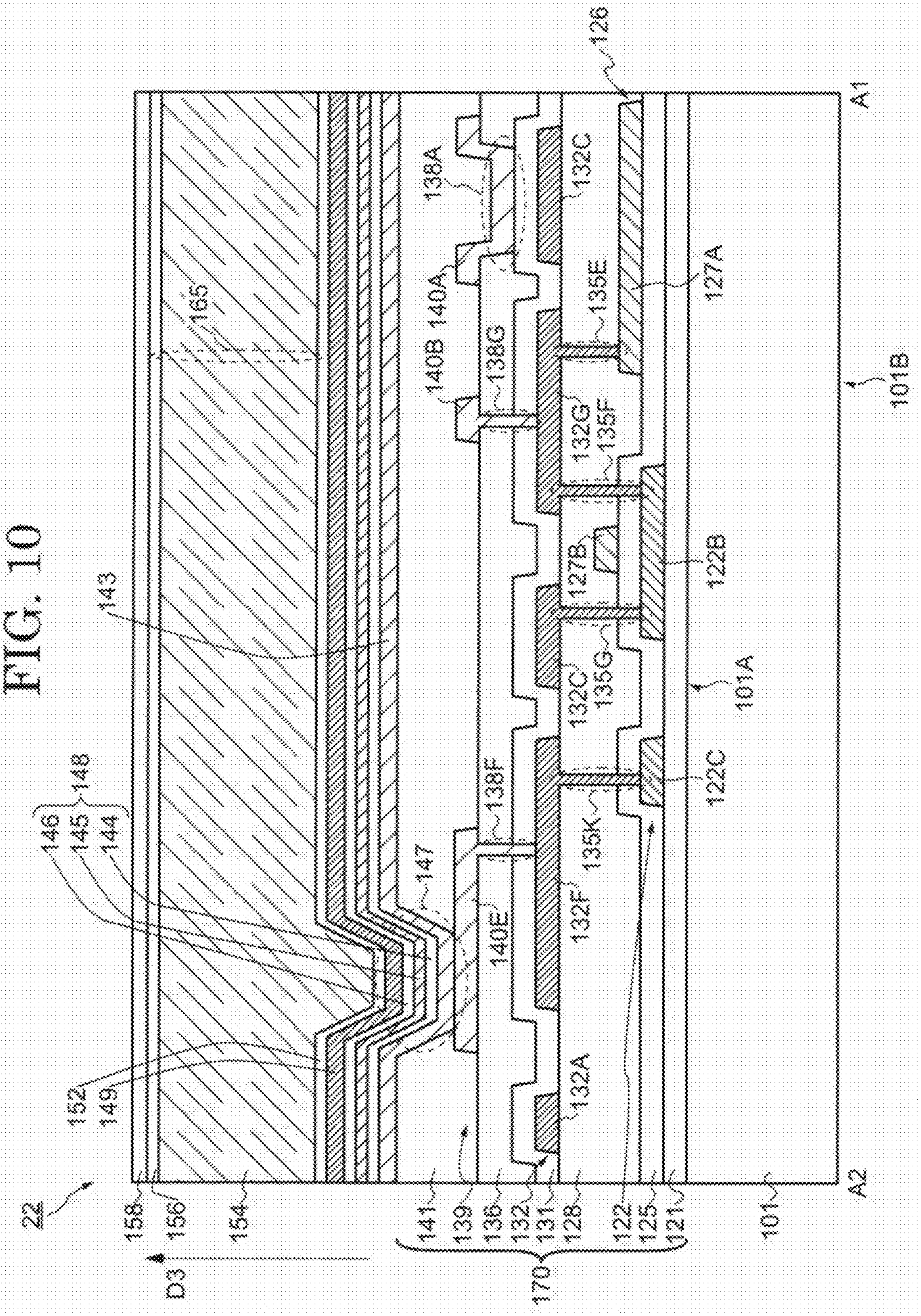
FIG. 10 is an end view showing an end face cut along a line A1-A2 in the layout shown in FIG. 9.
Figure 12:
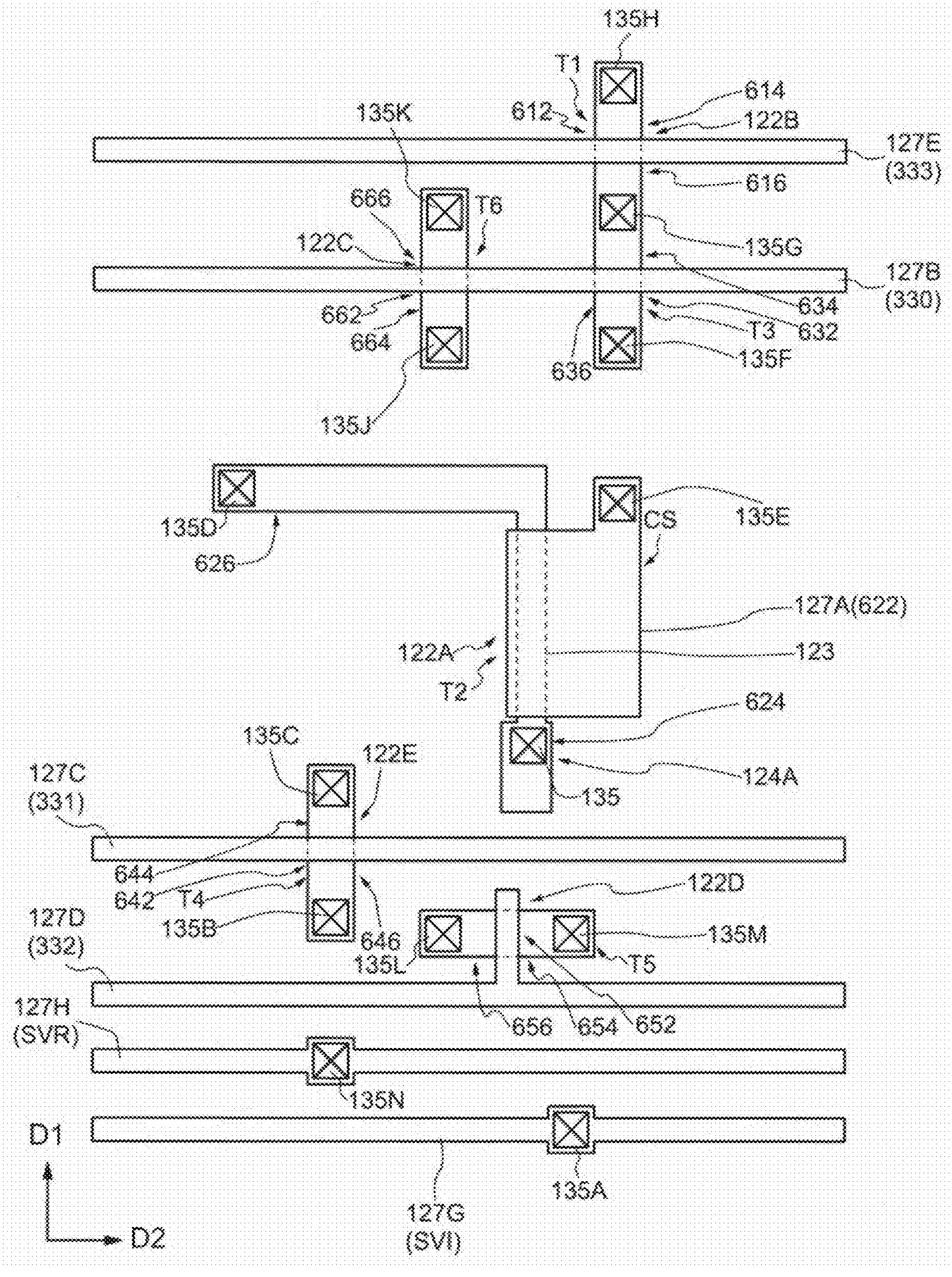
FIG. 12 is a layout diagram of a pixel according to the first embodiment of the present invention.
Figure 13:
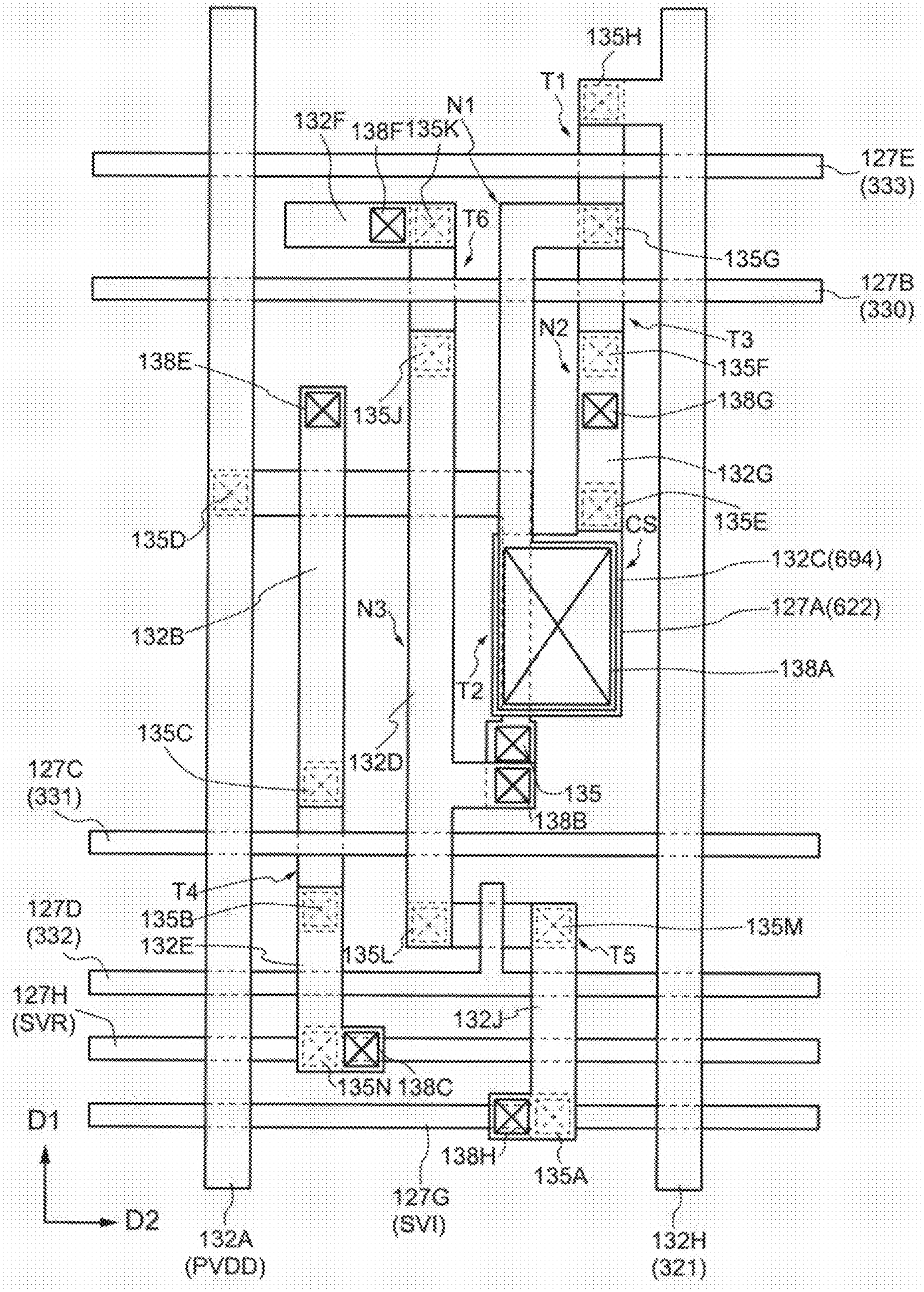
FIG. 13 is a layout diagram of a pixel according to the first embodiment of the present invention.

A cross-sectional structure of the pixel 180 will be described with reference to FIG. 9 and FIG. 10. FIG. 9, FIG. 12, and FIG. 13 are layout diagrams of the pixel 180. FIG. 10 is an end view showing an end face cut along a line A1-A2 in the layout shown in FIG. 9. The layout of the pixel 180 shown in FIG. 9 and the end face of the pixel 180 shown in FIG. 10 are examples, and the planar layout and the end face of the pixel 180 are not limited to the examples shown in FIG. 9 and FIG. 10. Configurations that are the same as or similar to those in FIG. 1 to FIG. 8 will be described as necessary.

For example, the end face of the pixel 180 shown in FIG. 10 is an end face along a second wiring 140A, a gate wiring 127A, a first wiring 132C, an organic insulating film opening 138A for the capacitive element CS, a first wiring 132G, a first contact hole opening 135E, a second wiring 140B, a second contact hole opening 138G, a first contact hole opening 135F, a the semiconductor layer 122B of the third transistor T3, a gate wiring 127B, a first contact hole opening 135G, a the semiconductor layer 122C of the sixth transistor T6, a first contact hole opening 135K, a second contact hole opening 138F, a second wiring 140E, a contact hole opening 147 for an anode electrode, and a first wiring 132A.

A substrate 101 includes a first surface 101A and a second surface 101B opposite the first surface 101A. A semiconductor layer 122 is provided on the first face 101A of the substrate 101 via an underlayer 121. The semiconductor layer 122 includes a semiconductor layer 122A, and the semiconductor layer 122A includes a channel region 123 and an impurity region 124A (see FIG. 12). For example, the impurity region is referred to as a source region or a drain region. In addition, for example, the second transistor T2 includes the semiconductor layer 122A, and the first electrode 624 and the second electrode 626 include the impurity region 124A. In other words, the semiconductor layer 122A includes the channel region of the second transistor T2. Similar to the semiconductor layer 122A, for example, the third transistor T3 includes the semiconductor layer 122B, the first electrode 634 and the second electrode 636 include the impurity region, the sixth transistor T6 includes the semiconductor layer 122C, and the first electrode 664 and the second electrode 666 include the impurity region. In other words, the semiconductor layer 122B includes the channel region of the third transistor T3, and the semiconductor layer 122C includes the channel region of the sixth transistor T6.

A gate insulating layer 125, a conductive layer 126, an insulating layer 128, and a conductive layer 132 are provided in this order on the semiconductor layer 122. The conductive layer 126 includes the gate wiring 127A (the gate electrode 622) and the gate wiring 127B (the gate electrode 632). The conductive layer 132 includes the first wiring 132C (the second electrode 694 of the capacitive element CS), the first wiring 132G, a first wiring 132F, and the first wiring 132A (the drive power line PVDD). In addition, a region where the conductive layer 126 and the semiconductor layer 122 overlap is the channel region. In other words, the region where the gate electrode and the semiconductor layer of each transistor overlap is the channel region.

Each transistor of the pixel 180 is formed using the semiconductor layer 122 (the channel region 123 and the impurity region 124A), the gate insulating layer 125, and the conductive layer 126 (e.g., the gate wiring 127A).

The first contact hole opening 135E reaching the conductive layer 126 (in this case, the gate wiring 127A) is provided in the insulating layer 128. In addition, the first contact hole openings 135F, 135G, and 135K reaching the semiconductor layer 122 are provided in the gate insulating layer 125 and the insulating layer 128. The first contact hole opening 135E exposes the conductive layer 126. The first contact hole openings 135F and 135G expose the semiconductor layer 122B. For example, the first wiring 132G electrically connects the semiconductor layer 122B and the gate wiring 127A by the first contact hole openings 135F and 135E. The first wiring 132C is electrically connected to the semiconductor layer 122B by the first contact hole opening 135G. That is, an opening (not shown) reaching the conductive layer 126 or the semiconductor layer 122 may be provided in the insulating layer 128.

An insulating layer 131 is provided to cover the conductive layer 132 and the insulating layer 128 where the conductive layer 132 is not exposed. An insulating layer 136 is provided to cover the insulating layer 131.

A second contact hole opening is provided in the insulating layer 131 and the insulating layer 136. For example, the second contact hole opening includes the second contact hole openings 138G and 138F. The organic insulating film opening 138A for the capacitive element CS is provided in the insulating layer 136. A conductive layer 139 is provided on the insulating layer 136, in the organic insulating film opening 138A for the capacitive element CS, and the second contact hole openings 138G and 138F. The conductive layer 139 includes the second wiring 140A (the first electrode 692 of the capacitive element CS), the second wiring 140B and the second wiring 140E (the second electrode 684 of the light-emitting element OLED and the first electrode 664 of the sixth transistor T6). The second contact hole opening 138F exposes the conductive layer 132 (e.g., the first wiring 132G). The second contact hole opening 138G electrically connects the second wiring 140B and the first wiring 132G, and the second contact hole opening 138F electrically connects the second wiring 140E and the first wiring 132F. The organic insulating film opening 138A for the capacitive element CS exposes the insulating layer 131. For example, the capacitive element CS is formed using the insulating layer 131 as a dielectric and using the first wiring 132C (the second electrode 694) and the second wiring 140A (the first electrode 692). In addition, for example, the second wiring 140A also serves as a pixel electrode. Although not shown, for example, the second contact hole opening 138 exposes a part of a plurality of terminals (not shown) included in the terminal section 150. Some of the exposed terminals are electrically connected to the FPC 200 using a conductive film such as an anisotropic conductive film (not shown). Further, the pixel electrode is provided independently for each pixel.

An insulating layer 141 is provided to cover the conductive layer 139.

The underlayer 121, the semiconductor layer 122, the gate insulating layer 125, the conductive layer 126, the insulating layer 128, the conductive layer 132, the insulating layer 131, the insulating layer 136, the conductive layer 139, and the insulating layer 141 are collectively referred to as an array section 170.

Next, the layers above the insulating layer 141 will be described. The contact hole opening 147 for an anode electrode is provided in the insulating layer 141. The contact hole opening 147 for an anode electrode exposes the conductive layer 139 (e.g., the second wiring 140A).

An anode electrode 143 is provided to cover the exposed conductive layer 139, the contact hole opening 147 for an anode electrode, and the insulating layer 141. A functional layer 148 is provided on the anode electrode 143. A common electrode 149 is provided on the functional layer 148 to cover the functional layer 148. The common electrode 149 is electrically connected to a cathode electrode (a first electrode 32 of the light-emitting element OLED). In this case, the light-emitting element OLED is composed of the anode electrode 143, the functional layer 148, and the common electrode 149 (cathode electrode).

The configuration of the functional layer 148 can be selected as appropriate. For example, the functional layer 148 may be configured by combining a carrier injection layer, a carrier transport layer, a light-emitting layer, a carrier blocking layer, an exciton blocking layer, and the like. For example, the functional layer 148 shown in FIG. 10 includes a first layer 144, a second layer 145, and a third layer 146. For example, the first layer 144 is a carrier (hole) injection and transport layer, the second layer 145 is a light-emitting layer, and the third layer 146 is a carrier (electron) injection and transport layer. For example, similar to the pixel electrode, the functional layer 148 is provided independently for each pixel.

A sealing film 165 is provided on the common electrode 149. For example, the sealing film 165 includes a first inorganic insulating layer 152, an organic insulating layer 154, and a second inorganic insulating layer 156. In addition, the first inorganic insulating layer 152 and the second inorganic insulating layer 156 are formed to cover at least the display region 22. A cover film 158 is arranged on the second inorganic insulating layer 156.

For example, the first layer 144, the second layer 145 (light-emitting layer), the third layer 146, and the common electrode 149 included in the functional layer 148 are not arranged on the IC chip 110 and the control circuit 120. The sealing film 165 and the cover film 158 are arranged on the IC chip 110 and the control circuit 120. The sealing film 165 and the cover film 158 suppress impurities (water, oxygen, etc.) from entering the light-emitting element OLED, the transistors, and the like from outside the display device 10.

Common metal materials are used as the conductive layer 126, the conductive layer 132, the conductive layer 139, and the common electrode 149. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and an alloy or compound thereof are used as the common metal material.

For example, the semiconductor layer 122 may contain crystalline silicon and may contain a metal oxide. The semiconductor layer 122 in the display device 10 contains a metal oxide.

A common insulating material can be used as a material for forming the underlayer 121, the gate insulating layer 125, the insulating layer 131, the first inorganic insulating layer 152, and the second inorganic insulating layer 156. For example, inorganic insulating layers such as silicon oxide ($SiO_x$), silicon oxynitride ($SiO_xN_y$), silicon nitride ($SiN_x$), and silicon nitride oxide ($SiN_xO_y$) are used as the insulating layers.

For example, an organic compound material having excellent surface-flatness can be used as a material for forming the insulating layer 128, the insulating layer 136, the insulating layer 141, and the organic insulating layer 154. The insulating layer 128, the insulating layer 136, and the insulating layer 141 may be referred to as organic insulating layers.

[1-7. Method for Manufacturing Display Device 10]

A method for manufacturing the display device 10 (pixel 180) will be described with reference to FIG. 9 to FIG. 13. Configurations that are the same as or similar to those in FIG. 1 to FIG. 12 will be described as necessary. For example, the semiconductor layer in the manufacturing method shown in FIG. 13 is an oxide semiconductor layer formed using an oxide semiconductor.

As shown in FIG. 10, when manufacturing of the display device 10 (pixel 180) is started, the underlayer 121 is formed on the first surface 101A of the substrate 101.

Figure 11:
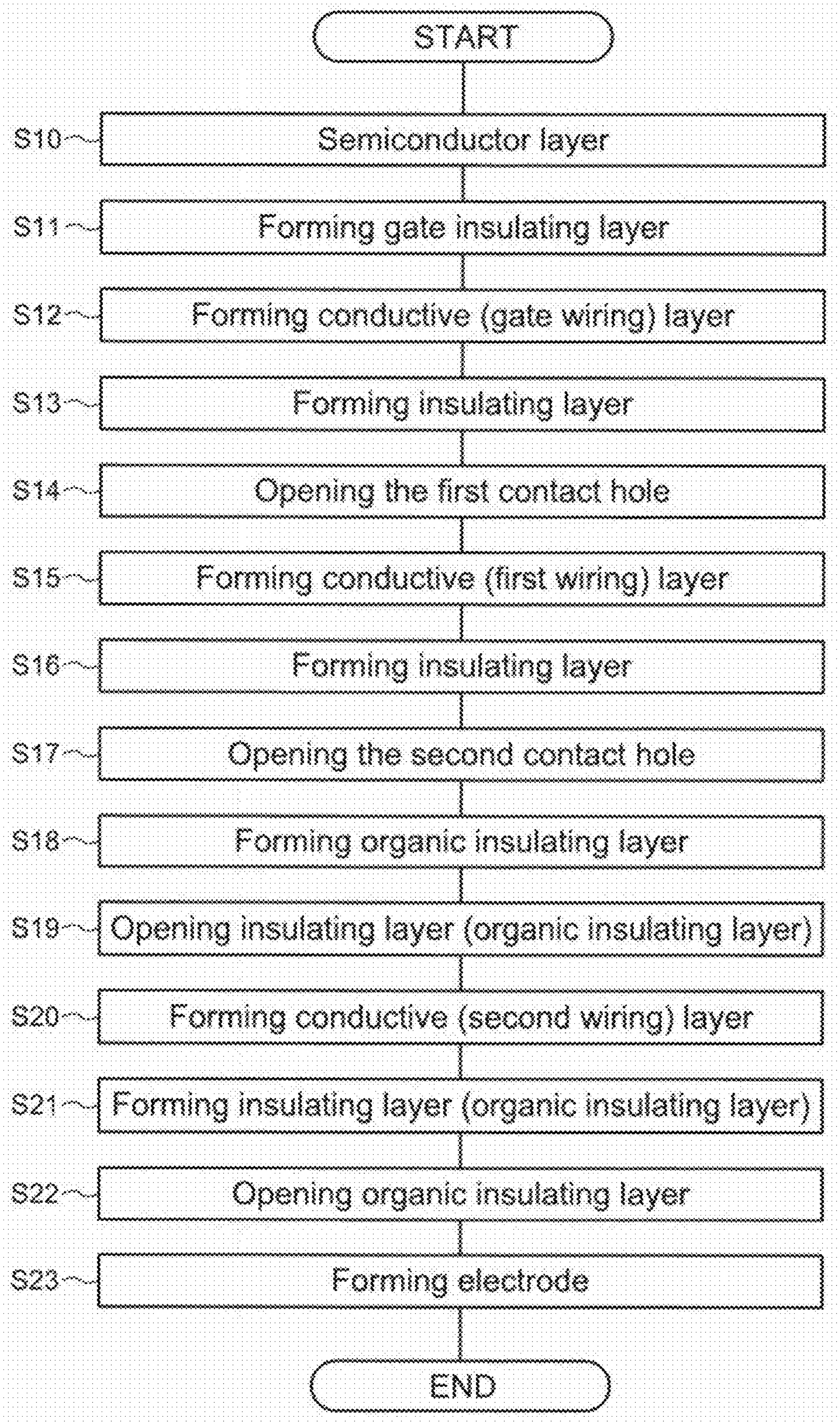
FIG. 11 is a sequence diagram showing a method for manufacturing a display device according to the first embodiment of the present invention.

As shown in FIG. 9, FIG. 10 or FIG. 12, the semiconductor layer 122 is formed on the underlayer 121 (step 10 (S10) of FIG. 11). The semiconductor layer 122 includes the semiconductor layers 122A, 122B, 122C, 122D, and 122E. The semiconductor layer 122A is the semiconductor layer of the second transistor T2. The semiconductor layer 122B serves as both the semiconductor layer of the first transistor T1 and the semiconductor layer of the third transistor T3. The semiconductor layer 122C is the semiconductor layer of the fourth transistor T4. The semiconductor layer 122D is the semiconductor layer of the fifth transistor T5. The semiconductor layer 122E is the semiconductor layer of the sixth transistor T5. In other words, the semiconductor layer 122B includes the channel region of the first transistor T1 and the channel region of the third transistor T3, the semiconductor layer 122C includes the channel region of the fourth transistor T4, the semiconductor layer 122D includes the channel region of the fifth transistor T5, and the semiconductor layer 122E includes the channel region of the sixth transistor T6.

The gate insulating layer 125 (FIG. 9, FIG. 10, FIG. 12, FIG. 13) is formed on the semiconductor layer 122 and on the underlayer 121 where the semiconductor layer 122 is not formed (step 11 (S11) of FIG. 11).

The conductive layer 126 (FIG. 9, FIG. 10, FIG. 12, FIG. 13) is formed on the gate insulating layer 125 (step 12 (S12) of FIG. 11). As shown in FIG. 9, FIG. 10, FIG. 12, or FIG. 13, the conductive layer 126 includes the gate wiring 127A (the gate electrode 622), the gate wiring 127B (the scan signal line 330), a gate wiring 127C (the scan signal line 331), a gate wiring 127D (the scan signal line 332), a gate wiring 127E (the scan signal line 333), a gate wiring 127H (the reference voltage power line SVR), and a gate wiring 127G (the initialization voltage power line SVI). The gate wiring 127B (the scan signal line 333) includes the gate electrodes 632 and 662, the gate wiring 127C (the scan signal line 331) includes the gate electrode 642, the gate wiring 127D (the scan signal line 332) includes the gate electrode 652, and the gate wiring 127E (the scan signal line 333) includes the gate electrode 612.

A region where the gate electrode 622 of the second transistor T2 and the semiconductor layer 122A overlap is the channel region 123, and the channel region 123 corresponds to a channel length of the second transistor T2. Similar to the second transistor T2, a region where the gate electrode 612 of the first transistor T1 and the semiconductor layer 122B overlap is the channel region of the first transistor T1 and corresponds to the channel length. Similar to the second transistor T2, in the transistors other than the second transistor T2 and the first transistor T1, the region where the gate electrode and the semiconductor layer overlap is the channel region of the transistors and corresponds to the channel length.

As shown in FIG. 12, in a plan view, the channel region 123 of the second transistor T2 is larger (longer) than the channel region of the first transistor T1, the channel region of the third transistor T3, the channel region of the fourth transistor T4, the channel region of the fifth transistor T5, and the channel region of the sixth transistor T6.

The second transistor T2 operates in the saturated region. Therefore, the kink effect in the second transistor T2 needs to be suppressed, and the resistance of the second transistor T2 to hot carriers needs to be higher than the resistance of the other transistors in the pixel 180 to hot carriers. To suppress the kink effect and ensure reliability (hot carrier resistance), the channel length of the second transistor T2 is longer than the channel length of the other transistors in the pixel 180. That is, the channel length of the second transistor T2 is longer than the channel length of the first transistor T1, the channel length of the third transistor T3, the channel length of the fourth transistor T4, the channel length of the fifth transistor T5, and the channel length of the sixth transistor T6.

The insulating layer 128 (FIG. 9, FIG. 10, FIG. 12, FIG. 13) is formed on the conductive layer 126 and on the gate insulating layer 125 where the conductive layer 126 is not formed (step 13 (S13) of FIG. 11).

As shown in FIG. 12, the first contact hole openings 135, 135A, 135B, 135C, 135D, 135E, 135F, 135G, 135H, 135J, 135K, 135L, 135M, and 135N are opened (step 14 (S14 in FIG. 11). Each opening opens the gate insulating layer 125 or the gate insulating layer 125 and the insulating layer 128 to expose wiring, semiconductor layers or electrodes corresponding to each opening. For example, the first contact hole opening 135 exposes the semiconductor layer 122A and the first contact hole opening 135A exposes the gate wiring 127G. Other openings also expose the corresponding wirings, semiconductor layers or electrodes.

The conductive layer 132 (FIG. 9, FIG. 10, FIG. 12, FIG. 13) is formed on the insulating layer 128 (step 15 (S15) of FIG. 11). As shown in FIG. 9 or FIG. 13, the conductive layer 132 includes the first wiring 132A (the drive power line PVDD), a first wiring 132B, the first wiring 132C (the second electrode 694), a first wiring 132D, a first wiring 132E, the first wiring 132F, the first wiring 132G, a first wiring 132J, and a first wiring 132H (image data signal line 321).

As shown in FIG. 13, in a plan view, for example, the first wiring 132A is electrically connected to the second transistor T2 via the first contact hole opening 135D, and the first wiring 132B is electrically connected to the fourth transistor T4 via the first contact hole opening 135C. The first wiring 132E is electrically connected to the fourth transistor T4 via the first contact hole opening 135B, and is electrically connected to the gate wiring 127H via the first contact hole opening 135N. The other first wirings are also electrically connected to the gate wiring or transistor via the corresponding openings.

As shown in FIG. 13, the second electrode 694, the gate electrode 622, and the semiconductor layer 122A (the channel region 123) overlap. That is, the second transistor T2 (the channel region and the gate electrode 622) overlaps the second electrode 649 of the capacitive element CS.

The insulating layer 131 (FIG. 9, FIG. 10, FIG. 12, FIG. 13) is formed on the conductive layer 132 and on the insulating layer 128 where the conductive layer 132 is not formed (step 16 (S16) of FIG. 11).

As shown in FIG. 9 or FIG. 13, the second contact hole openings 138B, 138C, 138E, 138F, 138G, and 138H are opened (step 17 (S17) in FIG. 11). Each opening opens the insulating layer 131 to expose wirings, semiconductor layers or electrodes corresponding to each opening. For example, the second contact hole opening 138B exposes the first wiring 132D.

The insulating layer 136 (organic insulating layer) (FIG. 9, FIG. 10, FIG. 12, FIG. 13) is formed on the insulating layer 131 (step 18 (S18) of FIG. 11).

As shown in FIG. 9 or FIG. 13, the insulating layer 136 (organic insulating layer) is opened (step 19 (S19) in FIG.

11). In the opening of S19, the organic insulating film opening 138A for the capacitive element CS is opened. Furthermore, in the opening of S19, the second contact hole openings 138B, 138C, 138E, 138F, 138G, and 138H are opened similar to the opening of S18. That is, the second contact hole openings 138B, 138C, 138E, 138F, 138G, and 138H are opened twice. Each opening opens the insulating layer 136 to expose insulating layers, wirings or electrodes corresponding to each opening. For example, the organic insulating film opening 138A for the capacitive element CS removes only the insulating layer 136 on the first wiring 132C (the second electrode 694) and exposes the insulating layer 131. On the other hand, for example, the second contact hole opening 138F removes only the insulating layer 136 on the first wiring 132F and exposes the first wiring 132F. The other openings also expose the corresponding insulating layers, wirings or electrodes.

The conductive layer 139 (FIG. 9, FIG. 10, FIG. 12, FIG. 13) is formed on the insulating layer 136 and on the insulating layer 131 exposed by the organic insulating film opening 138A for the capacitive element (step 20 (S20) of FIG. 11). As shown in FIG. 9 or FIG. 10, the conductive layer 139 includes the second wiring 140A (the first electrode 692 of the capacitive element CS), the second wiring 140B, a second wiring 140C, a second wiring 140D, and the second wiring 140E.

As shown in FIG. 9, for example, in a plan view, the second wiring 140A (the first electrode 692 of the capacitive element CS) is electrically connected to the first wiring 132F and the sixth transistor T6 via the second contact hole opening 138F and the first contact hole opening 135K. The other wirings are also electrically connected to the wiring or electrode via the corresponding contact hole opening.

In addition, as shown in FIG. 9, the second wiring 140D is connected to and overlaps the gate wiring 127G (initialization voltage power line SVI) and extends in parallel along the second direction D2. Therefore, since the initialization voltage power line SVI is formed using two-layer metal wiring, the wiring resistance is smaller than the voltage line formed by one-layer metal wiring. As a result, the initialization voltage power line SVI has a high current supply capability and can supply a stable voltage to the transistor. The second wiring 140C is connected to and overlaps the gate wiring 127H (reference voltage power line SVR) and extends in parallel along the second direction D2. Therefore, similar to the initialization voltage power line SVI, the pre-charge voltage power line SVR is formed using two-layer metal wiring, so that the pre-charge voltage power line SVR has advantageous effects similar to those of the initialization voltage power line SVI.

In addition, as shown in FIG. 13, the second wiring 140A (the first electrode 692 of the capacitive element CS), the first wiring 132C (the second electrode 694), the gate electrode 622, and the semiconductor layer 122A (the channel region 123) overlap. That is, the second transistor T2 overlaps the capacitive element CS.

The insulating layer 141 (organic insulating layer) (FIG. 10) is formed on the conductive layer 139 and on the insulating layer 136 where the conductive layer 139 is not formed (step 21 (S21) of FIG. 11).

As shown in FIG. 9 or FIG. 10, the insulating layer 141 (organic insulating layer) is opened (step 22 (S22) in FIG. 11). In the opening of S22, the contact hole opening 147 for an anode electrode is opened. The contact hole opening 147 for an anode electrode removes the insulating layer 141 on the second wiring 140A and exposes the second wiring 140A. The contact hole opening 147 for an anode electrode may be referred to as an organic insulating layer opening. In addition, as shown in FIG. 9, the contact hole opening 147 for an anode electrode overlaps the second wiring 140E in a plan view.

The anode electrode 143 is provided on the exposed second wiring 140E, the contact hole opening 147 for an anode electrode, and the insulating layer 141. In addition, the functional layer 148 is provided on the anode electrode 143 (FIG. 10). The common electrode 149 is provided on the functional layer 148 (step 23 (S23) in FIG. 11). In addition, for example, the anode electrode 143 and the functional layer 148 are provided for each pixel, and the common electrode 149 is provided to overlap the display region 22.

After S23, the sealing film 165 and the cover film 158 are provided in this order on the common electrode 149 (FIG. 10).

As shown in FIG. 9, the manufacturing of the display device 10 (pixel 180) is completed as described above.

2. Second Embodiment

Figure 14:
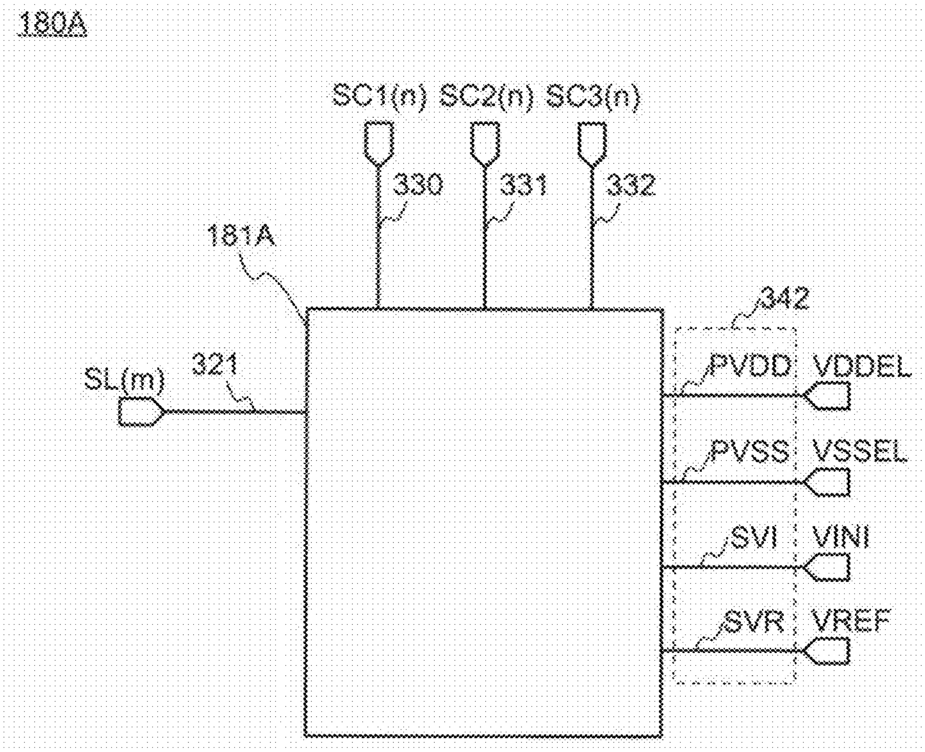
FIG. 14 is a schematic view showing input signals to a pixel circuit according to the second embodiment of the present invention.
Figure 15:
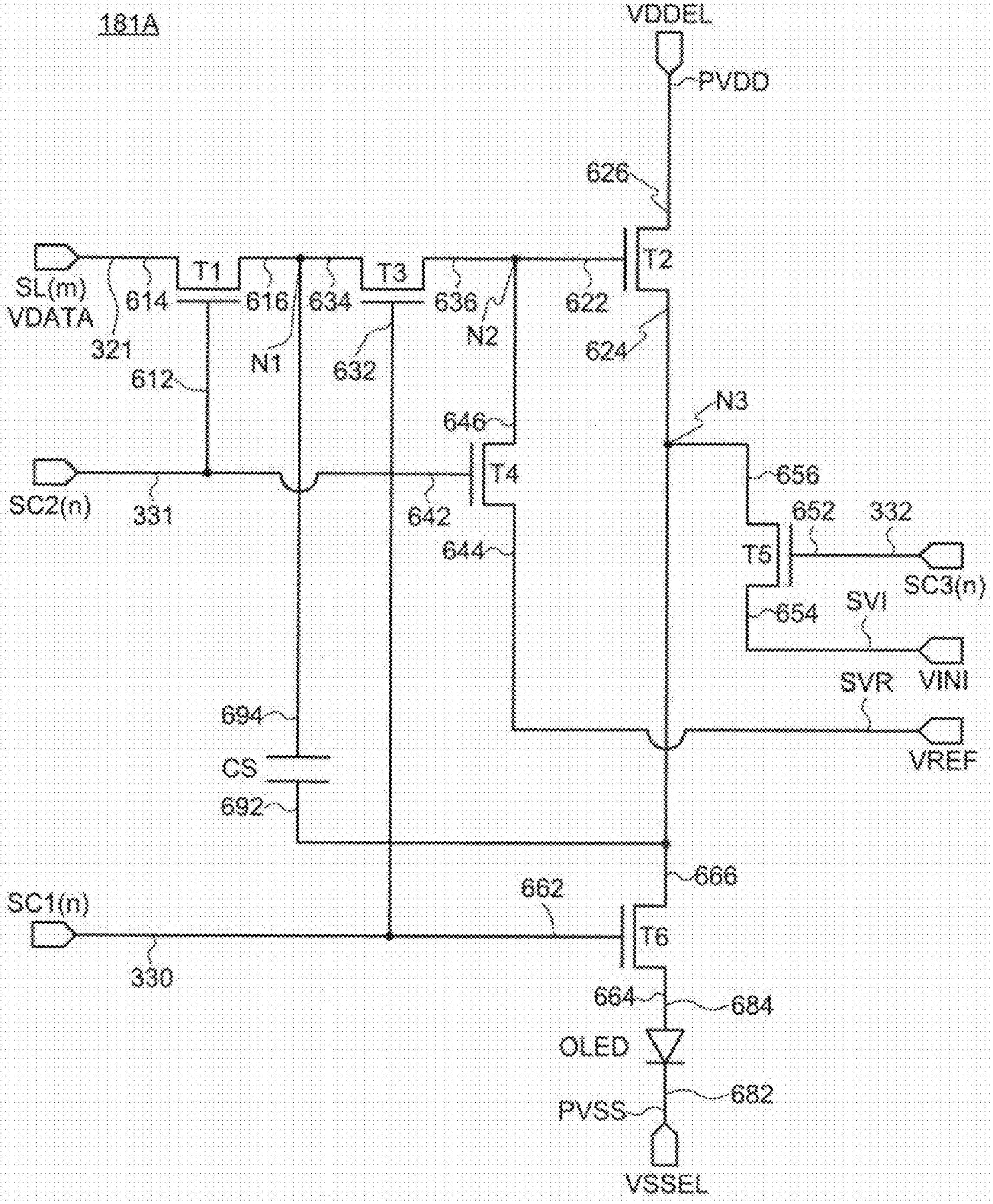
FIG. 15 is a circuit diagram showing a configuration of a pixel circuit according to the second embodiment of the present invention.
Figure 16:
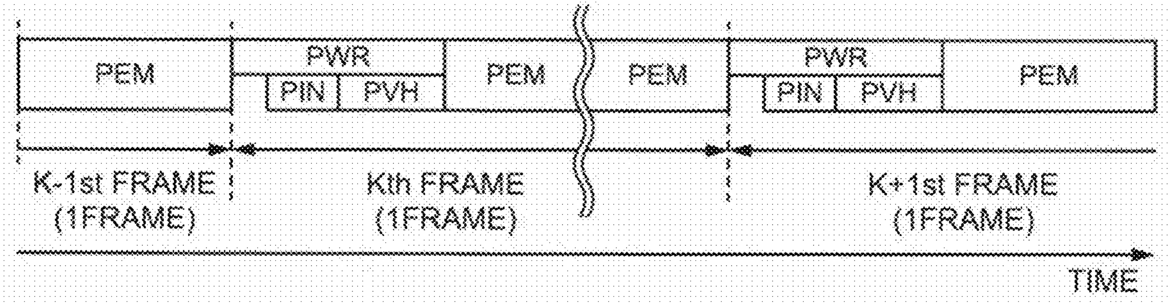
FIG. 16 is a timing chart of a display device according to the second embodiment of the present invention.

An overview of the display device according to the second embodiment will be described with reference to FIG. 14 to FIG. 20. FIG. 14 is a schematic diagram showing input signals to a pixel 180A (a pixel circuit 181A) according to the second embodiment, FIG. 15 is a circuit diagram showing a configuration of the pixel circuit 181A, and FIG. 16 to FIG. 20 are timing charts of the display device according to the second embodiment.

The display device according to the second embodiment includes the pixel 180A and the pixel circuit 181A. Specifically, the pixel 180A and the pixel circuit 181A include the configurations shown in (1) and (2) below. Mainly, the configurations shown in (1) and (2) are different from the configurations of the pixel 180 and the pixel circuit 181 of the display device 10 according to the first embodiment.

(1) The second scan signal SC2(*n*) serves as both the second scan signal SC2(*n*) and the fourth scan signal SC4(*n*) in the display device 10 according to the first embodiment. Therefore, the pixel 180A and the pixel circuit 181A do not include the fourth scan signal SC4(*n*).

(2) Since the second scan signal SC2(*n*) serves as both the second scan signal SC2(*n*) and the fourth scan signal SC4(*n*) in the display device 10 according to the second embodiment, the timings of the respective signals are different. For example, the period PWR is executed, and then the period PIN is executed in parallel with the period PWR.

Configurations other than the configuration shown in (1) and (2) in the pixel 180A and the pixel circuit 181A and the configuration related to the configuration shown in (1) and (2) in the pixel 180A and the pixel circuit 181A are similar to those of the display device 10 according to the first embodiment. Therefore, differences from the display device 10 according to the first embodiment will mainly be described here. When describing the configurations and functions of the display device according to the second embodiment, the same configurations and functions as those of the display device 10 according to the first embodiment will be described as necessary. In addition, configurations that are the same as or similar to those in FIG. 1 to FIG. 13 will be described as necessary.

[2-1. Configuration of Pixel 180A]

An overview of the pixel 180A and the pixel circuit 181A will be described with reference to FIG. 14 and FIG. 15.

In the pixel circuit 181A, the gate electrode 612 of the first transistor T1 and the gate electrode 642 of the fourth transistor T4 are electrically connected to the scan signal line 331 to which the second scan signal SC2(*n*) is output. That is, the first transistor T1 and the fourth transistor T4 operate at the same timing according to the second scan signal SC2(*n*). The conductive state (ON state) and the non-conductive state (OFF state) of the first transistor T1 and the fourth transistor T4 are controlled by the second scan signal SC2(*n*). When the signal output to the second scan signal SC2(*n*) is LO, the first transistor T1 and the fourth transistor T4 are in the non-conductive state, and when the signal output to the scan signal line 330 is HI, the first transistor T1 and the fourth transistor T4 are in the conductive state.

Configurations and functions of the pixel circuit 181A other than the configurations and functions described in "2-1. Configuration of Pixel 180A" are similar to those of the pixel circuit 181.

[2-2. Driving Method of Pixel Circuit 181A]

The driving method of the display device according to the second embodiment will be described with reference to FIG. 17 to FIG. 20. Configurations that are the same as or similar to those in FIG. 1 to FIG. 15 will be described as necessary. In addition, similar to the first embodiment, the horizontal axis of the timing charts represents time (TIME), and the data signal VDATA output to the selected pixel (pixel circuit) is indicated by diagonal lines as the data voltage (analog data voltage) equal to or higher than the voltage VSIGL and equal to or lower than the voltage VSIGH, and the data signal VDATA output to the pixels (pixel circuits) other than the selected pixel (pixel circuit) is omitted and indicated by solid lines. Further, in practice, the data signal VDATA output to the pixels (pixel circuits) other than the selected pixel (pixel circuit) is continuously or intermittently output to the image data signal SL(m) including the data signal VDATA in the respective embodiments. In addition, similar to the first embodiment, the frequency at which the display device according to the second embodiment is driven is 60 Hz, and one frame (1 FRAME) is driven at 60 Hz.

The driving method of the display device according to the second embodiment is different from the driving method of the display device 10 according to the first embodiment in the configuration related to the configurations (1) and (2) described in "2-1. Configuration of Pixel 180A". Configurations and functions other than those related to (1) and (2) described in "2-1. Configuration of Pixel 180A" are similar to those of the display device 10 according to the first embodiment. For example, as shown in (2) and FIG. 16, in the driving method of the display device according to the second embodiment, the period PWR is executed, and then the period PIN is executed in parallel with the period PWR. Configurations other than (2) in the driving method of the display device according to the second embodiment are similar to the driving method of the display device 10 according to the first embodiment shown in FIG. 4.

In one horizontal period (horizontal period HRP) in the driving method of the display device according to the second embodiment, the first scan signal SC1(*n*), the second scan signal SC2(*n*), the third scan signal SC3(*n*), the image data signal SL(m), the initialization voltage VINI, and the reference voltage VREF are input to the pixel 180A (pixel circuit 181A). For example, the pixel 180A (pixel circuit 181A) is selected according to the timings of the first scan signal SC1(*n*), the second scan signal SC2(*n*), and the third scan signal SC3(*n*). The image data signal SL(m) is input to the selected pixel 180A (pixel circuit 181A) according to the timings of the respective signals. Similar operations are performed on all the pixels 180A (pixel circuits 181A), and an image of the frame corresponding to 1FRAME is displayed on the display region 22 of the display device 10 based on the image data signal SL(m) input to all the pixels 180A (pixel circuits 181A).

For example, the voltages (potentials) output to each signal of each frame in the timing charts shown in FIGS. 17 to 20 are the setting values shown in Table 1.

[2-2-1. First Example of Driving Method of Pixel Circuit 181A]

Figure 17:
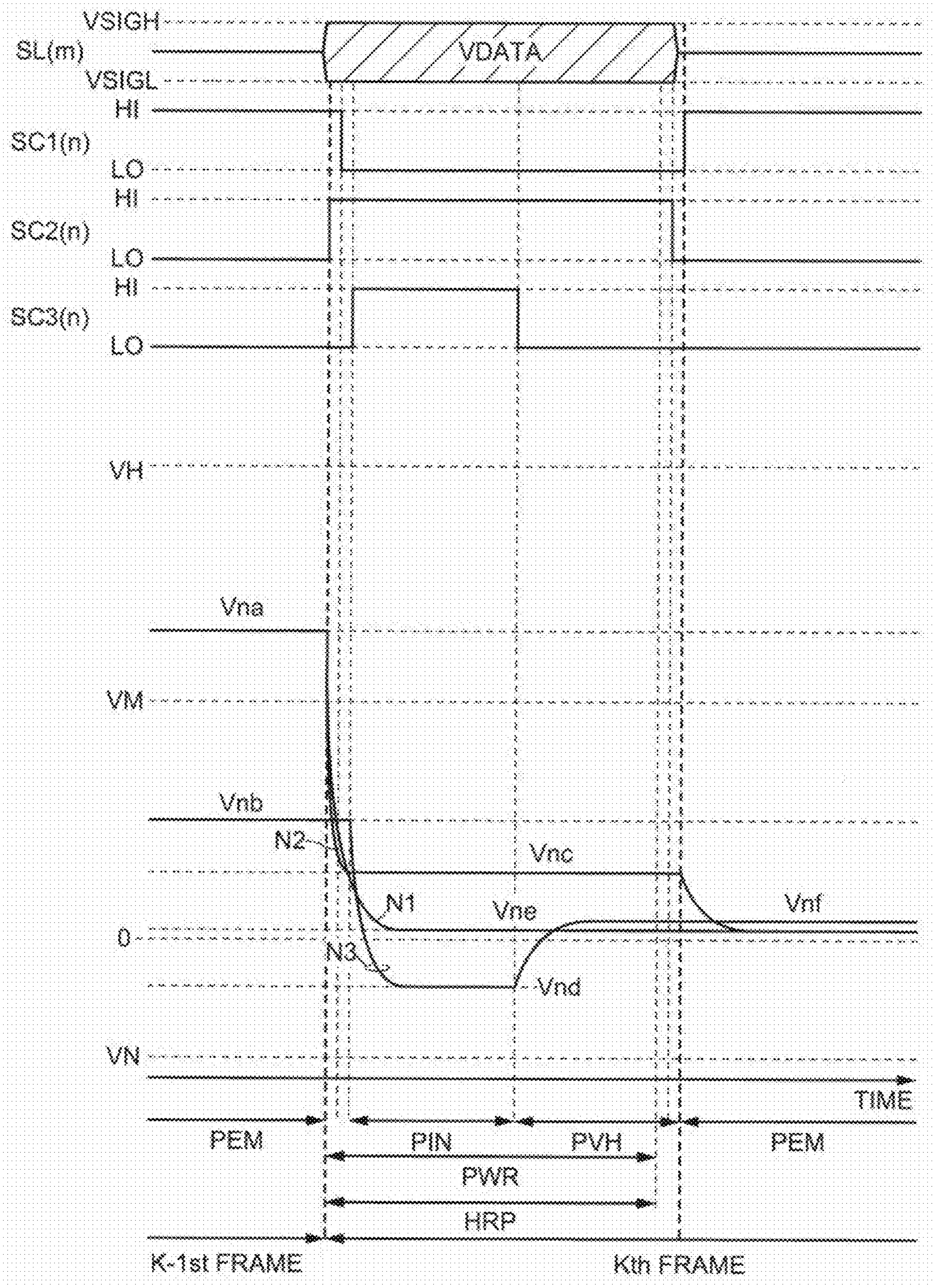
FIG. 17 is a timing chart of a display device according to the second embodiment of the present invention.

A first example of the driving method of the pixel circuit 181A will be described with reference to FIG. 17. The first example of the driving method of the pixel circuit 181A includes displaying images of differing colors in successive frames, similar to the first example of the driving method of the display device 10 according to the first embodiment. Configurations that are the same as or similar to those in FIG. 1 to FIG. 15 will be described as necessary.

Configurations of the first scan signal SC1(*n*) to the third scan signal SC3(*n*) are similar to those described in "1-5-1. First Example of Driving Method of Display Device 10". In addition, conduction and non-conduction of the second transistor T2 to the sixth transistor T6 other than the first transistor T1 are similar to those described in "1-5-1. First Example of Driving Method of Display Device 10". Configurations and the like similar to the configuration described in "1-5-1. First Example of Driving Method of Display Device 10" will be described as necessary.

For example, in the light emission period PEM of the K−1stFRAME, the data signal VDATA output to the pixels other than the selected pixel 180A (pixel circuit 181A) is output to the image data signal SL(m). The first transistor T1, the fourth transistor T4, and the fifth transistor T5 are in the OFF state, and the third transistor T3 and the sixth transistor T6 are in the ON state. In addition, for example, the voltage Vna supplied to the first node N1 and the second node N2 is 6.1 V, the voltage Vnb supplied to the third node N3 is 2.5 V, and the potential difference Vgs is 3.6 V. Therefore, the second transistor T2 can flow the current Ion based on the potential difference Vgs and the potential difference Vds corresponding to the voltage VSIGH input in the horizontal period HRP of the K−1stFRAME. In addition, the second transistor T2 and the sixth transistor T6 are in the ON state, the current Ion flows from the drive power line PVDD to the light-emitting element OLED and the reference voltage line PVSS, and the light-emitting element OLED emits light.

In the period between the period PWR of the K−1stFRAME and the period PIN of the KthFRAME following the light emission period PEM of the K−1stFRAME (hereinafter, referred to as a period BWRAIN, for example), the data signal VDATA output to the pixels other than the selected pixel 180A (pixel circuit 181A) is output to the image data signal SL(m). The second scan signal SC2(*n*) changes from the state in which LO is supplied to the state in which HI is supplied. When the second scan signal SC2(*n*) is in the state in which HI is supplied, the first scan signal SC1(*n*) changes from the state in which HI is supplied to the state in which LO is supplied. The third scan signal SC3(*n*) is maintained in the state in which LO is supplied. As a result, the first transistor T1 and the fourth transistor T4 are turned from the OFF state to the ON state. The third transistor T3, the fifth transistor T5, and the sixth transistor T6 are maintained in the OFF state. In addition, the voltage supplied to the first node N1 gradually drops from the voltage Vna toward the voltage VSIGL (the voltage Vne, 0.2

V), the voltage supplied to the second node N2 gradually drops from the voltage Vna toward the voltage Vnc (the reference voltage VREF, 1.4 V), and the voltage supplied to the third node N3 maintains the voltage Vnb. The second transistor T2 is in either the ON state or the OFF state depending on the potential difference Vgs, but the sixth transistor T6 is in the OFF state, so that the current Ion does not flow through the light-emitting element OLED, and the light-emitting element OLED does not emit light.

In the period PWR of the KthFRAME following the period BWRAIN of the KthFRAME and the period PIN executed in parallel (overlapping) with the period PWR, the voltage VSIGL (0.2 V) is output to the image data signal SL(m). The data signal VDATA output to the pixels other than the selected pixel 180A (pixel circuit 181A) is supplied to the image data signal SL(m). The third scan signal SC3(*n*) changes from the state in which LO is supplied to the state in which HI is supplied. The first scan signal SC1(*n*) is in the state in which LO is supplied, and the second scan signal SC2(*n*) is in the state in which HI is supplied. Therefore, the fifth transistor T5 is turned from the OFF state to the ON state, the first transistor T1 and the fourth transistor T4 are maintained in the ON state, and the third transistor T3 and the sixth transistor T6 are maintained in the OFF state.

As a result, the voltage supplied to the first node N1 gradually drops toward the voltage VSIGL (voltage Vne, 0.2 V) to become the voltage Vne, the voltage supplied to the second node N2 maintains the voltage Vnc, and the voltage supplied to the third node N3 gradually drops from the voltage Vnb toward the voltage Vnd (initialization voltage VINI, −2 V) to become the voltage Vnd. The potential difference Vgs is 3.4 V (1.4 V−(−2 V)) and the potential difference Vds is 10 V (8 V−(−2 V)). Therefore, the second transistor T2 is in the ON state, but the sixth transistor T6 is in the OFF state, so that the current Ion does not flow through the light-emitting element OLED, and the light-emitting element OLED does not emit light.

As described above, in the period PIN, the second node N2 is initialized by the reference voltage VREF (1.4 V) and the third node N3 is initialized by the initialization voltage VINI (−2 V). Further, in the period PWR executed in parallel with the period PIN, the data signal VDATA is written to the pixel 180A (pixel circuit 181A).

In the period PVH executed in parallel (overlapping) with the period PWR of the KthFRAME following the period PIN of the KthFRAME, the respective signals, the operations of the respective transistors, and the voltages (potentials) supplied to the respective nodes are similar to the configuration in the period PVH of the KthFRAME following the period PIN of the KthFRAME and the period PWR executed in parallel (overlapping) with the period PVH described in "1-5-1. First Example of Driving Method of Display Device 10". That is, the voltage supplied to the first node N1 maintains the voltage Vne, the voltage supplied to the second node N2 maintains the voltage Vnc, and the voltage supplied to the third node N3 rises from the voltage Vnd toward the voltage Vnf to become the voltage Vnf (0.4 V). In this case, the voltage Vnf is a voltage at which the potential difference Vgs becomes the threshold voltage VTH (1 V) of the second transistor T2, and the second transistor T2 is in the OFF state.

In the period at the end of the period PVH of the KthFRAME, the voltage VSIGL (0.2 V) is output to the image data signal SL(m). The second scan signal SC2(*n*) changes from the state in which HI is supplied to the state in which LO is supplied. The first scan signal SC1(*n*) and the third scan signal SC3(*n*) are in the state in which LO is supplied. Therefore, the first transistor T1 and the fourth transistor T4 are turned from the ON state to the OFF state, and the second transistor T2, the third transistor T3, the fifth transistor T5, and the sixth transistor T6 are maintained in the OFF state.

As a result, the voltage supplied to the first node N1 maintains the voltage Vne, the voltage supplied to the second node N2 maintains the voltage Vnc, and the voltage supplied to the third node N3 maintains the voltage Vnf.

As described above, in the period PVH executed in parallel with the period PWR, the data signal VDATA is written to the pixel 180A (pixel circuit 181A). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the period PVH of the KthFRAME, the respective signals, the operations of the respective transistors, and the voltages (potentials) supplied to the respective nodes are similar to the configuration in the light emission period PEM of the KthFRAME following the period PVH of the KthFRAME described in "1-5-1. First Example of Driving Method of Display Device 10". That is, the voltage supplied to the first node N1 maintains the voltage Vne (0.2 V), the voltage supplied to the second node N2 gradually drops from the voltage Vnc toward the voltage Vne to become the voltage Vne, and the voltage supplied to the third node N3 maintains the voltage Vnf (0.4 V). In this case, the potential difference Vgs is 0.2 V, the potential difference Vds is 7.6 V, the second transistor T2 is in the OFF state, and the current Ion does not flow through the light-emitting element OLED. As a result, three pixels using the pixel 180A emitting red light, the pixel 180A emitting blue light, and the pixel 180A emitting green light become black.

The first example of the driving method of the pixel circuit 181A including the above-described configuration has advantageous effects similar to those of the driving method of the display device 10 according to the first embodiment.

In addition, the pixel circuit 181A includes a configuration that serves as both the second scan signal SC2(*n*) and the fourth scan signal SC4(*n*) in the pixel circuit 181. Therefore, the pixel circuit 181A has a configuration capable of reducing the number of signals and the number of signal lines. As a result, the display device including the pixel circuit 181A can reduce the number of signal lines in the pixel, making it possible to reduce the pixel size. Therefore, the display device including the pixel circuit 181A can increase the number of pixels and achieve high definition and a large screen.

[2-2-2. Second Example of Driving Method of Pixel Circuit 181A]

Figure 18:
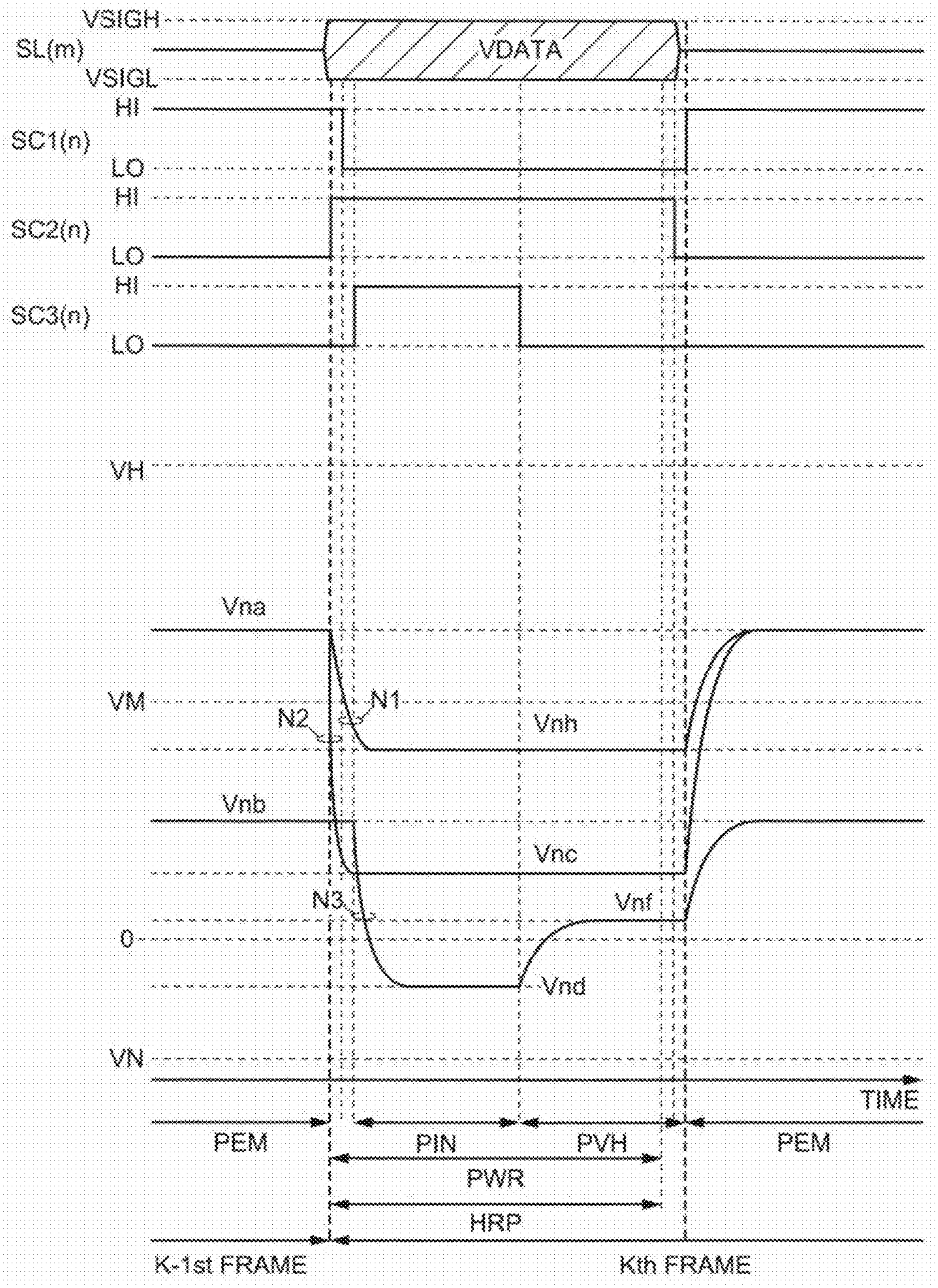
FIG. 18 is a timing chart of a display device according to the second embodiment of the present invention.

A second example of the driving method of the pixel circuit 181A will be described with reference to FIG. 18. The driving method shown in the second example of the pixel circuit 181A includes displaying images of the same color (white) in consecutive frames similar to the second example of the driving method of the display device 10 according to the first embodiment. Configurations that are the same as or similar to those in FIG. 1 to FIG. 17 will be described as necessary.

Configurations of the first scan signal SC1(*n*) to the third scan signal SC3(*n*) are similar to those described in "2-2-1.

First Example of Driving Method of Pixel Circuit 181A". In addition, the voltages (potentials) and the like of the first node N1 in the light emission period PEM of the K−1stFRAME are similar to the configuration described in "2-2-1. First Example of Driving Method of Pixel Circuit 181A". Further, the voltages (potentials) and the like of the second node N2 and the third node N3 in the periods excluding the light emission period PEM of the KthFRAME are similar to the configuration described in "2-2-1. First Example of Driving Method of Pixel Circuit 181A". Furthermore, the operations and the like of the transistors in the respective periods are similar to those described in "2-2-1. First Example of Driving Method of Pixel Circuit 181A". Therefore, configurations and the like similar to those described in "2-2-1. First Example of Driving Method of Pixel Circuit 181A" will be described as necessary. Further, the data signal VDATA of VSIGH corresponding to white is supplied to the image data signal SL(m) in the period PWR of the KthFRAME (horizontal period HRP), and the data signal VDATA similar to the configuration described in "2-2-1. First Example of Driving Method of Pixel Circuit 181A" is supplied in the periods other than the period PWR of the KthFRAME.

The second example of the driving method of the pixel circuit 181A in the light emission period PEM of the K−1stFRAME is similar to the driving method described in "2-2-1. First Example of Driving Method of Pixel Circuit 181A".

In the period BWRAIN following the light emission period PEM of the K−1stFRAME, the voltage supplied to the first node N1 gradually drops from the voltage Vna toward the voltage VSIGH (voltage Vnh, 4 V). In addition, similar to the configuration described in "2-2-1. First Example of Driving Method of Pixel Circuit 181A", the voltage supplied to the second node N2 gradually drops from the voltage Vna toward the voltage Vnc (reference voltage VREF, 1.4 V) to become the voltage Vnc, and the voltage supplied to the third node N3 maintains the voltage Vna. The second transistor T2 is in either the ON state or the OFF state depending on the potential difference Vgs, but the sixth transistor T6 is in the OFF state, so that the current Ion does not flow through the light-emitting element OLED, and the light-emitting element OLED does not emit light.

In the period PWR of the KthFRAME following the period BWRAIN of the KthFRAME and the period PIN executed in parallel (overlapping) with the period PWR, the voltage supplied to the first node N1 gradually drops toward the voltage VSIGH (voltage Vnh, 4 V) to become the voltage Vnh. In addition, similar to the configuration described in "2-2-1. First Example of Driving Method of Pixel Circuit 181A", the voltage supplied to the second node N2 maintains the voltage Vnc, and the voltage supplied to the third node N3 gradually drops from the voltage Vnb toward the voltage Vnd (initialization voltage VINI, −2 V) to become the voltage Vnd. The potential difference Vgs is 3.4 V, the potential difference Vds is 10 V, and the second transistor T2 is in the ON state, but the sixth transistor T6 is in the OFF state, so that the current Ion does not flow through the light-emitting element OLED, and the light-emitting element OLED does not emit light.

As described above, in the period PIN, the second node N2 is initialized by the reference voltage VREF (1.4 V) and the third node N3 is initialized by the initialization voltage VINI (−2 V). Further, in the period PWR executed in parallel with the period PIN, the data signal VDATA is written to the pixel 180A (pixel circuit 181A).

In the period PVH executed in parallel (overlapping) with the period PWR of the KthFRAME following the period PIN of the KthFRAME, the voltage supplied to the first node N1 maintains the voltage Vnh. In addition, similar to the configuration described in "2-2-1. First Example of Driving Method of Pixel Circuit 181A", the voltage supplied to the second node N2 maintains the voltage Vnc, the voltage supplied to the third node N3 rises from the voltage Vnd toward the voltage Vnf to become the voltage Vnf (0.4 V), and the second transistor T2 is in the OFF state.

In the period at the end of the period PVH of the KthFRAME, the voltage VSIGL (4 V) is output to the image data signal SL(m), and the second scan signal SC2(*n*) changes from the state in which HI is supplied to the state in which LO is supplied. The voltage supplied to the first node N1 maintains the voltage Vnh, the voltage supplied to the second node N2 maintains the voltage Vnc, and the voltage supplied to the third node N3 maintains the voltage Vnf.

As described above, in the period PVH executed in parallel with the period PWR, the data signal VDATA is written to the pixel 180A (pixel circuit 181A). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the period PVH of the KthFRAME, the respective signals, the operations of the respective transistors, and the voltages (potentials) supplied to the respective nodes are similar to the configuration in the light emission period PEM of the display device described in "1-5-2. Second Example of Driving Method of Display Device 10". That is, the voltage supplied to the first node N1 and the second node N2 becomes the voltage Vna, the voltage supplied to the third node N3 becomes the voltage Vnb, the potential difference Vgs becomes 3.6 V, and the potential difference Vds becomes 5.5 V. The second transistor T2 is in the ON state and the light-emitting element OLED emits light. White light is emitted by three pixels using the pixel 180A emitting red light (pixel circuit 181A), the pixel 180A emitting blue light, and the pixel 180A emitting green light.

[2-2-3. Third Example of Driving Method of Pixel Circuit 181A]

Figure 19:
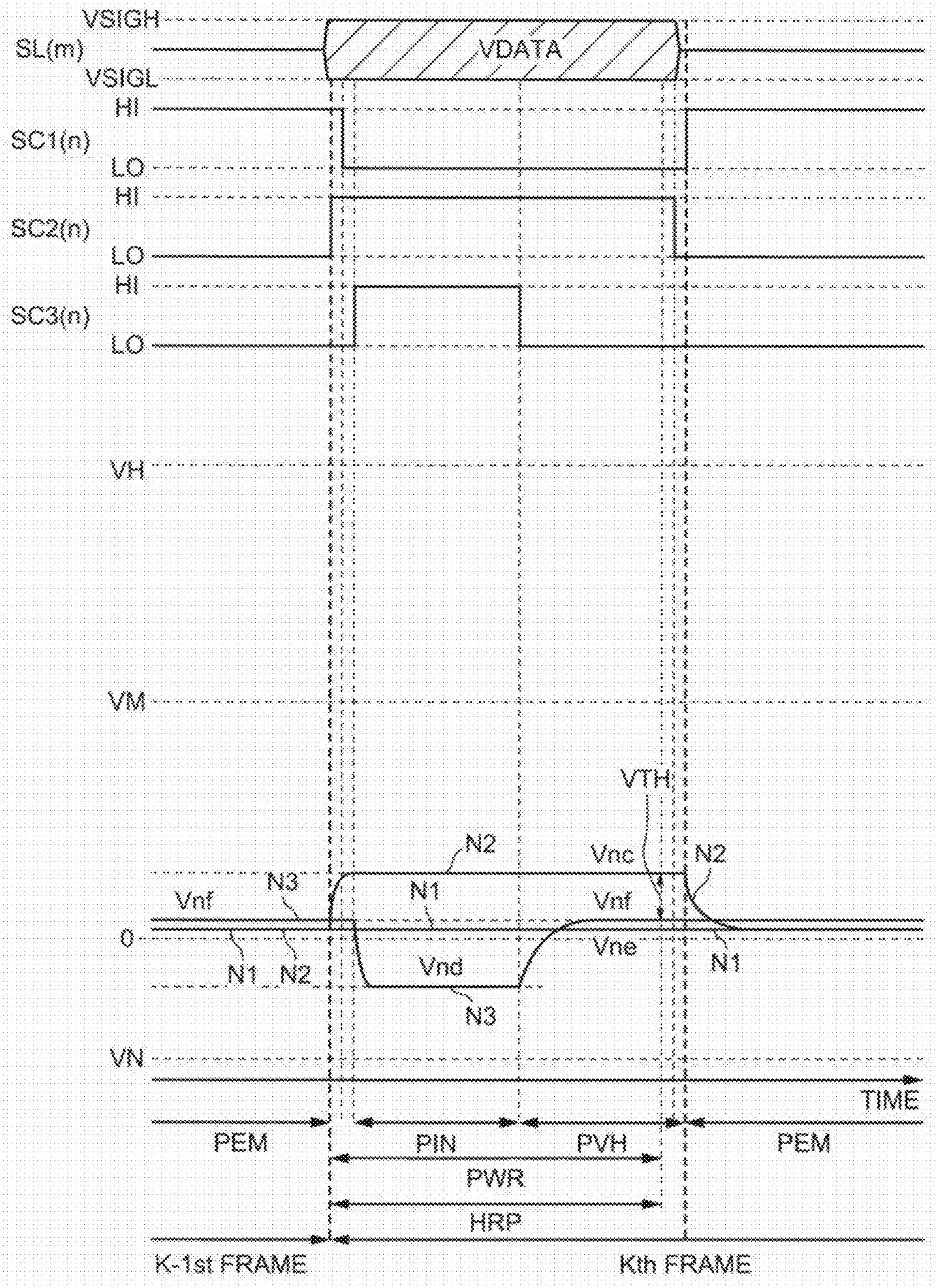
FIG. 19 is a timing chart of a display device according to the second embodiment of the present invention.

A third example of the driving method of the pixel circuit 181A will be described with reference to FIG. 19. The driving method shown in the third example of the driving method of the pixel circuit 181A includes displaying images of the same color (black) in consecutive frames similar to the third example of the driving method of the display device 10 according to the first embodiment. Configurations that are the same as or similar to those in FIG. 1 to FIG. 18 will be described as necessary.

Configurations of the first scan signal SC1(*n*) to the third scan signal SC3(*n*) are similar to those described in "2-2-1. First Example of Driving Method of Pixel Circuit 181A". In addition, the third example of the driving method of the pixel circuit 181A includes that the first transistor T1 and the fourth transistor T4 are controlled by the second scan signal SC2(*n*). When the first transistor T1 is in the conductive state, the voltage supplied to the first node N1 is the voltage VSIGL (voltage Vne, 0.2 V), and when the fourth transistor T4 is in the conductive state, the voltage supplied to the second node N2 is the voltage Vnc (reference voltage VREF, 1.4 V). Therefore, the configuration and operation in "2-2-3. Third Example of Driving Method of Pixel Circuit 181A" are similar to the configuration and operation described in "1-5-3. Third Example of Driving Method of Display Device 10" except for (1) and (2) described above. Therefore, a detailed description thereof will be omitted here.

[2-2-4. Fourth Example of Driving Method of Pixel Circuit 181A]

Figure 20:
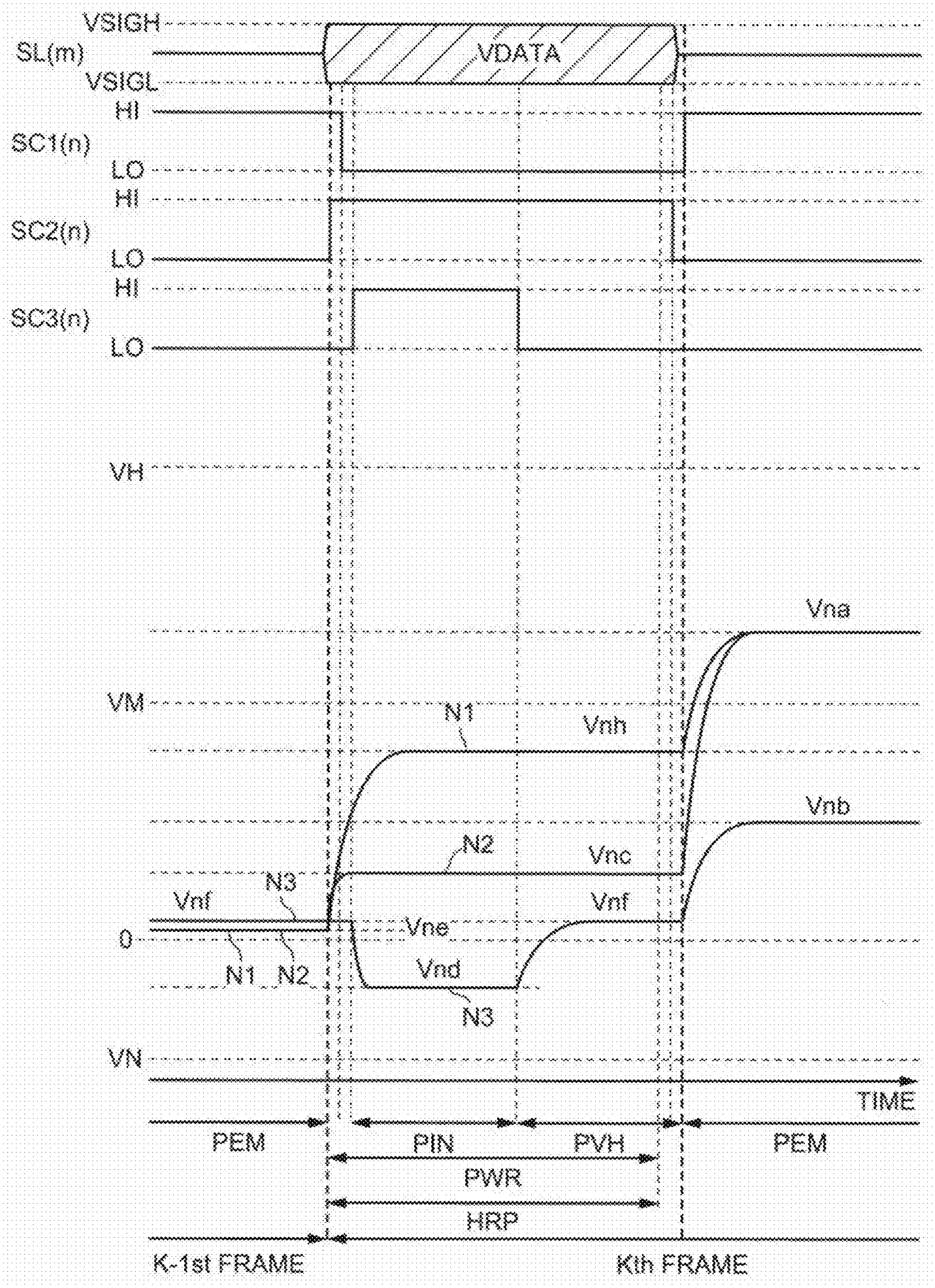
FIG. 20 is a timing chart of a display device according to the second embodiment of the present invention.

A fourth example of the driving method of the pixel circuit 181A will be described with reference to FIG. 20. The driving method shown in the fourth example of the driving method of the pixel circuit 181A includes displaying images of different colors in successive frames similar to the fourth example of the driving method of the display device 10 according to the first embodiment. Configurations that are the same as or similar to those in FIG. 1 to FIG. 19 will be described as necessary.

Configurations of the first scan signal SC1(*n*) to the third scan signal SC3(*n*) are similar to those described in "2-2-1. First Example of Driving Method of Pixel Circuit 181A". In addition, the voltages (potentials) of the first node N1, the second node N2, and the third node N3, the operations of the transistors, and the like in the light emission period PEM of the K−1stFRAME are similar to the configurations and operations described in "2-2-3. Third Example of Driving Method of Pixel Circuit 181A". Further, the voltages (potentials) of the second node N2 and the third node N3 in the period BWRAIN following the light emission period PEM of the K−1stFRAME, the period PWR of the KthFRAME following the period BWRAIN of the KthFRAME, the period PIN executed in parallel (overlapping) with the period PWR, the period PVH executed in parallel (overlapping) with the period PWR of the KthFRAME following the period PIN of the KthFRAME, and the period at the end of the period PVH of the KthFRAME, the operations of the transistors, and the like are similar to the configuration and the operation described in "2-2-3. Third Example of Driving Method of Pixel Circuit 181A". In addition, the voltages (potentials) of the first node N1, the second node N2, and the third node N3, the operations of the transistors, and the like in the light emission period PEM of the KthFRAME are similar to the configurations and operations described in "2-2-2. Second Example of Driving Method of Pixel Circuit 181A". Configurations and the like similar to those described in "2-2-1. First Example of Driving Method of Pixel Circuit 181A" to "2-2-3. Third Example of Driving Method of Pixel Circuit 181A" will be described as necessary. In addition, the data signal VDATA including the voltage VSIGH corresponding to white is output to the image data signal SL(m) in the period between the light emission period PEM of the K−1stFRAME and the light emission period PEM of the KthFRAME.

Similar to "2-2-3. Third Example of Driving Method of Pixel Circuit 181A" ("1-5-3. Third Example of Driving Method of Display Device 10"), the pixel 180A (the pixel circuit 181A) is black in the light emission period PEM of the K−1stFRAME.

In the period BWRAIN following the light emission period PEM of the K−1stFRAME, the voltage supplied to the first node N1 gradually rises from the voltage Vnf toward the voltage VSIGH (Vnh, 4 V). The voltage supplied to the second node N2 gradually rises from the voltage Vnf toward the reference voltage VREF (voltage Vnc, 1.4 V) to become the voltage Vnc, and the voltage supplied to the third node N3 maintains the voltage Vne. The potential difference Vgs is 1.2 V and the second transistor T2 is in the ON state, but the sixth transistor T6 is in the OFF state, and the light-emitting element OLED does not emit light.

In the period PWR of the KthFRAME following the period BWRAIN of the KthFRAME and the period PIN executed in parallel (overlapping) with the period PWR, the voltage supplied to the first node N1 gradually rises from the voltage Vnf toward the voltage VSIGH (Vnh, 4 V) to become the voltage Vnh. In addition, similar to "2-2-3. Third Example of Driving Method of Pixel Circuit 181A" or "2-2-2. Second Example of Driving Method of Pixel Circuit 181A", the voltage supplied to the second node N2 maintains the voltage Vnc, and the voltage supplied to the third node N3 gradually drops from the voltage Vnb toward the voltage Vnd (the initialization voltage VINI, −2 V) to become the voltage Vnd. The potential difference Vgs is 3.4 V, the potential difference Vds is 10 V, and the second transistor T2 is in the ON state, but the sixth transistor T6 is in the OFF state, the current Ion does not flow through the light-emitting element OLED, and the light-emitting element OLED does not emit light.

As described above, in the period PIN, the second node N2 is initialized by the reference voltage VREF (1.4 V) and the third node N3 is initialized by the initialization voltage VINI (−2 V). Further, in the period PWR executed in parallel with the period PIN, the data signal VDATA is written to the pixel 180A (pixel circuit 181A).

In the period PVH executed in parallel (overlapping) with the period PWR of the KthFRAME following the period PIN of the KthFRAME, similar to the configuration described in "2-2-2. Second Example of Driving Method of Pixel Circuit 181A", the voltage supplied to the first node N1 maintains the voltage Vnh, the voltage supplied to the second node N2 maintains the voltage Vnc, and the voltage supplied to the third node N3 rises from the voltage Vnd toward the voltage Vnf to become the voltage Vnf (0.4 V), and the second transistor T2 is in the OFF state.

In the period at the end of the period PVH of the KthFRAME, similar to the configuration described in "2-2-2. Second Example of Driving Method of Pixel Circuit 181A", the voltage supplied to the first node N1 maintains the voltage Vnh, the voltage supplied to the second node N2 maintains the voltage Vnc, and the voltage supplied to the third node N3 maintains the voltage Vnf.

As described above, in the period PVH executed in parallel with the period PWR, the data signal VDATA is written to the pixel 180A (pixel circuit 181A). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the period PVH of the KthFRAME, similar to the configuration described in "2-2-2. Second Example of Driving Method of Pixel Circuit 181A", the voltage supplied to the first node N1 and the second node N2 becomes the voltage Vna, the voltage supplied to the third node N3 becomes the voltage Vnb, the potential difference Vgs becomes 3.6 V, and the potential difference Vds becomes 5.5 V. The second transistor T2 is in the ON state and the light-emitting element OLED emits light. White light is emitted by three pixels using the pixel 180A emitting red light (pixel circuit 181A), the pixel 180A emitting blue light, and the pixel 180A emitting green light.

3. Third Embodiment

Figure 21:
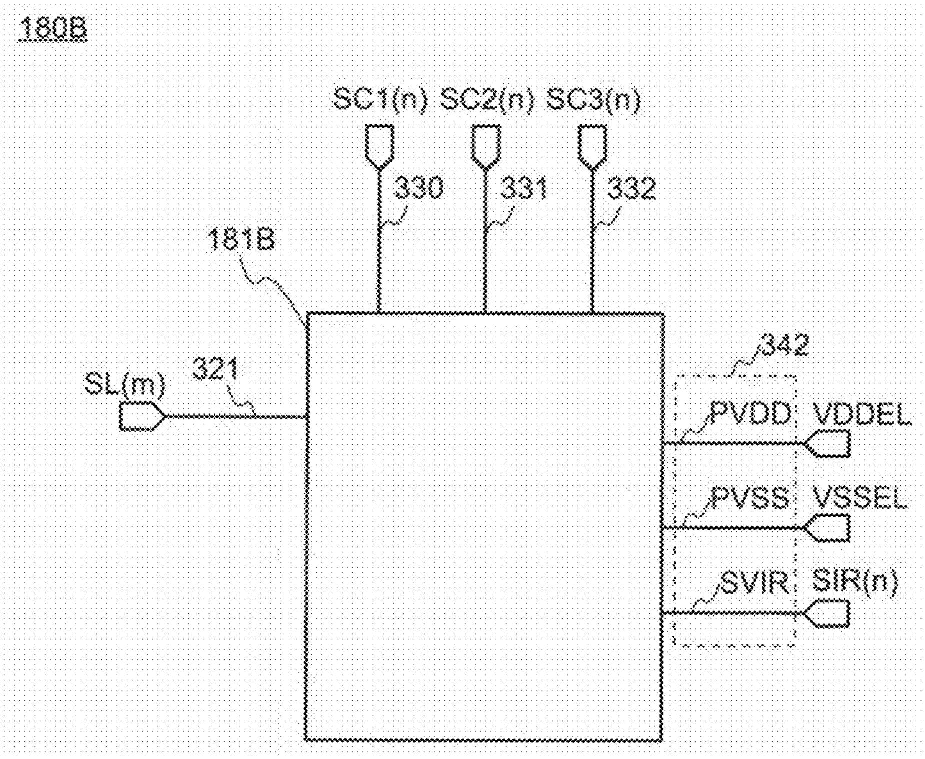
FIG. 21 is a schematic view showing input signals to a pixel circuit according to the third embodiment of the present invention.
Figure 22:
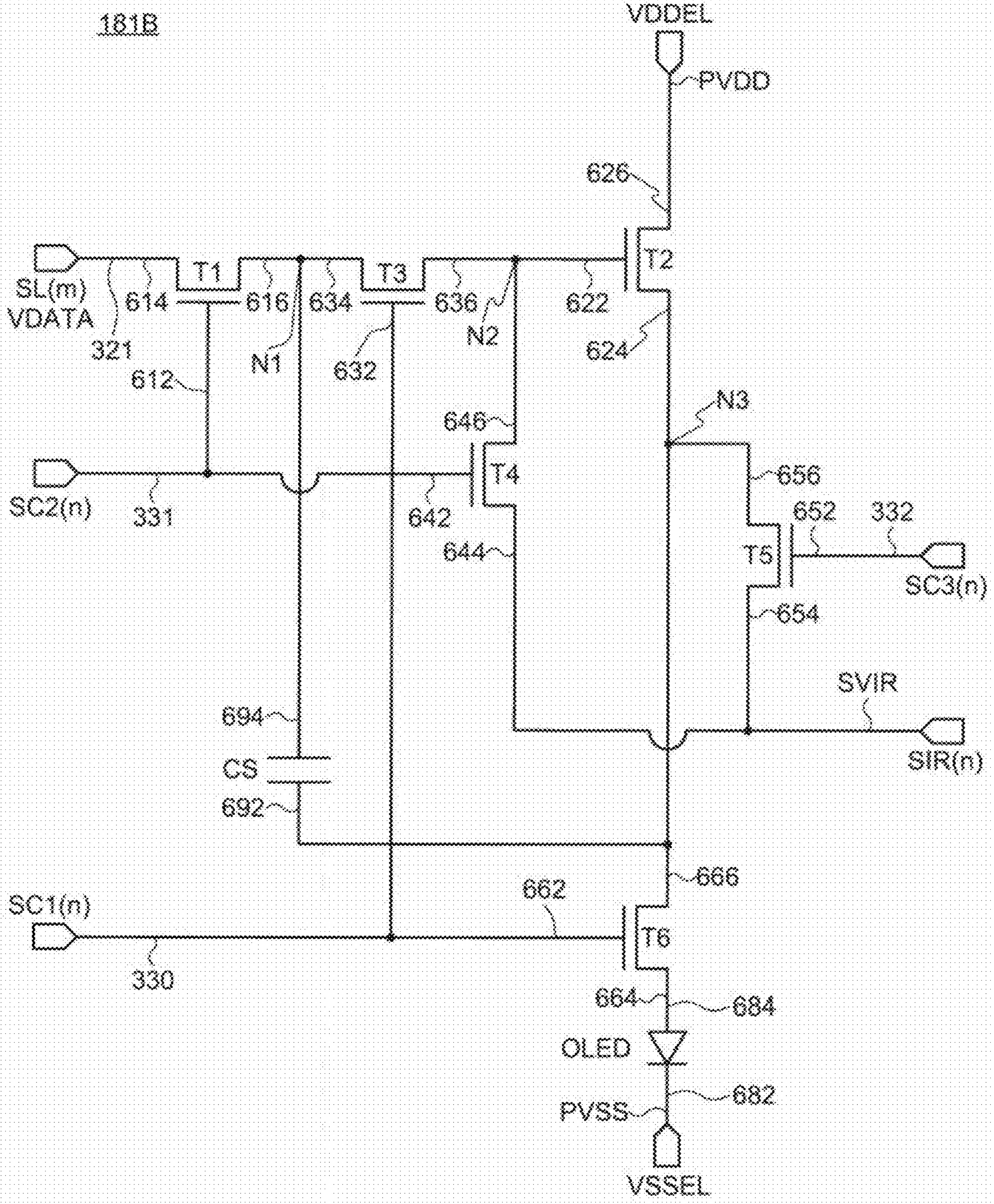
FIG. 22 is a circuit diagram showing a configuration of a pixel circuit according to the third embodiment of the present invention.

An overview of the display device according to the third embodiment will be described with reference to FIG. 21 to FIG. 26. FIG. 21 is a schematic diagram showing input signals to a pixel 180B (pixel circuit 181B) according to the third embodiment, FIG. 22 is a circuit diagram showing a configuration of the pixel circuit 181B, and FIG. 23 to FIG. 26 are timing charts of the display device according to the third embodiment.

The display device according to the third embodiment includes the pixel 180B and the pixel circuit 181B. Specifically, the pixel 180B and the pixel circuit 181B include the configurations shown in (1) to (3) below. Mainly, the configurations shown in (1) to (3) are different from the configurations of the pixel 180A and the pixel circuit 181A of the display device according to the second embodiment.

(1) A scan voltage power line SVIR to which a scan voltage power supply SIR(n) is output is included.

(2) The scan voltage power line SVIR is a signal line that combines the reference voltage power line SVR to which the reference voltage VREF is output and the initialization voltage power line SVI to which the initialization voltage VINI is output. That is, the configuration of the scan voltage power line SVIR has a configuration serving as both the reference voltage power line SVR and the initialization voltage power line SVI.

(3) The scan voltage power supply SIR(n) includes voltages that change alternately with time. The voltages that change alternately with time are the initialization voltage VINI2 and the initialization voltage VINI1.

Configurations other than the configurations shown in (1) to (3) in the pixel 180B and the pixel circuit 181B and the configuration related to the configurations shown in (1) to (3) in the pixel 180B and the pixel circuit 181B are similar to the configuration of the pixel 180A and the pixel circuit 181A of the display device according to the second embodiment. Therefore, differences from the pixel 180A and the pixel circuit 181A of the display device according to the second embodiment will mainly be described here. When describing the configuration and function of the display device according to the third embodiment, configurations and functions similar to those of the display device 10 according to the first embodiment will be described as necessary. In addition, configurations that are the same as or similar to those in FIG. 1 to FIG. 20 will be described as necessary.

[3-1. Configuration of Pixel 180B]

An overview of the pixel 180B and the pixel circuit 181B will be described with reference to FIG. 21 and FIG. 22.

The pixel circuit 181B is connected to the scan voltage power line SVIR. The scan voltage power line SVIR functions as a power line that outputs a voltage to the pixel 180B and the pixel circuit 181B, and also functions as a signal line whose voltage (potential) changes with time.

In the pixel circuit 181B, the first electrode 644 of the fourth transistor T4 and the first electrode 654 of the fifth transistor T5 are electrically connected to the scan voltage power line SVIR. The initialization voltage VINI2 or initialization voltage VINI1 are output to the first electrode 644 of the fourth transistor T4 and the first electrode 654 of the fifth transistor T5 depending on the time.

For example, the scan voltage power line SVIR is electrically connected to the connection wiring 342 different from the pre-charge voltage power line SVP, the drive power line PVDD, and the reference voltage line PVSS. In addition, for example, the scan voltage power line SVIR may be one of the connection wirings 342.

For example, similar to the initialization voltage VINI, the scan voltage power supply SIR(n) may be output from the external device to the IC chip 110, and may be output from the IC chip 110 to a plurality of pixels 180B (pixel circuits 181B) via the connection wiring 342 and the scan voltage power line SVIR. Although not shown, similar to the initialization voltage VINI, the scan voltage power supply SIR(n) may be connected to the scan voltage power line SVIR from the external device via the FPC 200, the terminal section 150, and the connection wiring 341, not via the IC chip 110 and the connection wiring 342.

The fourth transistor T4 has a function of conducting the second node N2 and the scan voltage power line SVIR to supply the initialization voltage VINI1 or the initialization voltage VINI2 to the second node N2 and initializing the second node N2. For example, the initialization voltage VINI1 and the initialization voltage VINI2 are constant voltages.

The fifth transistor T5 has a function of conducting the third node N3 and the scan voltage power line SVIR to supply the initialization voltage VINI1 to the third node N3 and initializing the third node N3.

Configurations and functions of the pixel circuit 181B other than the configurations and functions described in "3-1. Configuration of Pixel 180B" are similar to those of the pixel circuit 181A.

[3-2. Driving Method of Pixel Circuit 181B]

Figure 23:
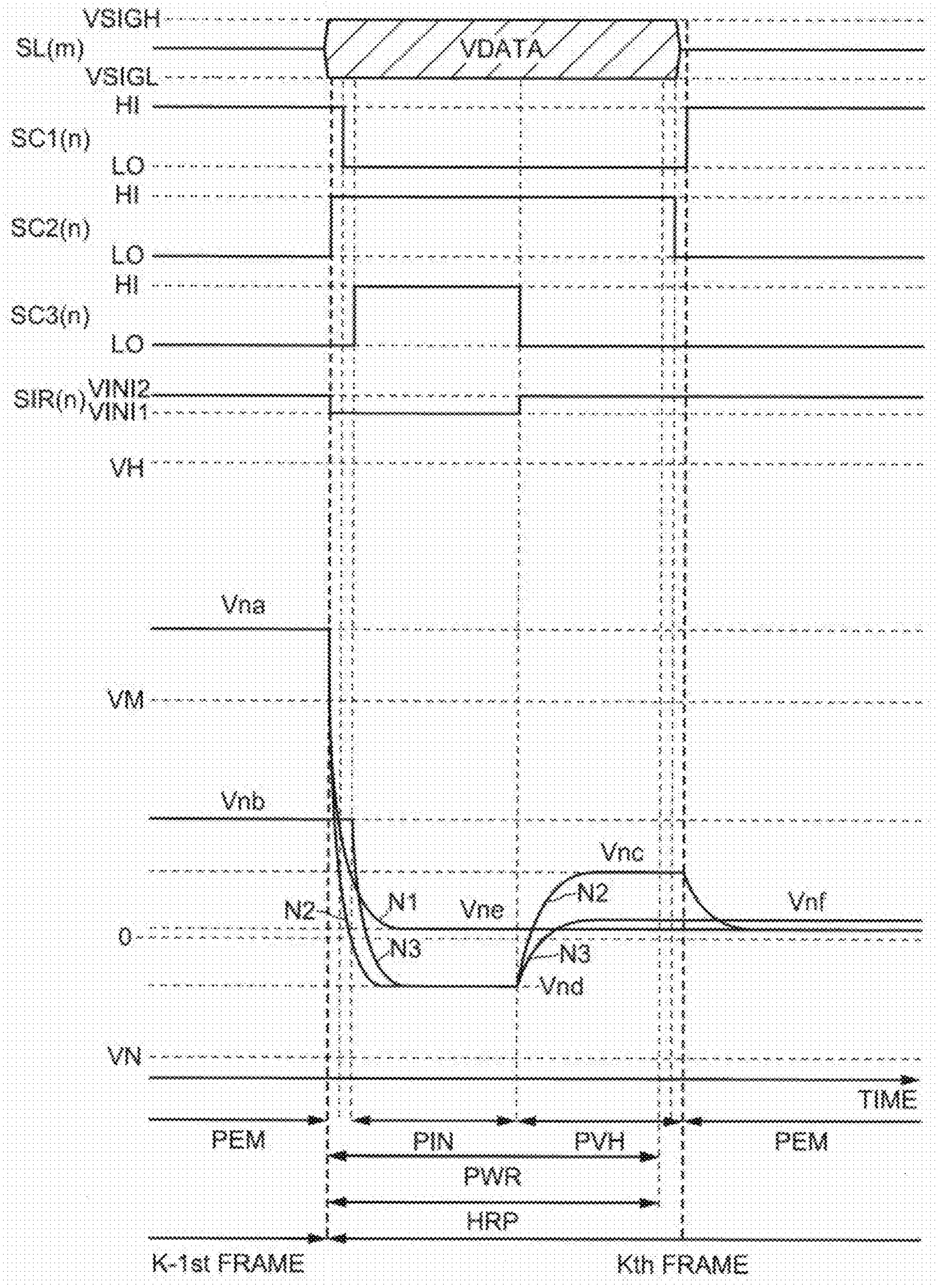
FIG. 23 is a timing chart of a display device according to the third embodiment of the present invention.
Figure 24:
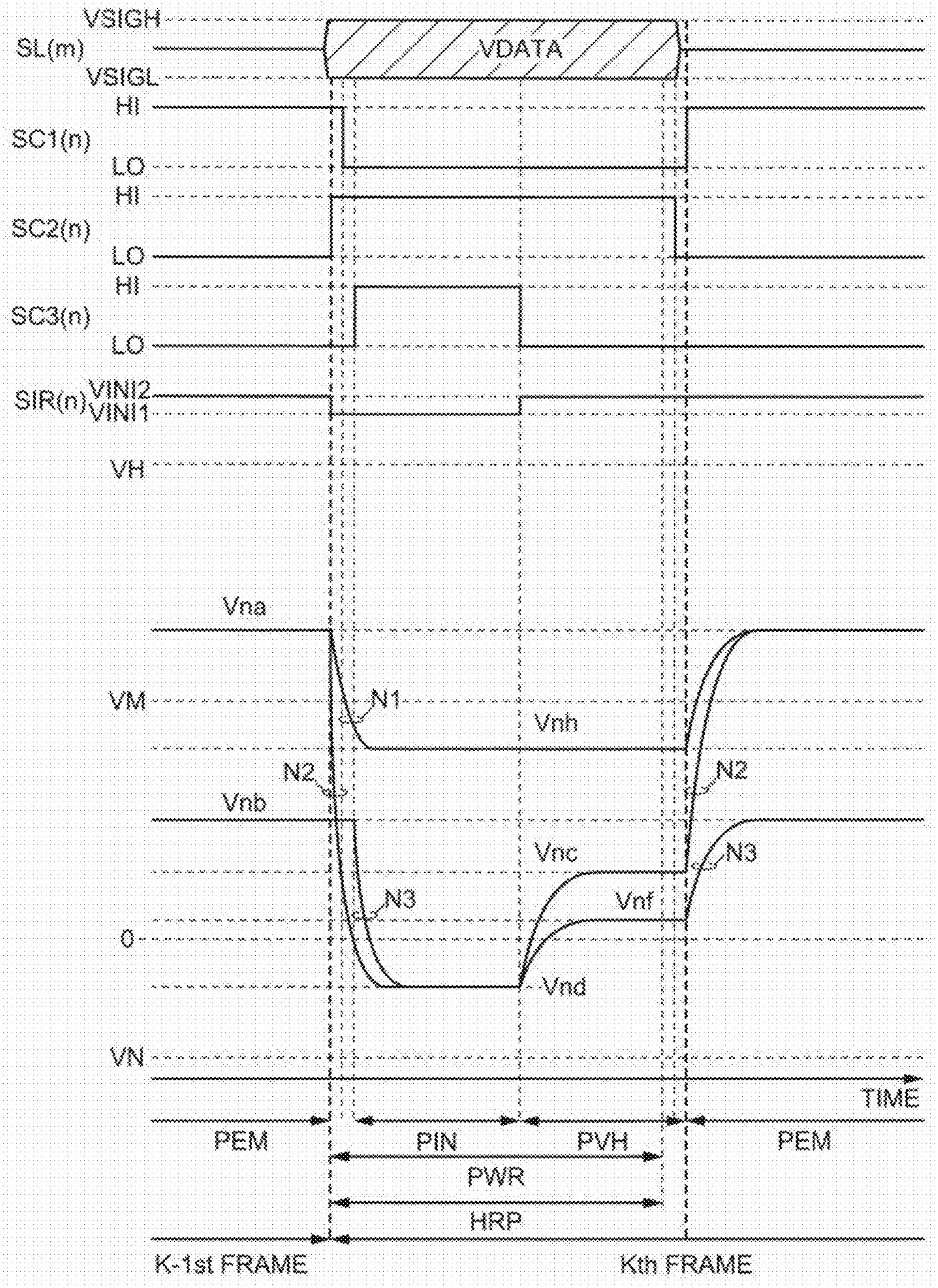
FIG. 24 is a timing chart of a display device according to the third embodiment of the present invention.
Figure 26:
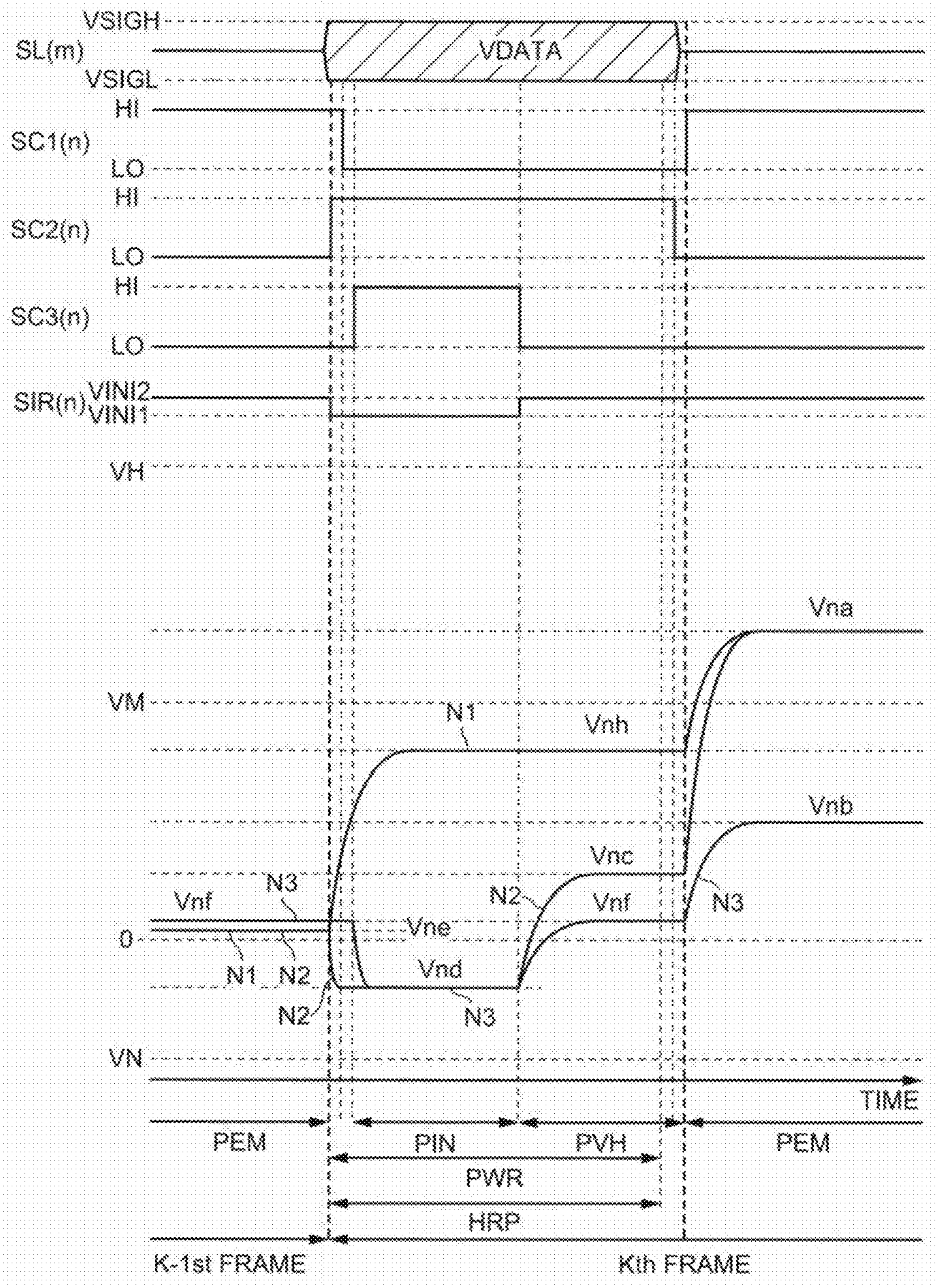
FIG. 26 is a timing chart of a display device according to the third embodiment of the present invention.

The driving method of the display device according to the third embodiment will be described with reference to FIG. 4, FIG. 23, and FIG. 26. Configurations that are the same as or similar to those in FIG. 1 to FIG. 22 will be described as necessary. Similar to the second embodiment, the horizontal axis of the timing charts represents time (TIME).

The driving method of the display device according to the third embodiment is different from the driving method of the display device according to the second embodiment in the configuration related to the configurations shown in (1) to (3) described in "3-1. Configuration of Pixel 180B". Configurations and functions other than those related to (1) to (3) described in "3-1. Configuration of Pixel 180B" are similar to those of the driving method of the display device according to the second embodiment.

The driving method of the display device according to the third embodiment includes periods similar to those of the driving method of the display device 10 according to the first embodiment shown in FIG. 4.

In one horizontal period (horizontal period HRP) in the driving method of the display device according to the third embodiment, the first scan signal SC1(*n*), the second scan signal SC2(*n*), the third scan signal SC3(*n*), the image data signal SL(m), and the scan voltage power supply SIR(n) are input to the pixel 180B (pixel circuit 181B). For example, the pixel 180B (pixel circuit 181B) is selected according to the timings of the first scan signal SC1(*n*), the second scan signal SC2(*n*), the third scan signal SC3(*n*), and the scan voltage power supply SIR(n). The image data signal SL(m) and the scan voltage power supply SIR(n) are input to the selected pixel 180B (pixel circuit 181B) according to the timings of the respective signals. Similar operations are performed on all the pixels 180B (pixel circuits 181B), and an image of the frame corresponding to 1FRAME is displayed on the display region 22 of the display device 10 based on the image data signal SL(m) input to all the pixels 180B (pixel circuits 181B).

For example, the voltages (potentials) output to each signal of each frame in the timing charts shown in FIG. 23 to FIG. 26 are shown in Table 2.

TABLE 2

| | Setting value [V] |
|---|---|
| VTH | 1 |
| VSIGL(Black) | 0.2 |
| VSIGH(White) | 4 |
| HI | 10 |
| LO | −3 |
| VINI1 | −2 |
| VINI2 | 1.4 |
| VDDEL | 8 |
| VSSEL | 0 |

For example, as shown in Table 2, the initialization voltage VINI2 is 1.4 V and the initialization voltage VINI1 is −2 V. The initialization voltage VINI2 is the same as the reference voltage VREF, and the initialization voltage VINI1 is the same as the initialization voltage VINI. The setting values of other voltages are the setting values shown in Table 1 described in "1-5. Driving Method of Display Device 10".

[3-2-1. First Example of Driving Method of Pixel Circuit 181B]

A first example of the driving method of the pixel circuit 181B will be described with reference to FIG. 23. Similar to the first example of the driving method of the pixel circuit 181A according to the second embodiment, the first example of the driving method of the pixel circuit 181B includes displaying images of differing colors in successive frames. Configurations that are the same as or similar to those in FIG. 1 to FIG. 22 will be described as necessary.

The scan voltage power supply SIR(n) is output with the initialization voltage VINI2 in the light emission period PEM of the K−1stFRAME, the initialization voltage VINI1 is output in the period BWRAIN of the KthFRAME following the light emission period PEM of the K−1stFRAME, in the period PWR of the KthFRAME following the period BWRAIN of the KthFRAME, and in the period PIN executed in parallel (overlapping) with the period PWR, and the initialization voltage VINI2 is supplied in the period PVH executed in parallel (overlapping) with the period PWR of the KthFRAME following the period PIN of the KthFRAME and in the light emission period PEM of the KthFRAME following the period PVH of the KthFRAME.

Configurations of the first scan signal SC1(*n*) to the fifth scan signal SC5(*n*) are similar to those described in "2-2-1. First Example of Driving Method of Pixel Circuit 181A". In addition, the operations and the like of the transistors in the respective periods are similar to those described in "2-2-1. First Example of Driving method of Pixel Circuit 181A". Therefore, configurations and the like similar to the configuration described in "2-2-1. First Example of Driving Method of Pixel Circuit 181A" will be described as necessary.

In the light emission period PEM of the K−1stFRAME, the light-emitting element OLED emits light similar to the configuration described in "2-2-1. First Example of Driving Method of Pixel Circuit 181A".

In the period BWRAIN of the KthFRAME following the light emission period PEM of the K−1stFRAME, the voltage supplied to the first node N1 gradually drops from the voltage Vna toward the voltage VSIGL (voltage Vne, 0.2 V), the voltage supplied to the second node N2 gradually drops from the voltage Vna toward the voltage Vnd (initialization voltage VINI1, −2 V), and the voltage supplied to the third node N3 maintains the voltage Vnb. The second transistor T2 is in either the ON state or the OFF state depending on the potential difference Vgs, but the sixth transistor T6 is in the OFF state, the current Ion does not flow through the light-emitting element OLED, and the light-emitting element OLED does not emit light.

In the period PWR of the KthFRAME following the period BWRAIN of the KthFRAME and in the period PIN executed in parallel (overlapping) the period PWR, the voltage supplied to the first node N1 gradually drops toward the voltage VSIGL (voltage Vne, 0.2 V) to become the voltage Vnd, the voltage supplied to the second node N2 gradually drops toward the voltage Vnd to become the voltage Vnd, and the voltage supplied to the third node N3 also gradually drops toward the voltage Vnd (initialization voltage VINI1, −2 V) to become the voltage Vnd. The potential difference Vgs is 0 V (−2 V−(−2 V)) and the potential difference Vds is 10 V (8 V−(−2 V)). Therefore, since the second transistor T2 is in the OFF state and the sixth transistor T6 is also in the OFF state, the current Ion does not flow through the light-emitting element OLED, and the light-emitting element OLED does not emit light.

As described above, in the period PIN, the second node N2 and the third node N3 are initialized by the initialization voltage VINI (−2 V). Further, in the period PWR executed in parallel with the period PIN, the data signal VDATA is written to the pixel 180B (pixel circuit 181B).

In the period PVH executed in parallel (overlapping) with the period PWR of the KthFRAME following the period PIN of the KthFRAME, the voltage supplied to the first node N1 maintains the voltage Vne, the voltage supplied to the second node N2 rises from the voltage Vnd toward the initialization voltage VINI2 (voltage Vnc, 1.4 V) to become the voltage Vnc (1.4 V), and the voltage supplied to the third node N3 rises from the voltage Vnd toward the voltage Vnf to become the voltage Vnf (0.4 V). The voltage Vnf at this time is a voltage at which the potential difference Vgs becomes the threshold voltage VTH (1 V) of the second transistor T2, and the second transistor T2 is in the OFF state.

In the period at the end of the period PVH of the KthFRAME, the voltage supplied to the first node N1 maintains the voltage Vne, the voltage supplied to the second node N2 maintains the voltage Vnc, and the voltage supplied to the third node N3 maintains the voltage Vnf.

As described above, in the period PVH executed in parallel with the period PWR, the data signal VDATA is written to the pixel 180B (pixel circuit 181B). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the period PVH of the KthFRAME, the voltage supplied to the first node N1 maintains the voltage Vne (0.2 V), the voltage supplied to the second node N2 gradually drops from the voltage Vnc toward the voltage Vne (0.2 V) to become the voltage Vne, and the voltage supplied to the third node N3 maintains the voltage Vnf (0.4 V). In this case, the potential difference Vgs is 0.2 V, the potential difference Vds is 7.6 V, the second transistor T2 is in the OFF state, and the current Ion does not flow through the light-emitting element OLED. As a result, three pixels using the pixel 180B emitting red light, the pixel 180B emitting blue light, and the pixel 180B emitting green light become black.

The first example of the driving method of the pixel circuit 181B including the above-described configuration has advantageous effects similar to those of the driving method of the display device 10 according to the first embodiment.

In addition, the pixel circuit 181B includes the scan voltage power line SVIR that combines the reference voltage power line SVR and the initialization voltage power line SVI in the pixel circuit 181A. Therefore, the pixel circuit 181B has a configuration capable of further reducing the number of signals and the number of signal lines. As a result, the display device including the pixel circuit 181B can further reduce the number of signal lines in the pixel, making it possible to reduce the pixel size further. Therefore, the display device including the pixel circuit 181B can achieve high definition and a large screen.

[3-2-2. Second Example of Driving Method of Pixel Circuit 181B]

A second example of the driving method of the pixel circuit 181B will be described with reference to FIG. 23. The driving method shown in the second example of the pixel circuit 181B includes displaying images of the same color (white) in consecutive frames similar to the second example of the driving method of the pixel circuit 181A according to the second embodiment. Configurations that are the same as or similar to those in FIG. 1 to FIG. 22 will be described as necessary.

Configurations of the first scan signal SC1(*n*) to the third scan signal SC3(*n*) are similar to those described in "3-2-1. First Example of Driving Method of Pixel Circuit 181B". In addition, the voltages (potentials) and the like of the first node N1 in the light emission period PEM of the K−1stFRAME are similar to the configuration described in "3-2-1. First Example of Driving Method of Pixel Circuit 181B". Further, the voltages (potentials) and the like of the second node N2 and the third node N3 in the periods excluding the light emission period PEM of the KthFRAME are similar to the configuration described in "3-2-1. First Example of Driving Method of Pixel Circuit 181B". Furthermore, the operations and the like of the transistors in the respective periods are similar to those described in "3-2-1. First Example of Driving method of Pixel Circuit 181B". Therefore, configurations and the like similar to those described in "3-2-1. First Example of Driving Method of Pixel Circuit 181B" will be described as necessary. In addition, the data signal VDATA of VSIGH corresponding to white is output to the image data signal SL(m) in the period PWR of the KthFRAME (horizontal period HRP), and the data signal VDATA similar to the configuration described in "3-2-1. First Example of Driving Method of Pixel Circuit 181B" is supplied in the periods other than the period PWR of the KthFRAME.

The second example of the driving method of the pixel circuit 181B in the light emission period PEM of the K−1stFRAME is similar to the driving method described in "3-2-1. First Example of Driving Method of Pixel Circuit 181B".

In the period BWRAIN following the light emission period PEM of the K−1stFRAME, the voltage supplied to the first node N1 gradually drops from the voltage Vna toward the voltage VSIGH (voltage Vnh, 4 V). In addition, similar to the configuration described in "3-2-1. First Example of Driving Method of Pixel Circuit 181B", the voltage supplied to the second node N2 gradually drops from the voltage Vna toward the voltage Vnd (initialization voltage VINI2, −2 V), and the voltage supplied to the third node N3 gradually drops from the voltage Vnb toward the voltage Vnd. Since the sixth transistor T6 is in the OFF state, the current Ion does not flow through the light-emitting element OLED, and the light-emitting element OLED does not emit light.

In the period PWR of the KthFRAME following the period BWRAIN of the KthFRAME and in the period PIN executed in parallel (overlapping) with the period PWR, the voltage supplied to the first node N1 gradually drops to the voltage VSIGH (voltage Vnh, 4 V) to become the voltage Vnh. In addition, similar to the configuration described in "3-2-1. First Example of Driving Method of Pixel Circuit 181B", the voltage supplied to the second node N2 and the voltage supplied to the third node N3 become the voltage Vnd. Since the potential difference Vgs is 0 V, the potential difference Vds is 10 V, the second transistor T2 is in the OFF state, and the sixth transistor T6 is in the OFF state, the current Ion does not flow through the light-emitting element OLED, and the light-emitting element OLED does not emit light.

As described above, in the period PIN, the second node N2 and the third node N3 are initialized by the initialization voltage VINI1 (−2 V). Further, in the period PWR executed in parallel with the period PIN, the data signal VDATA is written to the pixel 180B (pixel circuit 181B).

In the period PVH executed in parallel (overlapping) with the period PWR of the KthFRAME following the period PIN of the KthFRAME, the voltage supplied to the first node N1 maintains the voltage Vnh. In addition, similar to the configuration described in "3-2-1. First Example of Driving Method of Pixel Circuit 181B", the voltage supplied to the second node N2 rises to the voltage Vnc to become the voltage Vnc, the voltage supplied to the third node N3 becomes the voltage Vnf, and the second transistor T2 is in the OFF state.

In the period at the end of the period PVH of the KthFRAME, the voltage supplied to the first node N1 maintains the voltage Vnh, the voltage supplied to the second node N2 maintains the voltage Vnc, and the voltage supplied to the third node N3 maintains the voltage Vnf.

As described above, in the period PVH executed in parallel with the period PWR, the data signal VDATA is written to the pixel 180B (pixel circuit 181B). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the period PVH of the KthFRAME, the voltage supplied to the first node N1 and the second node N2 becomes the voltage Vna, the voltage supplied to the third node N3 becomes the voltage Vnb, the potential difference Vgs becomes 3.6 V, and the potential difference Vds becomes 5.5 V. The second transistor T2 is in the ON state, and the light-emitting element OLED emits light. White light is emitted by three pixels using the pixel 180B (pixel circuit 181B) emitting red light, the pixel 180B emitting blue light, and the pixel 180B emitting green light.

[3-2-3. Third Example of Driving Method of Pixel Circuit 181B]

Figure 25:
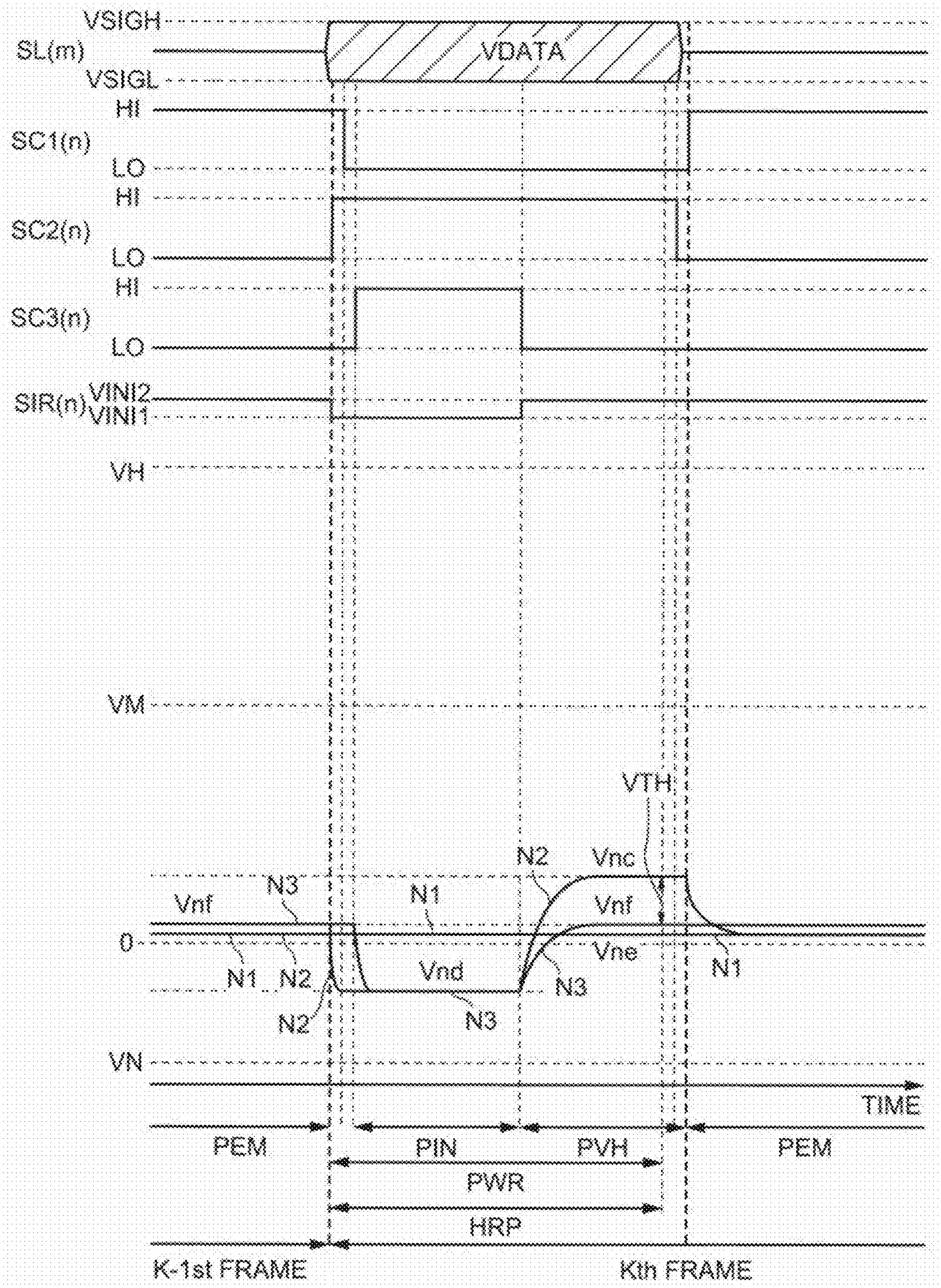
FIG. 25 is a timing chart of a display device according to the third embodiment of the present invention.

A third example of the driving method of the pixel circuit 181B will be described with reference to FIG. 25. The driving method shown in the third example of the driving method of the pixel circuit 181B includes displaying images of the same color (black) in consecutive frames similar to the third example of the driving method of the pixel circuit 181A according to the second embodiment. Configurations that are the same as or similar to those in FIG. 1 to FIG. 24 will be described as necessary.

The configurations of the first scan signal SC1(*n*) to the third scan signal SC3(*n*) are similar to those described in "3-2-1. First Example of Driving Method of Pixel Circuit 181B". In addition, the voltage (potential) of the first node N1, the voltage (potential) of the second node N2, the voltage (potential) of the third node N3, and the like in the period PVH executed in parallel (overlapping) with the period PWR of the KthFRAME following the period PIN of the KthFRAME, the period at the end of the period PVH of the KthFRAME, and in the light emission period PEM of the KthFRAME following the period PVH of the KthFRAME are similar to those described in "3-2-1. First Example of Driving Method of Pixel Circuit 181B". Therefore, configurations similar to those described in "3-2-1. First Example of Driving Method of Pixel Circuit 181B" will be described as necessary. In addition, the data signal VDATA of VSIGL corresponding to black is supplied to the image data signal SL(m) in the period PWR (horizontal period HRP) of the KthFRAME, and the data signal VDATA similar to the configuration described in "3-2-1. First Example of Driving Method of Pixel Circuit 181B" is supplied in the periods other than the period PWR of the KthFRAME.

In the light emission period PEM of the K−1stFRAME, the voltage supplied to the first node N1 and the voltage supplied to the second node N2 are the voltage Vne (0.2 V), the voltage supplied to the third node N3 is the voltage Vnf (0.4 V), and the potential difference Vgs is −0.2 V. Therefore, the second transistor T2 is in the OFF state, the current Ion does not flow from the drive power line PVDD to the light-emitting element OLED and the reference voltage line PVSS, and the pixel 180B (pixel circuit 181B) emitting red light is black. In addition, similar to the pixel 180B emitting red light, the pixel 180B emitting blue light and the pixel 180B emitting green light do not emit light, so that the three pixels using the pixel 180B emitting red light, the pixel 180B emitting blue light, and the pixel 180B emitting green light become black.

In the period BWRAIN of the KthFRAME following the light emission period PEM of the K−1stFRAME, the voltage supplied to the first node N1 maintains the voltage Vne, and the voltage supplied to the third node N3 maintains the voltage Vnf. The fourth transistor T4 is in the ON state, and the voltage supplied to the second node N2 gradually drops toward the voltage Vnd (initialization voltage VINI1, −2 V) to become the voltage Vnd. Since the potential difference Vgs is −2.2 V (−2 V−0.2 V), the second transistor T2 is in the OFF state, and the sixth transistor T6 is also in the OFF state, the current Ion does not flow through the light-emitting element OLED, and the light-emitting element OLED does not emit light.

In the period PWR of the KthFRAME following the period BWRAIN of the KthFRAME and the period PIN executed in parallel (overlapping) with the period PWR, the voltage supplied to the first node N1 maintains the voltage Vnf, the voltage supplied to the second node N2 maintains the voltage Vnd, and the voltage supplied to the third node N3 gradually drops from the voltage Vnf toward the voltage Vnd (initialization voltage VINI1, −2 V) to become the voltage Vnd. Since the potential difference Vgs is 0 V, the second transistor T2 is in the OFF state, and the sixth transistor T6 is also in the OFF state, the current Ion does not flow through the light-emitting element OLED, and the light-emitting element OLED does not emit light.

Similar to the configuration described in "3-2-1. First Example of Driving Method of Pixel Circuit 181B", in the period PVH executed in parallel (overlapping) with the period PWR of the KthFRAME following the period PIN of the KthFRAME, the voltage supplied to the first node N1 maintains the voltage Vne and the voltage supplied to the second node N2 rises to the voltage Vnc (initialization voltage VINI2, 1.4 V). The third scan signal SC3(*n*) is supplied with LO, the fifth transistor T5 is turned OFF, and the third node N3 is released, whereby the second transistor T2 is turned ON, the third node is charged, the potential of the third node N3 rises, and the voltage supplied to the third node N3 is stopped at the voltage Vnf (initialization voltage VINI2−threshold voltage VTH). The potential difference Vgs is the same as the threshold voltage VTH (1.0 V), and the second transistor T2 is turned OFF. In the charge period until the voltage supplied to the third node N3 reaches the voltage Vnf, the second transistor is in the ON state, but the sixth transistor T6 is in the OFF state, so that the current Ion does not flow though the light-emitting element OLED and the light-emitting element OLED does not emit light.

As described above, in the period PIN, the second node N2 and the third node N3 are initialized by the initialization voltage VINI1 (−2 V). Further, in the period PWR executed in parallel with the period PIN, the data signal VDATA is written to the pixel 180B (pixel circuit 181B).

Similar to the configuration described in "3-2-1. First Example of Driving Method of Pixel Circuit 181B", in the period at the end of the period PVH of the KthFRAME following the period PVH of the KthFRAME, the voltage supplied to the first node N1 maintains the voltage Vne, the voltage supplied to the second node N2 maintains the voltage Vnc, and the voltage supplied to the third node N1 maintains the voltage Vnf.

Therefore, in the period PWR executed in parallel with the period PVH, the data signal VDATA is written to the pixel 180B (pixel circuit 181B). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Similar to the configuration described in "3-2-1. First Example of Driving Method of Pixel Circuit 181B", in the light emission period PEM of the KthFRAME following the period PVH of the KthFRAME, the voltage supplied to the second node N2 is the voltage Vne, the voltage supplied to the first node N1 maintains the voltage Vne, and the voltage supplied to the third node N3 maintains the voltage Vnf. Since the second transistor T2 is in the OFF state and the current Ion does not flow through the light-emitting element OLED, the light-emitting element OLED does not emit light. As a result, three pixels using the pixel 180B emitting red light, the pixel 180B emitting blue light, and the pixel 180B emitting green light become black.

[3-2-4. Fourth Example of Driving Method of Pixel Circuit 181B]

A fourth example of the driving method of the pixel circuit 181B will be described with reference to FIG. 26. The driving method shown in the fourth example of the driving method of the pixel circuit 181B includes displaying images of different colors in consecutive frames similar to the fourth example of the driving method of the display device according to the second embodiment. Configurations that are the same as or similar to those in FIG. 1 to FIG. 25 will be described as necessary.

Configurations of the first scan signal SC1(*n*) to the third scan signal SC3(*n*) are similar to those described in "3-2-1. First Example of Driving Method of Pixel Circuit 181B". In addition, the voltages (potentials) of the first node N1, the second node N2, and the third node N3, the operations of the transistors, and the like in the light emission period PEM of the K−1stFRAME are similar to the configurations and operations described in "3-2-3. Third Example of Driving Method of Pixel Circuit 181B". Further, the voltages (potentials) of the second node N2 and the third node N3, the transistors and the like in the period BWRAIN following the light emission period PEM of the K−1stFRAME, the period PWR of the KthFRAME following the period BWRAIN of the KthFRAME, the period PIN executed in parallel (overlapping) with the period PWR, the period PVH executed in parallel (overlapping) with the period PWR of the KthFRAME following the period PIN of the KthFRAME, and in the period at the end of the period PVH of the KthFRAME are similar to the configurations and operations described in "3-2-3. Third Example of Driving Method of Pixel Circuit 181B". In addition, the voltages (potentials) of the first node N1, the second node N2, and the third node N3, the operations of the transistors, and the like in the light emission period PEM of the KthFRAME are similar to the configurations and operations described in "3-2-2. Second Example of Driving Method of Pixel Circuit 181B". Configurations and the like similar to those described in "3-2-1. First Example of Driving Method of Pixel Circuit 181B" to "3-2-3. Third Example of Driving Method of Pixel Circuit 181B" will be described as necessary. In addition, the data signal VDATA including the voltage VSIGH corresponding to white is output to the image data signal SL(m) in the period between the light emission period PEM of the K−1stFRAME and the light emission period PEM of the KthFRAME.

Similar to "3-2-3. Third Example of Driving Method of Pixel Circuit 181B" ("1-5-3. Third Example of Driving Method of Display Device 10"), the pixel 180B (the pixel circuit 181B) is black in the light emission period PEM of the K−1stFRAME.

The voltage supplied to the first node N1 gradually rises from the voltage Vnf toward the voltage VSIGH (Vnh, 4 V) in the period BWRAIN following the light emission period PEM of the K−1stFRAME. The voltage supplied to the second node N2 gradually drops from the voltage Vnf toward the initialization voltage VINI1 (voltage Vnd, −2 V) to the voltage Vnd, and the voltage supplied to the third node N3 maintains the voltage Vne (0.2 V). Since the potential difference Vgs (−2 V−0.2 V) is −2.2 V, the second transistor T2 is in the OFF state, and the sixth transistor T6 is also in the OFF state, the light-emitting element OLED does not emit light.

In the period PWR of the KthFRAME following the period BWRAIN of the KthFRAME and the period PIN executed in parallel (overlapping) with the period PWR, the voltage supplied to the first node N1 gradually rises from the voltage Vnf toward the voltage VSIGH (Vnh, 4 V) to become the voltage Vnh. In addition, similar to "3-2-3. Third Example of Driving Method of Pixel Circuit 181B" or "3-2-2. Second Example of Driving Method of Pixel Circuit 181B", the voltage supplied to the second node N2 and the voltage supplied to the third node N3 become the voltage Vnd. Since the potential difference Vgs is 0 V, the second transistor T2 is in the OFF state, and the sixth transistor T6 is also in the OFF state, the current Ion does not flow through the light-emitting element OLED, and the light-emitting element OLED does not emit light.

As described above, in the period PIN, the second node N2 and the third node N3 are initialized by the initialization voltage VINI1 (−2 V). Further, in the period PWR executed in parallel with the period PIN, the data signal VDATA is written to the pixel 180B (pixel circuit 181B).

Similar to the configuration described in "3-2-2. Second Example of Driving Method of Pixel Circuit 181B", in the period PVH executed in parallel (overlapping) with the period PWR of the KthFRAME following the period PIN of the KthFRAME, the voltage supplied to the first node N1 maintains the voltage Vnh, the voltage supplied to the second node N2 rises to the voltage Vnc, the voltage supplied to the third node N3 rises to the voltage Vnf to become the voltage Vnf, and the second transistor T2 is in the OFF state.

Similar to the configuration described in "3-2-2. Second Example of Driving Method of Pixel Circuit 181B", in the period at the end of the period PVH of the KthFRAME, the voltage supplied to the first node N1 maintains the voltage Vnh, the voltage supplied to the second node N2 maintains the voltage Vnc, and the voltage supplied to the third node N3 maintains the voltage Vnf.

As described above, in the period PVH executed in parallel with the period PWR, the data signal VDATA is written to the pixel 180B (pixel circuit 181B). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Similar to the configuration described in "3-2-2. Second Example of Driving Method of Pixel Circuit 181B", in the light emission period PEM of the KthFRAME following the period PVH of the KthFRAME, the voltage supplied to the first node N1 and the second node N2 becomes the voltage Vna, the voltage supplied to the third node N3 becomes the voltage Vnb, the potential difference Vgs becomes 3.6 V, and the potential difference Vds becomes 5.5 V. The second transistor T2 is in the ON state and the light-emitting element OLED emits light. White light is emitted by three pixels using the pixel 180B emitting red light (pixel circuit 181B), the pixel 180B emitting blue light, and the pixel 180B emitting green light.

Furthermore, each of the embodiments or part of each of the embodiments described above as an embodiment of the present invention can be appropriately combined and implemented as long as no contradiction is caused.

It is understood that, even if the effect is different from those provided by each of the above-described embodiments, the effect obvious from the description in the specification or easily predicted by persons ordinarily skilled in the art is apparently derived from the present invention.

What is claimed is:

1. A display device comprising:

an image data signal line and a first node supplied with a data voltage;

a power line supplied with a constant voltage;

a reference voltage power line and a second node supplied with a reference voltage;

an initialization voltage power line and a third node supplied with an initialization voltage;

a first transistor electrically connected between the image data signal line and the first node, and controlled by a first control signal;

a third transistor electrically connected between the first node and the second node, and controlled by a second control signal with a timing different from a timing of the first control signal;

a second transistor including a gate electrode electrically connected to the second node, and electrically connected between a power line and the third node;

a fourth transistor electrically connected between the reference voltage power line and the second node, and controlled by a third control signal with a timing different from timings of the first control signal and the second control signal;

a fifth transistor electrically connected between the initialization voltage power line and the third node, and controlled by a fourth control signal with a timing different from timings of the first control signal, the second control signal, and the third control signal;

a sixth transistor including a first electrode, and electrically connected to the third node, and controlled by the second control signal;

a light-emitting element electrically connected to the first electrode; and a capacitive element electrically connected between the first node and the third node.

2. The display device according to claim 1, further comprising a reference voltage signal line, wherein the reference voltage signal line functions as the reference voltage power line and the initialization voltage power line.

3. The display device according to claim 1, further comprising a control circuit outputting the first control signal, the second control signal, the third control signal, and the fourth control signal, wherein the control circuit includes a first period and a second period after the first period, the control circuit is configured to control outputting a low-level voltage to the second control signal, turning the third transistor and the sixth transistor off, outputting a high-level voltage to the third control signal, turning the fourth transistor on, outputting the reference voltage to the second node, outputting a high-level voltage to the fourth control signal, turning the fifth transistor on, and outputting the initialization voltage to the third node in the first period, and the control circuit is configured to control outputting a high-level voltage to the first control signal, turning the first transistor on, and outputting the data voltage to the first node in the second period.

4. The display device according to claim 1, wherein the first transistor, the second transistor, the third transistor, the fourth transistor, the fifth transistor, and the sixth transistor are n-channel type field effect transistors.

5. The display device according to claim 1, wherein a channel length of the second transistor is longer than a channel length of the first transistor, a channel length of the third transistor, a channel length of the fourth transistor, a channel length of the fifth transistor, and a channel length of the sixth transistor.

6. The display device according to claim 1, wherein a channel region of each of the first transistor, the second transistor, the third transistor, the fourth transistor, the fifth transistor, and the sixth transistor includes an oxide semiconductor.

7. The display device according to claim 1, further comprising:

a first conductive layer; and a second conductive layer different from the first conductive layer, wherein the initialization voltage power line and the reference voltage power line include the first conductive layer and the second conductive layer different from each other, the first conductive layer and the second conductive layer included in the initialization voltage power line overlap in a plan view, and the first conductive layer and the second conductive layer included in the reference voltage power line overlap in a plan view.

8. The display device according to claim 1, wherein the gate electrode overlaps the capacitive element in a plan view.

* * * * *